(12) United States Patent
Carnevali

(10) Patent No.: US 7,573,706 B2
(45) Date of Patent: Aug. 11, 2009

(54) PORTABLE DEVICE DOCKING STATION

(76) Inventor: Jeffrey D. Carnevali, 5957 Beach Dr., SW., Seattle, WA (US) 98136

( * ) Notice: Subject to any disclaimer, the term of this patent is extended or adjusted under 35 U.S.C. 154(b) by 413 days.

(21) Appl. No.: 11/496,643

(22) Filed: Jul. 31, 2006

(65) Prior Publication Data

US 2008/0002351 A1 Jan. 3, 2008

Related U.S. Application Data

(62) Division of application No. 11/480,666, filed on Jun. 30, 2006, now Pat. No. 7,298,611.

(51) Int. Cl.
*G06F 1/16* (2006.01)
(52) U.S. Cl. ............... 361/679.4; 710/303; 714/805; 62/3.2
(58) Field of Classification Search ........... 710/303; 714/52, 805; 62/3.2; 713/300; 361/679–687, 361/724–727
See application file for complete search history.

(56) References Cited

U.S. PATENT DOCUMENTS

| | | |
|---|---|---|
| 5,175,671 A | 12/1992 | Sasaki |
| 5,477,415 A | 12/1995 | Mitcham et al. |
| 5,592,362 A | 1/1997 | Ohgami et al. |
| 5,704,212 A | 1/1998 | Erler et al. |
| 5,738,537 A | 4/1998 | Setoguchi et al. |
| 5,757,616 A | 5/1998 | May et al. |
| 5,768,101 A | 6/1998 | Cheng |
| 5,790,375 A | 8/1998 | Lee |
| 5,812,356 A | 9/1998 | O'Conner |
| 5,818,691 A | 10/1998 | McMahan et al. |
| 5,825,616 A | 10/1998 | Howell et al. |
| 5,870,283 A | 2/1999 | Maeda et al. |
| 5,933,321 A | 8/1999 | Ruch et al. |
| 5,933,322 A | 8/1999 | Ruch et al. |
| 5,995,366 A | 11/1999 | Howell et al. |
| 6,034,869 A | 3/2000 | Lin |
| 6,061,234 A | 5/2000 | Broder et al. |
| 6,088,620 A | 7/2000 | Nimomiya et al. |
| 6,151,218 A | 11/2000 | Pirdy et al. |
| 6,185,095 B1 | 2/2001 | Helot |
| 6,189,349 B1 | 2/2001 | Helot et al. |
| 6,216,499 B1 | 4/2001 | Ronberg et al. |

(Continued)

OTHER PUBLICATIONS 12 pages of Civil Docket for Case #: 2:07-cv-01985-RAJ for action filed Dec. 11, 2007 in United States District Court Western District of Washington (Seattle) *National Products Inc.* v. *Gamber-Johnson LLC.*

(Continued)

*Primary Examiner*—Hung V Duong
(74) *Attorney, Agent, or Firm*—Charles J Rupnick, Attorney at Law

(57) ABSTRACT

An external expanding apparatus or "docking station" operable with a portable computer device of a type having a display unit having a display screen on an inner surface thereof and a hard shell backing surface opposite thereof and pivotally mounted on a substantially rigid casing having a pair of locating holes adjacent to opposite corners of a substantially planar bottom surface thereof, and an input/output (I/O) connector positioned on a back plane thereof with a pair of positioning apertures provided on opposite sides thereof.

39 Claims, 42 Drawing Sheets

U.S. PATENT DOCUMENTS

| | | | |
|---|---|---|---|
| 6,219,233 B1 | 4/2001 | Moore et al. | |
| 6,236,571 B1 | 5/2001 | Dohi et al. | |
| 6,239,970 B1 | 5/2001 | Nakai et al. | |
| 6,259,601 B1 | 7/2001 | Jaggers et al. | |
| 6,275,378 B1 | 8/2001 | Lee et al. | |
| 6,275,945 B1 | 8/2001 | Tsuji et al. | |
| 6,309,230 B2 | 10/2001 | Helot | |
| 6,331,934 B1 | 12/2001 | Helot et al. | |
| 6,362,959 B2 | 3/2002 | Tracy | |
| 6,418,013 B1 | 7/2002 | Broder et al. | |
| 6,427,499 B1 | 8/2002 | Derman | |
| 6,453,378 B1 | 9/2002 | Olson et al. | |
| 6,560,103 B1 | 5/2003 | Dohi et al. | |
| 6,574,102 B2 | 6/2003 | Usui et al. | |
| 6,581,420 B1 | 6/2003 | Ling et al. | |
| 6,606,243 B2 | 8/2003 | Kamimaki et al. | |
| 6,697,252 B2 | 2/2004 | Maeda | |
| 6,744,627 B2 | 6/2004 | Won et al. | |
| 6,885,552 B2 | 4/2005 | Mullen et al. | |
| 6,898,079 B2 | 5/2005 | Park | |
| 6,934,151 B2 | 8/2005 | Nakano et al. | |
| 6,937,468 B2 | 8/2005 | Lin et al. | |
| 6,952,343 B2 * | 10/2005 | Sato | 361/679.57 |
| 7,024,566 B2 | 4/2006 | Shiwaku et al. | |
| 7,426,108 B2 * | 9/2008 | Carnevali | 361/679.41 |
| 2003/0231465 A1 * | 12/2003 | Weng | 361/686 |
| 2006/0026326 A1 * | 2/2006 | Hunt et al. | 710/303 |
| 2008/0003860 A1 * | 1/2008 | Carnevali | 439/296 |
| 2009/0123209 A1 * | 5/2009 | Silverbrook et al. | 400/613 |

OTHER PUBLICATIONS 75 pages of Complaint for Case #: 2:07-cv-01985-RAJ for action filed Dec. 11, 2007 in United States District Court Western District of Washington (Seattle) *National Products Inc. v. Gamber-Johnson LLC*.

14 pages of Order for Case #: 2:07-cv-01985-RAJ for action filed Dec. 11, 2007 in United States District Court Western District of Washington (Seattle) *National Products Inc. v. Gamber-Johnson LLC*.

9 pages of Defendent Gamber-Johnson LLC's Second Amended Counterclaims for Case #: 2:07-cv-01985-RAJ for action filed Dec. 11, 2007 in United States District Court Western District of Washington (Seattle) *National Products Inc. v. Gamber-Johnson LLC*.

2 pages of Order To Show Cause for Case #: 2:07-cv-01985-RAJ for action filed Dec. 11, 2007 in United States District Court Western District of Washington (Seattle) *National Products Inc. v. Gamber-Johnson LLC*.

8 pages of Order for Case #: 2:07-cv-01985-RAJ for action filed Dec. 11, 2007 in United States District Court Western District of Washington (Seattle) *National Products Inc. v. Gamber-Johnson LLC*.

8 pages of NPI's Answer To Second Amended Counter Claims for Case #: 2:07-cv-01985-RAJ for action filed Dec. 11, 2007 in United States District Court Western District of Washington (Seattle) *National Products Inc. v. Gamber-Johnson LLC*.

4 pages of Appendix A To Gamber-Johnson's Motion for Award Of Attorney Fees for Case #: 2:07-cv-01985-RAJ for action filed Dec. 11, 2007 in United States District Court Western District of Washington (Seattle) *National Products Inc. v. Gamber-Johnson LLC*.

2 pages of [Proposed] Order Finding Liklihood of Inequitable Conduct and Permitting Discovery on Inequitable Conduct Counterclaim for Case #: 2:07-cv-01985-RAJ for action filed Dec. 11, 2007 in United States District Court Western District of Washington (Seattle) *National Products Inc. v. Gamber-Johnson LLC*.

51 pages of Document 69 for Case #: 2:07-cv-01985-RAJ for action filed Dec. 11, 2007 in United States District Court Western District of Washington (Seattle) *National Products Inc. v. Gamber-Johnson LLC* including: 7 pages of Declaration of Jeff Greene in Support of Gamber-Johnson's Motion for Award of Attorney Fees, 7 pages of Exhibit 1, 8 pages of Exhibit 2, 10 pages of Exhibit 3, 8 pages of Exhibit 4, 4 pages of Exhibit 5, 2 pages of Exhibit 6, 4 pages of Exhibit 7.

56 pages of Document 70 for Case #: 2:07-cv-01985-RAJ for action filed Dec. 11, 2007 in United States District Court Western District of Washington (Seattle) *National Products Inc. v. Gamber-Johnson LLC* including: 3 pages of Declaration of David L. De Bruin in Support of Gamber-Johnson's Motion for Award of Attorney Fees 11 pages of Exhibit 1, 2 pages of Exhibit 2, 7 pages of Exhibit 3, 6 pages of Exhibit 4, 27 pages of Exhibit 5.

10 pages of Order for Case #: 2:07-cv-01985-RAJ for action filed Dec. 11, 2007 in United States District Court Western District of Washington (Seattle) *National Products Inc. v. Gamber-Johnson LLC*.

1 page of Judgment in a Civil Case for Case #: 2:07-cv-01985-RAJ for action filed Dec. 11, 2007 in United States District Court Western District of Washington (Seattle) *National Products Inc. v. Gamber-Johnson LLC*.

1 page brochure "Panasonic Toughbook 27/28/29/30** Docking Station" Item No. NP-Pandock 2.

1 page of brochure "Panasonic Toughbook 28 Docking Station".

* cited by examiner

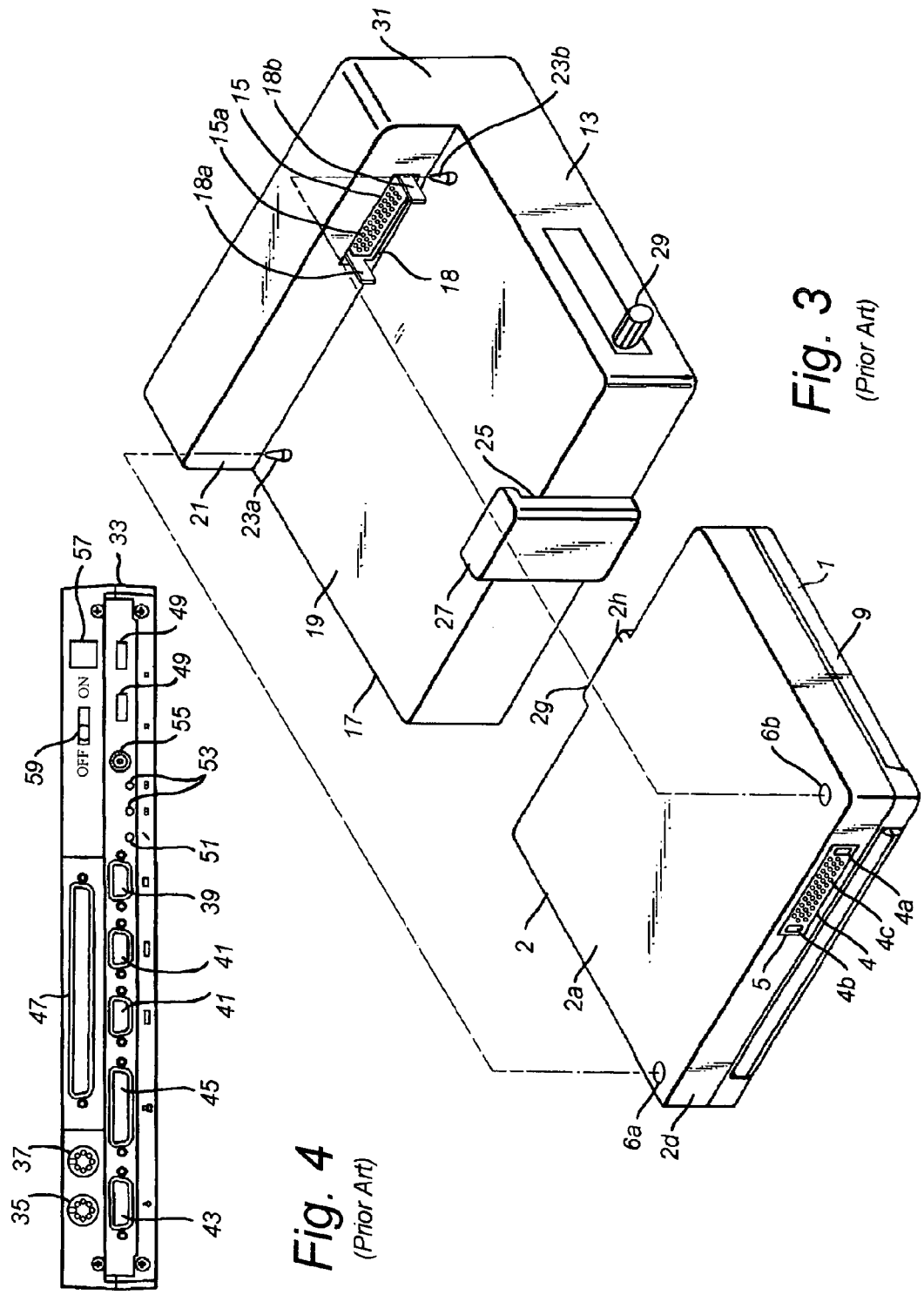

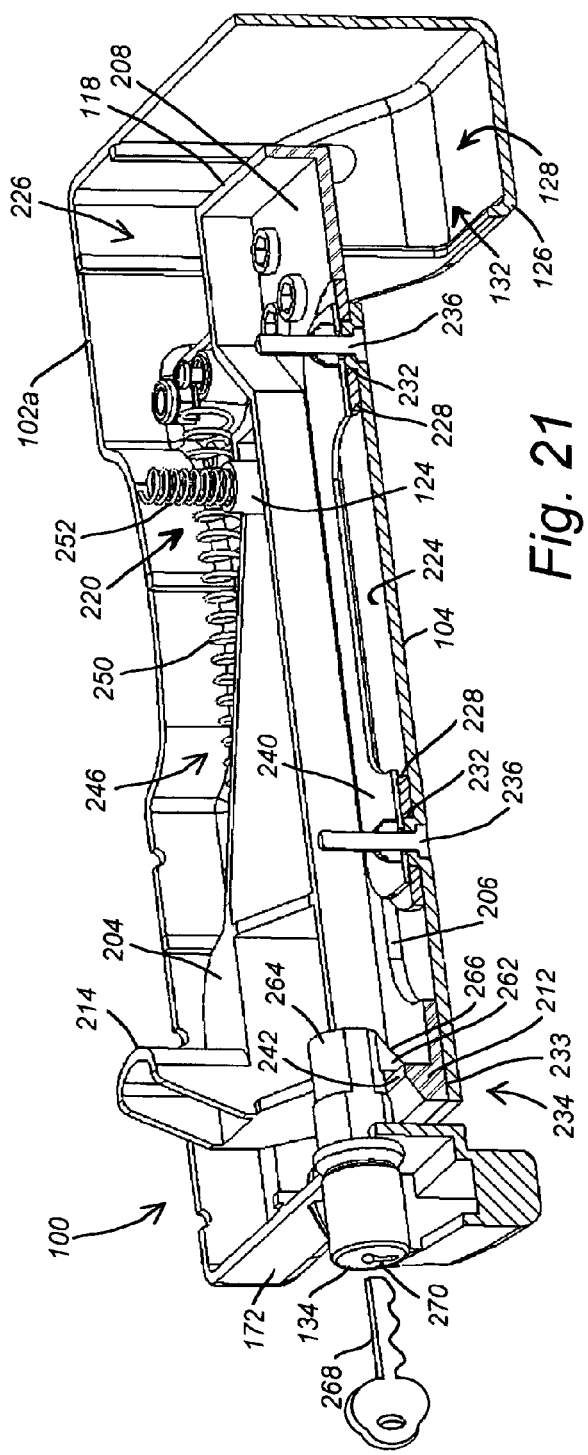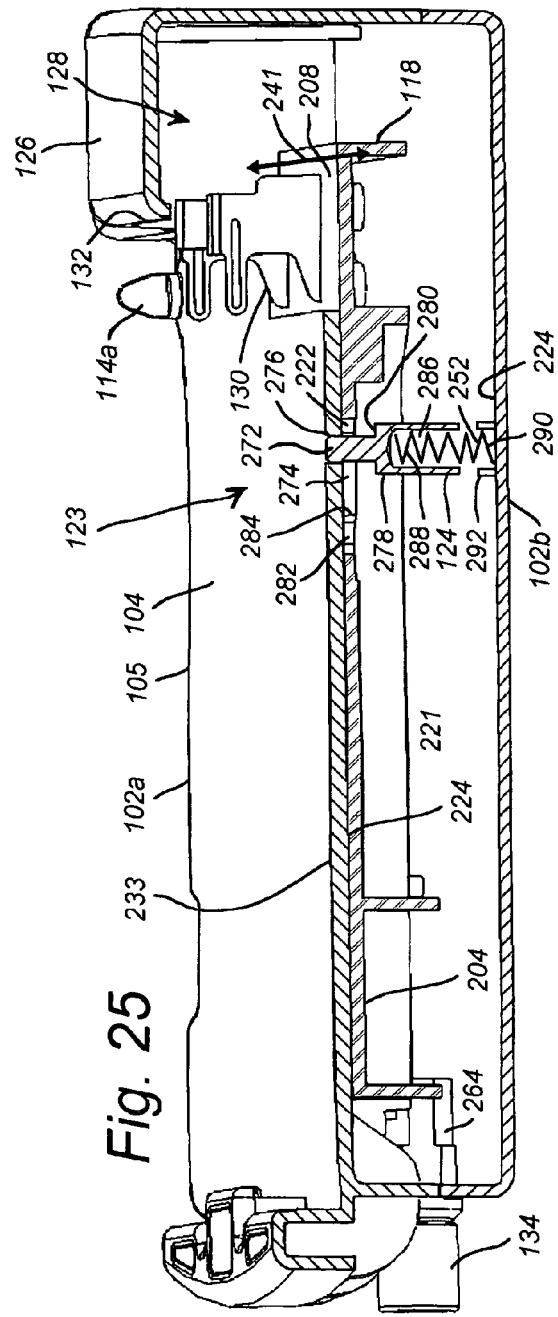

PORTABLE DEVICE DOCKING STATION

This Divisional application claims priority benefit of parent U.S. patent application Ser. No. 11/480,666 filed in the name of Jeffrey D. Carnevali on Jun. 30, 2006 now U.S. Pat. No. 7,298,611, the complete disclosure of which is incorporated herein by reference.

FIELD OF THE INVENTION

The present invention relates generally to trays for holding portable devices, and in particular to quick release docking stations for portable computers and other portable electronics devices having one or more input/output (I/O) communication ports.

BACKGROUND OF THE INVENTION

Portable notebook-type computers using a built-in battery pack power source are generally well-known and have an advantage in being handy to carry about and freely used even in those places which are not accessible to the commercial power supply.

Such computers are compact in design for higher portability, so that their standard functions are inevitably more limited than those of desktop computers. Accordingly, such portable computers are generally provided with one or more connectors and ports for function expansion, usually on the rear face of its casing which supports a keyboard and a display unit. These computers are additionally furnished with new functions by connecting peripheral devices, such as a hard disk drive, mouse, printer, etc., to the connectors and ports.

FIGS. 1 and 2 illustrate a notebook-type portable computer 1 for use as a portable electronic device which is connected to an external expanding apparatus, commonly referred to as a "docking station." The computer 1 includes a plastic casing 2 serving as an apparatus body. The casing 2 is in the form of a flat generally rectangular box having a bottom face 2a and a top face 2b, which extend generally parallel to each other, and a front face 2c, a rear face 2d, and side faces 2e and 2f, which are continuous with the bottom and top faces 2a and 2b. At least one such computer casing 2 further includes a tongue 2g projected from the front face 2c and having a bottom face 2h which may be continuous with the bottom face 2a of the casing 2, a top face 2i which extends generally parallel to the bottom face 2h, and a front face 2j that is spaced away from the casing front face 2c. The tongue 2g may include side surfaces 2k and 2l extending between the computer casing front surface 2c and the tongue front face 2j. Other surfaces of the casing 2, such as one of the side faces 2e, 2f may includes additional features, such as but not limited to a CD-ROM or DVD-ROM 3a and a main power switch 3b.

Arranged on the top face 2b of the casing 2, as illustrated in FIG. 1, is a keyboard 7 which is used to input information and commands. A pair of display supporting portions 8a and 8b, left and right, are formed at the rear end portion of the top face 2b. A flat display unit 9 having a thickness t is connected to the display supporting portions 8a and 8b. The display unit 9 is rotated about a hinge axis h on a pair of legs 10a and 10b, left and right, which are pivotally mounted on the supporting portions 8a and 8b, respectively, by means of hinge devices as is generally well-known. Thus, the display unit 9 is supported on the casing 2 to be rotatable about the hinge axis h relative to the casing 2 between a closed position, in which a display screen surface 9a of the display unit 9 touches the top face 2b of the casing 2. The display unit 9 thereby covers the keyboard 7 for protecting both the keyboard 7 and display screen surface 9a of the display unit 9 with a hard shell backing portion 9b of the display unit 9. The display unit 9 alternately rotates into an open position in which the display unit 9 stands upright with the display screen surface 9a exposed at the back of the keyboard 7, as illustrated. Furthermore, a hard shell lip portion 9c of the display unit 9 surrounds the sensitive display screen 9d, the display screen 9d is slightly recessed below the hard shell lip portion 9c.

FIG. 2 illustrates an input/output (I/O) connector or port 4 of the known portable computer being provided in the rear face 2d between interface apertures 4a and 4b on either side thereof. The I/O connector 4 includes a quantity of pins or pin receptors (shown) 4c are organized in a selected pattern. The pins or pin receptors 4c provided input/output (I/O) capability for communicating with various peripheral components that may provide such functions as for example but not limited to: a modem, a game port, audio output, a microphone input, serial connections, parallel connections, a video display output, USB (Universal Serial Bus) connection, a mouse connection, a keyboard connection, an external power supply connection. Alternatively, connection to these or other peripheral devices are provided by a separate and individual modem connector, a game port, audio speaker connectors, a microphone connector, two serial connectors, a parallel connector, a display unit connector, a USB connector, a mouse connector, a keyboard connector, and an external power supply connector, as are generally well-known in the art. A metallic terminal plate 5 is exposed on the rear face 2d and surrounds the I/O connector 4 and includes an open end of each of the apertures 4a and 4b. The apertures 4a and 4b each include a cylindrical aperture or a lengthwise slot (shown) or an aperture of another shape extending from the rear face 2d of the casing 2 toward the opposite front face 2c.

In transporting the computer 1 peripheral devices must be removed from their corresponding connectors or ports, or alternatively the single I/O connector 4. In restoring the computer 1 to its original state after using it elsewhere, any peripheral devices must be connected again via the I/O connector 4. In the case where a large number of peripheral devices are connected, therefore, the removal and connection require very troublesome operations.

To cope with this, there have recently been provided external expanding apparatuses or "docking stations" which are adapted to be interposed between a portable computer and a plurality of peripheral devices and relay signals transferred between the computer and the devices.

FIG. 3 illustrates one such docking station 13 having a plurality of connectors and ports connectable with the peripheral devices, external power supply connector, etc., and an expansion connector 15 is presented at a connector presentation surface 21 which is opposed to the rear face 2d of the computer casing 2. The expansion connector 15 is structured to engage the computer's I/O connector 4. The expansion connector 15 is mounted on a movable bracket 18 structured to engage apertures 4a and 4b on opposite sides of the I/O connector 4 as a prelude to the expansion connector 15 actually engaging the I/O connector 4. By example and without limitation, the bracket 18 includes a pair of guide pins or arms 18a and 18b that are positioned on opposite sides of the expansion connector 15 to engage apertures 4a and 4b on opposite sides of the I/O connector 4. The expansion connector 15 includes a quantity of pin receptors or pins (shown) 15a organized in a selected pattern to engage the pins or pin receptors 4c of the computer's I/O connector 4. The pins 15a of the expansion connector 15 are connected electrically to different ones of the connectors and ports that are connectable with the peripheral devices.

In known prior art docking station devices 13 the pair of guide pins or arms 18a and 18b positioned on opposite sides of the expansion connector 15 are extended forward of the expansion connector 15 and its pin receptors or pins (shown) 15a such that the guide arms 18a, 18b engage the apertures 4a and 4b on opposite sides of the I/O connector 4 before the expansion connector 15 and its pin receptors or pins 15a the I/O connector 4. Furthermore, the expansion connector 15 is typically loosely mounted on the bracket 18 with a little lateral play such that the expansion connector 15 is permitted to move relative to the bracket 18 and its pin receptors or pins (shown) 15a wiggle or "float." into final mating positions with the respective pin receptors (or pins) 4c of the I/O connector 4 after the guide arms 18a, 18b have established a nominal docking position. Thus, the guide arms 18a, 18b with the respective interface apertures 4a, 4b fine tunes the positioning of the pins (or pin receptors) 15a of the expansion connector 15 relative to the pin receptors (or pins) 4c of the computer's I/O connector 4 prior to final insertion.

The docking station 13 also includes a mounting platform 17 on which the computer 1 is removably mounted. The mounting platform 17 is, for example, adjacent connector presentation surface 21, and includes a bearing surface 19 on which the bottom face 2a of the computer casing 2 is placed. The docking station apparatus 13 also includes bullet-nosed engaging pins 23a and 23b, which are provided on the bearing surface 19 adjacent to the connector presentation surface 21. The bottom face 2a of the computer casing 2 includes a pair of locating holes 6a and 6b situated adjacent to the rear face 2d and the side faces 2e and 2f of the casing 2. The locating holes 6a, 6b each include a cylindrical aperture extending from the bottom face 2a toward the opposite top face 2b and sized to accept the bullet-nosed engaging pins 23a, 23b on the bearing surface 19 of the docking station 13. The locating holes 6a and 6b thus serve to locate the computer's I/O connector 4 relative to the expansion connector 15 on the presentation surface 21 of the docking station 13.

In connecting the computer to the docking station 13, the tongue 2g of the computer casing 2 is fit into a mouth 25 of a mating receiver structure 27 adjacent to the bearing surface 19 opposite from and facing toward the connector presentation surface 21. The computer casing 2 is rotated about the tongue 2g with the bottom surface 2a of the casing 2 guided toward the bearing surface 19. When the bottom surface 2a of the casing 2 is close to the bearing surface 19, the mating locating holes 6a and 6b in the bottom surface 2a of the casing 2 engage the locating pins 23a, 23b of the docking station 13, which positions the casing 2 relative to the docking station 13, and in particular positions the I/O connector 4 relative to the docking station's expansion connector 15.

Thereafter, the docking station's expansion connector 15 and the pair of guide pins or arms 18a, 18b on either side of the expansion connector 15 are moved together in the direction indicated by the arrow toward the rear face 2d of the computer 1 in a manner such that the pair of guide pins or arms 18a, 18b are fitted individually in the recesses of the respective interface apertures 4a, 4b by operation of a swingable operating lever 29. Such engagement of the guide arms 18a, 18b with the respective interface apertures 4a, 4b fine tunes the positioning of the pins (or pin receptors) 15a of the expansion connector 15 relative to the pin receptors (or pins) 4c of the computer's I/O connector 4. Continued operation of the operating lever 29 continues movement of the expansion connector 15 toward the computer's I/O connector 4, and engages the pins (or pin receptors) 15a with the pin receptors (or pins) 4c during final insertion.

As a result, the expansion connector 15 of the docking station 13 is connected to the computer's I/O connector 4. Additionally, the computer 1 cannot be removed from the docking station 13 because the guide pins or arms 18a, 18b engaging the interface apertures 4a, 4b conspire with the receiver structure 27 engaging the computer casing's tongue 2g, and the locating pins 23a and 23b engaging the mating locating holes 6a and 6b in the bottom surface 2a of the computer casing 2 to secure the computer 1 relative to the docking station's connector presentation surface 21 and the bearing surface 19, respectively.

In removing the computer from the docking station apparatus 13, the operating lever 29 is reversed to move the expansion connector 15 away from the computer rear surface 2d, whereby the expansion connector 15 is disconnected from the computer's I/O connector 4, and the guide pins or arms 18a, 18b are disengaged from the respective interface apertures 4a, 4b. The computer casing 2 can be rotated about the tongue 2g so that the bottom surface 2a of the casing 2 is disengaged from the bearing surface 19, and the computer 1 is disengaged from the docking station 13.

In the docking station apparatus 13 described above, the pins (or pin receptors) 15a of the expansion connector 15 are attached to a circuit board which is located within a casing 31 of the apparatus 13, and the expansion connector 15 is connected to the circuit board through a flexible wiring harness. The flexible wiring board is in turn connected through other flexible wiring harnesses to separate and individual modem connector, a game port, audio speaker connectors, a microphone connector, two serial connectors, a parallel connector, a display unit connector, a USB connector, a mouse connector, a keyboard connector, and an external power supply connector, as are generally well-known in the art.

FIG. 4 illustrates an input/output (I/O) plate 33 of the docking station 13 where the flexible wiring harnesses of external devices may be connected to, for example, a mouse connector 35, a keyboard connector 37, a display unit connector 39, one or more serial connectors 41, a game port 43, a parallel connector 45, a serial connector 47, one or more USB connectors 49, a microphone connector 51, one or more speaker connectors 53, an external power supply connector 55, a modem connector 57, or a power switch 59.

However, known docking station apparatus are limited in their ability to provide the above expansion efficiently and reliably.

SUMMARY OF THE INVENTION

The present invention is an external expanding apparatus or "docking station" operable with a portable computer device of a type having a display unit having a display screen on an inner surface thereof and a hard shell backing surface opposite thereof and pivotally mounted on a substantially rigid casing having a pair of locating holes adjacent to opposite corners of a substantially planar bottom surface thereof, and an input/output (I/O) connector positioned on a back plane thereof with a pair of positioning apertures provided on opposite sides thereof. The external expanding apparatus or "docking station" of the present invention provides all of the features of prior art expanding apparatus with several novel features.

According to one aspect of the invention the docking station is a novel external expanding apparatus for expanding the function of a portable electronic device. Accordingly, the novel external expanding apparatus includes an apparatus body having an outer surface, the outer surface having a bearing surface that is structured for receiving the portable electronic device, and an expansion connector of a type that is connectable with the portable electronic device. The novel external expanding apparatus also includes an expansion connector drive mechanism that is structured for moving the expansion connector relative to the bearing surface between a disengaged position and an engaged position. By example and without limitation, the expansion connector drive mechanism includes a linearly movable, unitary frame having opposing ends and a handle fixed to the frame, the linearly movable frame being slidably coupled to the apparatus body and adapted for linear movement of the expansion connector relative to the bearing surface thereof, wherein the handle maintains a constant position relative to the expansion connector when the expansion connector is moved relative to the bearing surface, wherein the handle is positioned beneath the bearing surface and does not extend beyond the outer surface of the apparatus body, and wherein the handle and the expansion connector are positioned on opposing ends of the frame. A safety catch is operable between the frame and an aperture communicating with the bearing surface, the safety catch being movable between an engaged position and a disengaged position.

According to another aspect of the invention, the novel external expanding apparatus further includes at least one biasing mechanism that is coupled for urging the expansion connector toward the disengaged position, wherein the biasing mechanism is positioned substantially parallel to the linear movement of the frame.

According to another aspect of the novel external expanding apparatus, the biasing mechanism has a fixed end and a movable end, wherein the fixed end is positioned closer to the expansion connector than the movable end.

According to another aspect of the novel external expanding apparatus, the safety catch includes a first portion and a second portion, wherein when the safety catch is in the engaged position the first portion extends from the aperture communicating with the bearing surface and the second portion engages with the frame.

According to another aspect of the novel external expanding apparatus, when the safety catch is in the disengaged position, the first portion is depressed relative to the bearing surface and the second portion is disengaged from the frame.

According to another aspect of the invention, the novel external expanding apparatus further includes a catch mechanism that is operable for retaining the frame in the engaged position of the expansion connector.

According to another aspect of the novel external expanding apparatus, the handle is further non-pivoting relative to the frame.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates a known computer docking station having an expansion connector structured to engage the computer's I/O connector and being provided on a connector presentation surface thereof which is opposed to the rear face of the known computer illustrated in FIGS. 1 and 2 and a plurality of connectors and ports connectable with different peripheral devices, external power supply, etc.;

FIG. 4 illustrates an input/output (I/O) plate of the known docking station where flexible wiring harnesses of different external peripheral devices, external power supply, etc. may be connected;

FIG. 21 is a section view of the expansion connector drive mechanism of the invention;

FIG. 25 illustrates the docking station of the invention being in final state of accepting the computer removed here for clarity;

FIGS. 44 through 50 illustrate that the arcuate support surface of the anvil portion of the novel display unit clamping mechanism of the invention permits the backing portion of the computer display unit to roll thereabout in smooth substantially constant contact during rotation relative to the computer keyboard, wherein:

FIG. 44 also illustrates the docking station of the invention with the novel display unit support in the active position of FIG. 43 having the support arm rotated about the pivot axis with the novel display unit clamping mechanism supporting the computer's display unit in an open upright position relative to the computer's keyboard, FIG. 45 is a side view of the docking station of the invention having the computer's display unit support in one active position, as illustrated in previous figures, having the support arm rotated about the pivot axis with the novel display unit clamping mechanism of the invention supporting the computer display unit in one open over-center position relative to the computer's keyboard;

FIG. 46 is an opposite side view of the novel display unit support of the invention in the active position of FIG. 45 for constraining the computer's display unit in the open over-center position by a pincer action of the jaw portion relative to the anvil with the knob being tightened to secure the support arm in the active over-center position;

FIG. 47 is a side view of the docking station of the invention having the novel display unit support in another active position having the support arm rotated about the pivot axis with the novel display unit clamping mechanism of the invention supporting the computer's display unit in a substantially vertical upright position relative to the computer's keyboard with the anvil portion being positioned supporting the hard shell backing portion of the computer display unit;

FIG. 48 is an opposite side view of the novel display unit support of the invention in the active position of FIG. 47 for constraining the computer's display unit in the substantially vertical upright position by the pincer action of the jaw portion relative to the anvil portion with the knob being tightened to secure the support arm in the upright position;

FIG. 49 is a side view of the docking station of the invention having the novel display unit support of the invention in another active position having the support arm rotated about the pivot axis with the novel display unit clamping mechanism of the invention supporting the computer display unit in another open position having the display unit in an extreme over-center upright position relative to the computer keyboard;

FIG. 50 is an opposite side view of the novel display unit support of the invention in the active position of FIG. 49 for constraining the computer display unit in the extreme over-center open position by the pincer action of the jaw portion relative to the anvil portion with the knob being tightened to secure the support arm in the extreme over-center position;

DETAILED DESCRIPTION OF PREFERRED EMBODIMENT

In the Figures, like numerals indicate like elements.

Figure 1:
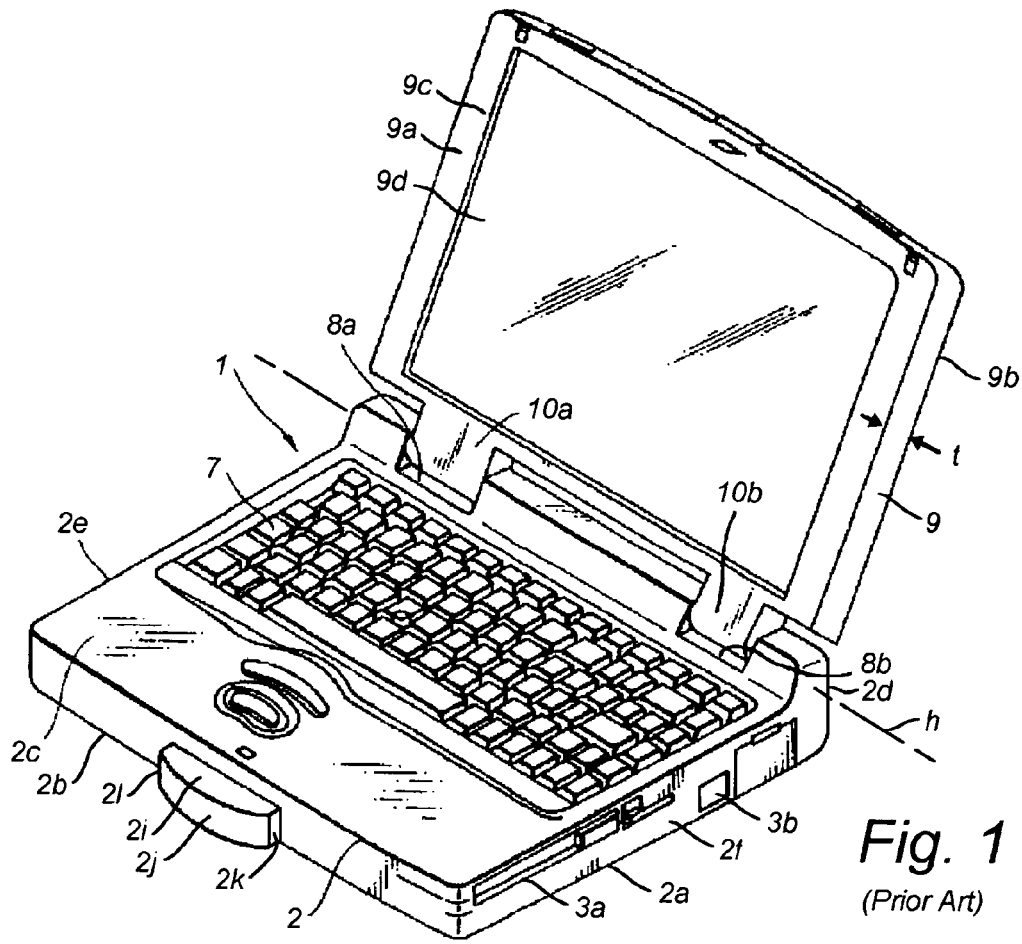
FIG. 1 is a perspective view showing an example of a known portable computer.
Figure 2:
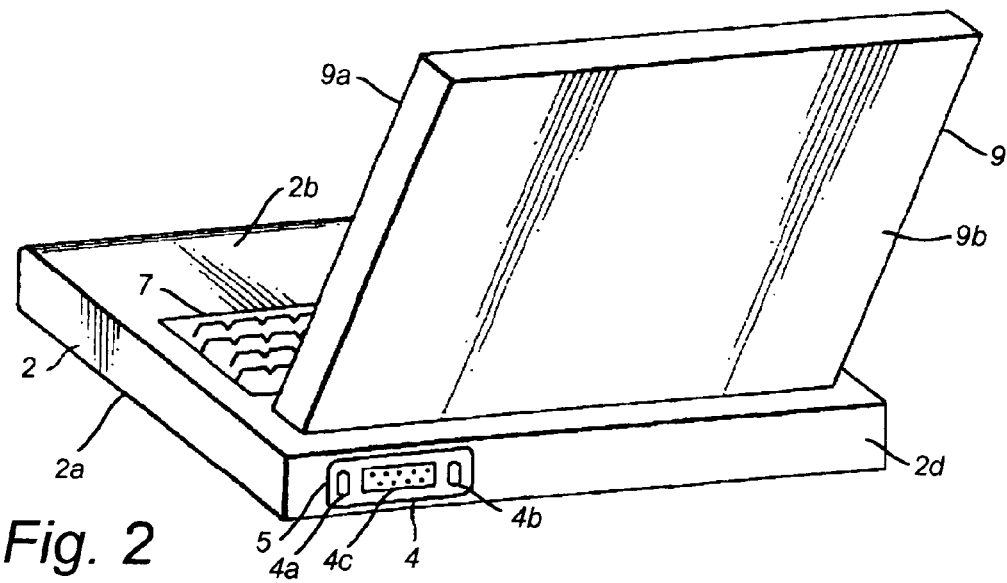
FIG. 2 illustrates an input/output (I/O) connector or port of the known portable computer illustrated in FIG. 1 as being provided in the rear face thereof between interface apertures.
Figure 5:
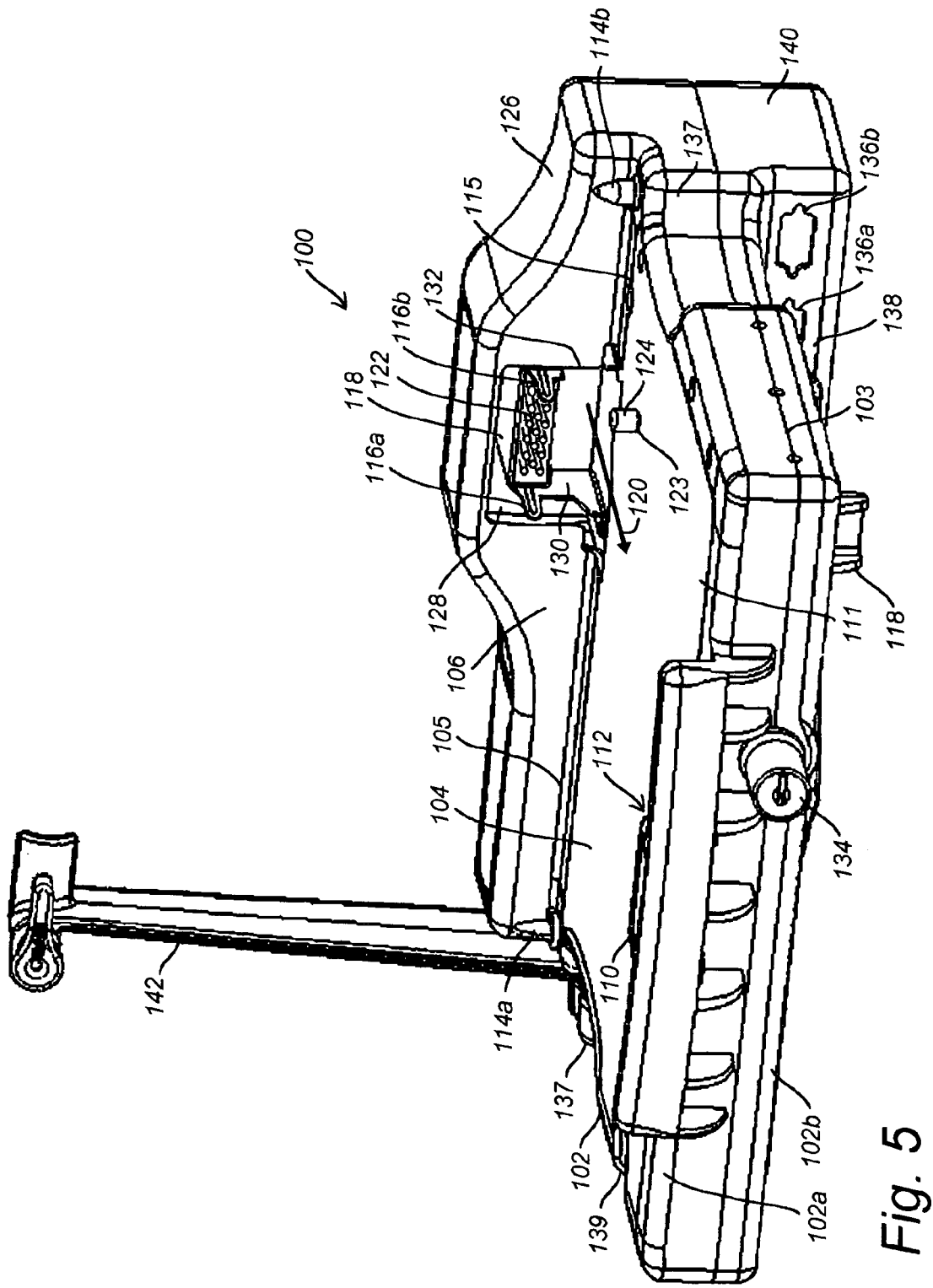
FIG. 5 is a front perspective view that illustrates the novel external computer expanding apparatus or "docking station" of the invention.

FIG. 5 is a front perspective view that illustrates the present invention embodied by example and without limitation as a novel external computer expanding apparatus or "docking station" 100 which is adapted to be interposed between a portable computer of the type illustrated in FIGS. 1-3 and a plurality of peripheral devices and relay signals transferred between the computer and the devices.

The docking station 100 includes a two-piece body 102 having an upper body portion 102a connected to a lower body portion 102b along a line 103 of mutual contact. The upper body portion 102a is formed with a bearing surface 104 on one face of a substantially rigid bearing plate 105. The bearing surface 104 is structured for the computer casing 2 to be removably placed thereon. A connector presentation surface 106 is projected above the bearing surface 104 for presenting an expansion connector 108 to the rear face 2d of the computer 1 when the computer's bottom face 2a is placed on the bearing surface 104. The upper body portion 102a also includes means for securing the computer 1 to the bearing surface 104 in fixed position relative to the connector presentation surface 106 such that a coupling with the expansion connector 108 is not interrupted unintentionally. By example and without limitation, the securing means includes a receiver structure 110 fixedly positioned adjacent to a front portion 111 of the bearing surface 104 opposite from the connector presentation surface 106 and having an open jaw structure 112 facing toward the connector presentation surface 106 and structured to receive and mate with the tongue 2g on the front face of the computer casing 2. Mating of the tongue 2g within the open jaw 112 of the receiver structure 110 resists separation of the computer casing's bottom face 2a from the bearing surface 104. Such mating of the tongue 2g within the jaw 112 of the receiver structure 110 also resists sliding of the computer casing 2 along the bearing surface 104 away from the connector presentation surface 106. Additionally, the open jaw 112 may optionally include lips on either side thereof that engage side surfaces 2k and 2l (if present) of the tongue 2g, and by such engagement, resist sideways slippage along the bearing surface 104 parallel of the connector presentation surface 106.

The securing means also includes a pair of engaging pins 114a and 114b fixedly positioned on a rear portion 115 of the bearing surface 104 adjacent to the connector presentation surface 106, the engaging pins 114a, 114b are structured to be slidingly received into the mating locating holes 6a and 6b in the bottom surface 2a of the casing 2. The two engaging pins 114a and 114b operate to position the computer casing 2 relative to the docking station bearing surface 104, and in particular to position the computer's I/O connector 4 relative to the docking station's expansion connector 108. Such mating of the two engaging pins 114a, 114b within the respective locating holes 6a, 6b also serve to resist both lateral and longitudinal slippage of the computer casing 2 relative to the bearing surface 104. The two engaging pins 114a, 114b resist both sliding of the computer casing 2 along the bearing surface 104 away from the connector presentation surface 106, and simultaneously resist sideways slippage along the bearing surface 104 parallel of the connector presentation surface 106.

The securing means also includes a pair of guides 116a and 116b provided as either substantially rigid pins or stiff arms that are positioned on opposite sides of the expansion connector 108. The guides 116a and 116b extend past the expansion connector 108 and engage the apertures 4a and 4b on opposite sides of the computer's I/O connector 4 in advance of the expansion connector 108 engaging the computer's I/O connector 4. As is discussed in detail below, by operation of a sliding expansion connector drive mechanism 118, the expansion connector 108 simultaneously with the pair of guide pins or arms 116a, 116b (hereinafter "guide arms") on either side of the expansion connector 108 are together moved inward from the presentation surface 106 (in the direction indicated by arrow 120) across the bearing surface 104 toward the opposing open jaw 112 of the receiver structure 110 in a manner such that the pair of guide arms 116a, 116b are fitted individually in the recesses of the respective interface apertures 4a, 4b the rear face 2d of the computer casing 2 in advance of connection of the connector 108 with the computer's I/O connector 4. Such engagement of the guide arms 116a, 116b with the respective interface apertures 4a, 4b presses the pair of guide arms 116a, 116b against the respective interface apertures 4a, 4b in the rear face 2d of the computer casing 2, which in turn pushes the front face 2c toward the receiver structure 110 and the tongue 2g into its open jaw 112. Additionally, the mating of the guide arms 116a, 116b within the respective computer casing interface apertures 4a, 4b resist sideways slippage along the bearing surface 104 parallel of the connector presentation surface 106. More importantly, the mating of the guide arms 116a, 116b within the respective computer casing interface apertures 4a, 4b resists separation of the computer casing's bottom face 2a from the bearing surface 104 so that the two engaging pins 114a, 114b within the respective locating holes 6a, 6b more effectively resist both lateral and longitudinal slippage of the computer casing 2 relative to the bearing surface 104.

Furthermore, the expansion connector 108 includes a quantity of pin receptors or pins (shown) 122 organized in a selected pattern to engage the pins or pin receptors 4c of the computer's I/O connector 4. Accordingly, such engagement of the guide arms 116a, 116b on either side of the expansion connector 108 with the respective interface apertures 4a, 4b also fine tunes the positioning of pin receptors or pins (shown) 122 of the expansion connector 108 relative to the pin receptors (or pins) 4c of the computer's I/O connector 4, whereby operation of the expansion connector drive 118 causes the expansion connector 108 to engage the computer's I/O connector 4, and engages the pins (or pin receptors) 122 with the pin receptors (or pins) 4c.

Thus, the three-part computer securing means includes the receiver structure 110 fixed adjacent the front portion 111 of the bearing surface 104, the engaging pins 114a and 114b fixed on the rear face 115 of the bearing surface 104, and the guide arms 116a, 116b on either side of the expansion connector 108, which operate together to retain the computer's I/O connector 4 on the rear face 2d of the casing 2 in uninterrupted engagement with the docking station's expansion connector 108.

However, the guide arms 116a, 16b on either side of the expansion connector 108 might interfere with seating the computer casing 2 against the bearing surface 104, so a sensing means 123 is optionally provided for sensing that the computer's casing 2 is emplaced on the docking station's bearing surface 104 with its I/O connector 4 positioned to receive the docking station's expansion connector 108. For example, the optional sensing means 123 may be provided in the form of safety catch 124 having a stem or button that cooperates with the expansion connector drive 118 to detect presence of the computer 1 against the bearing surface 104. As discussed herein below, if present, the sensing means 123 is an optional safety mechanism that prevents the expansion connector drive 118 from being operated unless the computer casing 2 is firmly seated against the bearing surface 104 of the docking station upper body portion 102a, which depresses the safety catch 124. Thus, the docking station 100 optionally senses the presence of the computer 1 when installation of the casing 2 causes depression of the safety catch 124, if present. By requiring previous operation of the safety catch 124, if present, the expansion connector 108 cannot be deployed until the computer's I/O connectors is positioned to receive it. Accordingly, neither the guide arms 116a, 116b nor the expansion connector 108 can interfere with seating the computer casing 2.

Furthermore, while the computer casing 2 is being seated, the expansion connector 108 remains tucked safely away in a home position on the sidelines of the bearing surface 104. For example, the expansion connector 108 is protected in a disengaged "safe" position within an integral housing portion 126 of the casing upper body 102a positioned at the rear 115 of the bearing surface 104, where the expansion connector 108 is out of harm's way during seating of the computer casing 2. By example and without limitation, the housing 126 extends above the bearing surface 104 and is formed with a cavity 128 that is extended rearward of the bearing surface 104. The cavity 128 is sized to hold the expansion connector 108 on a connector bracket 130 having guide arms 116a, 116b projected therefrom on either side of the expansion connector 108. The bracket 130, together with the expansion connector 108 and guide arms 116a, 116b on either side thereof, is movable (as indicated by arrow 120) by operation of the expansion connector drive mechanism 118 out of the cavity 128 and inward of the bearing surface 104 through an opening 132 formed in the presentation surface 106 of the housing 126.

The docking station 100 of the present invention optionally includes a locking latch mechanism 134 for constraining the expansion connector drive mechanism 118 relative to the upper body portion 102a of the docking station 100. Accordingly, the locking latch mechanism 134 constrains the bracket 130 having the expansion connector 108 and guide arms 116a, 116b in a deployed position, the deployed position having the expansion connector 108 outside the cavity 128 and extended over the bearing surface 104.

As a result, the expansion connector 108 of the docking station 100 is connected to the computer's I/O connector 4. Additionally, the computer 1 cannot be removed from engagement with the docking station 100 because the guide arms 116a, 116b engaging the interface apertures 4a, 4b cooperate with the receiver structure 110 engaging the computer casing's tongue 2g, and the locating pins 114a and 114b engaging the mating locating holes 6a and 6b in the bottom surface 2a of the computer casing 2 to secure the computer 1 relative to the connector presentation surface 106 and the bearing surface 104, respectively, of the docking station apparatus 100. The locking latch mechanism 134 ensures the expansion connector drive mechanism 118 cannot be dislodged so that the guide arms 116a, 116b continue to engage the interface apertures 4a, 4b, even if the expansion connector drive mechanism 118 is attempted to be dislodged, either accidentally or intentionally.

In removing the computer from the docking station apparatus 100 of the invention, the expansion connector drive mechanism 118 is reversed to move the expansion connector 108 away from the computer rear surface 2d, whereby the expansion connector 108 is disconnected from the computer's I/O connector 4, and the guide arms 116a, 116b are disengaged from the respective interface apertures 4a, 4b. The computer casing 2 can be rotated about the tongue 2g so that the bottom surface 2a of the casing 2 is disengaged from the bearing surface 104, and the computer 1 is disengaged from the docking station 100.

According to one embodiment of the docking station 100 of the invention, the expansion connector 108 is optionally loosely mounted on the bracket 130 with a little lateral play such that the expansion connector 108 is permitted to move relative to the bracket 130 and its pin receptors or pins (shown) 122 wiggle or "float" into final mating positions with the respective pin receptors (or pins) 4c of the I/O connector 4 after the guide arms 116a, 116b have established a nominal docking position, as in the prior art. Thus, the guide arms 116a, 116b with the respective interface apertures 4a, 4b fine tunes the positioning of the pins (or pin receptors) 122 of the expansion connector 108 relative to the pin receptors (or pins) 4c of the computer's I/O connector 4 prior to final insertion.

Alternatively, the expansion connector 108 is optionally securely mounted on the bracket 130 without appreciable lateral play such that the expansion connector 108 is not permitted to move relative to the bracket 130 and its pin receptors or pins (shown) 15a do not wiggle or float into final mating positions with the respective pin receptors (or pins) 4c of the I/O connector 4. Rather, as discussed herein below, the expansion connector drive mechanism 118 provides sufficient lateral play that, the guide arms 18a, 18b operate to establish both a nominal docking position and a final insertion position of the expansion connector 108 relative to the computer's I/O connector 4. Thus, the complexity of the prior art bracket 18, as discussed herein above, is eliminated, while the positioning function is maintained as a feature of the expansion connector drive mechanism 118 of the invention.

Optionally, hand clearances 137 communicate with either side of the docking station's computer bearing surface 104 for access to the bottom surface 2a of the computer 1 for lifting it free of the bearing surface 104 and the guide pins 114a, 114b projected therefrom. By example and without limitation, the hand clearances 137 are provided as indentations in the upper body portion 102a and optionally in the lower body portion 102b as well. The hand clearances 137 are located near the connector presentation surface 106 and the guide pins 114a, 114b for more easily lifting the computer 1 clear of the guide pins 114a, 114b and the jaw 112 of the receiver structure 110 opposite.

Additionally, an edge recess 139 communicates with the docking station's computer bearing surface 104 and one side of the upper body portion 102a for storing a novel display unit support 142 that is structured for supporting the computer's flat display unit 9.

Additionally, as discussed herein below and more clearly illustrated in subsequent figures, the docking station's expansion connector 108 is electrically coupled to a plurality of peripheral device connectors 136a, 136b through 136n provided by example and without limitation on a peripheral device connector presentation surface 138 of the lower body portion 102b. For example, the lower body portion 102b includes an integral rear housing 140 having the presentation surface 138 provided thereon.

According to one embodiment of the invention, the docking station 100 includes a novel display unit support 142 structured for supporting the computer's flat display unit 9 in any convenient orientation relative to the keyboard 7 on the computer's top face 2b.

Figure 6:
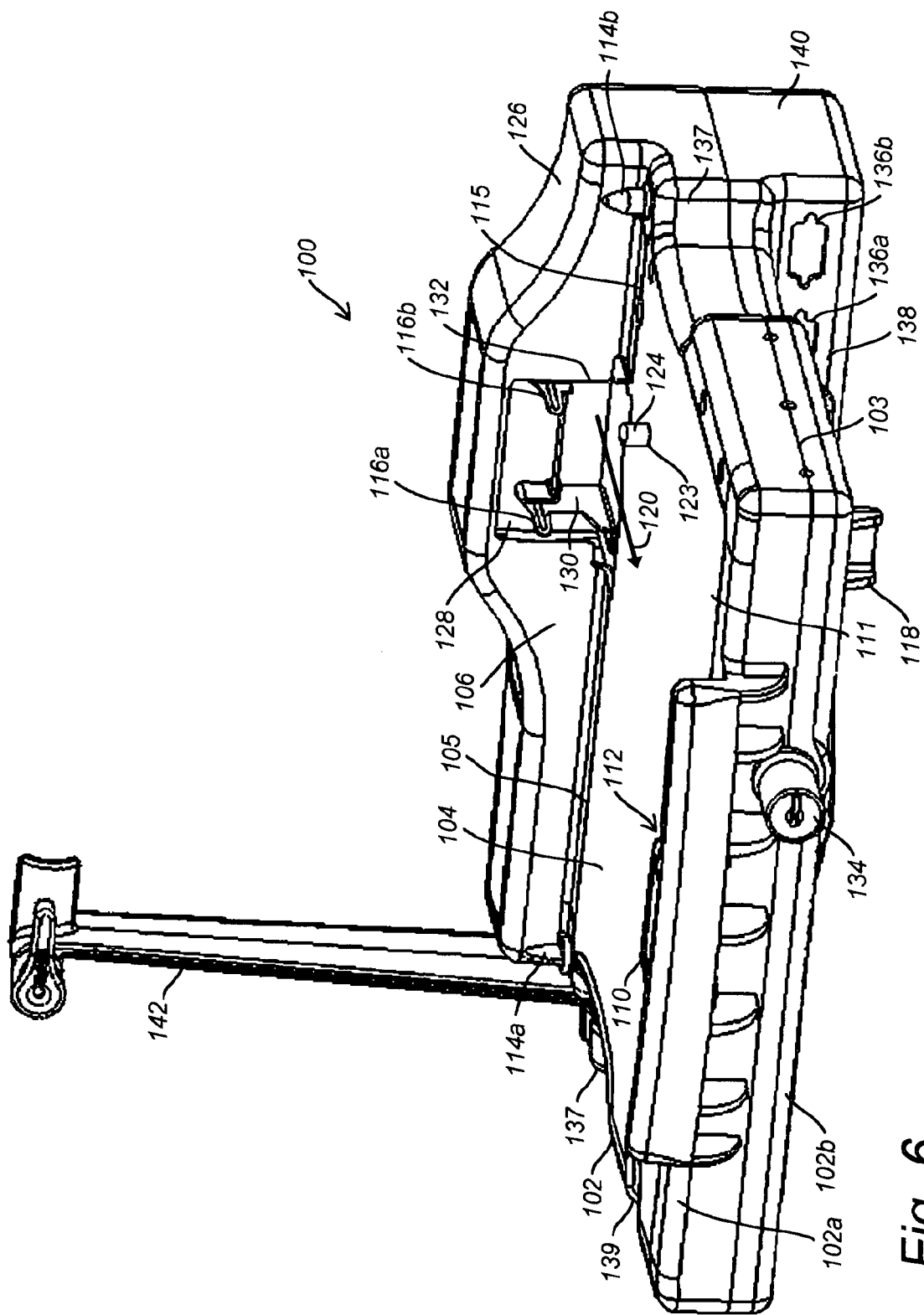
FIG. 6 is a front perspective view that illustrates the novel docking station of the invention.

FIG. 6 is a front perspective view that illustrates the present invention embodied by example and without limitation as a the docking station 100. Here, for clarity the bracket 130 having only the guide pins 116a, 116b projected therefrom, without the expansion connector 108.

Figure 7:
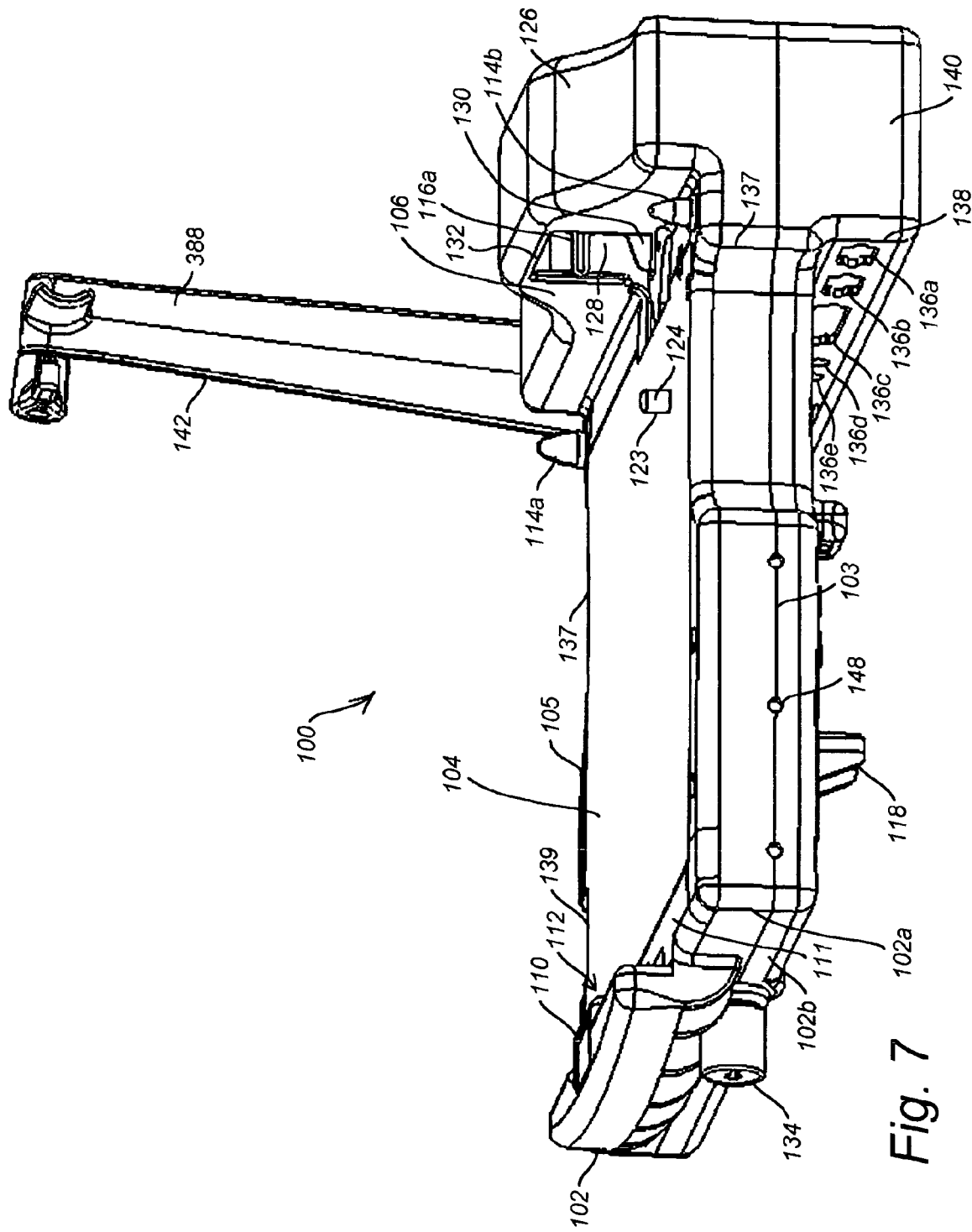
FIG. 7 is a side perspective view that illustrates the novel docking station of the invention.

FIG. 7 is a side perspective view that illustrates the present invention embodied by example and without limitation as a the docking station 100. Here, for clarity the bracket 130 having only the guide pins 116a, 116b projected therefrom, without the expansion connector 108.

Figure 8:
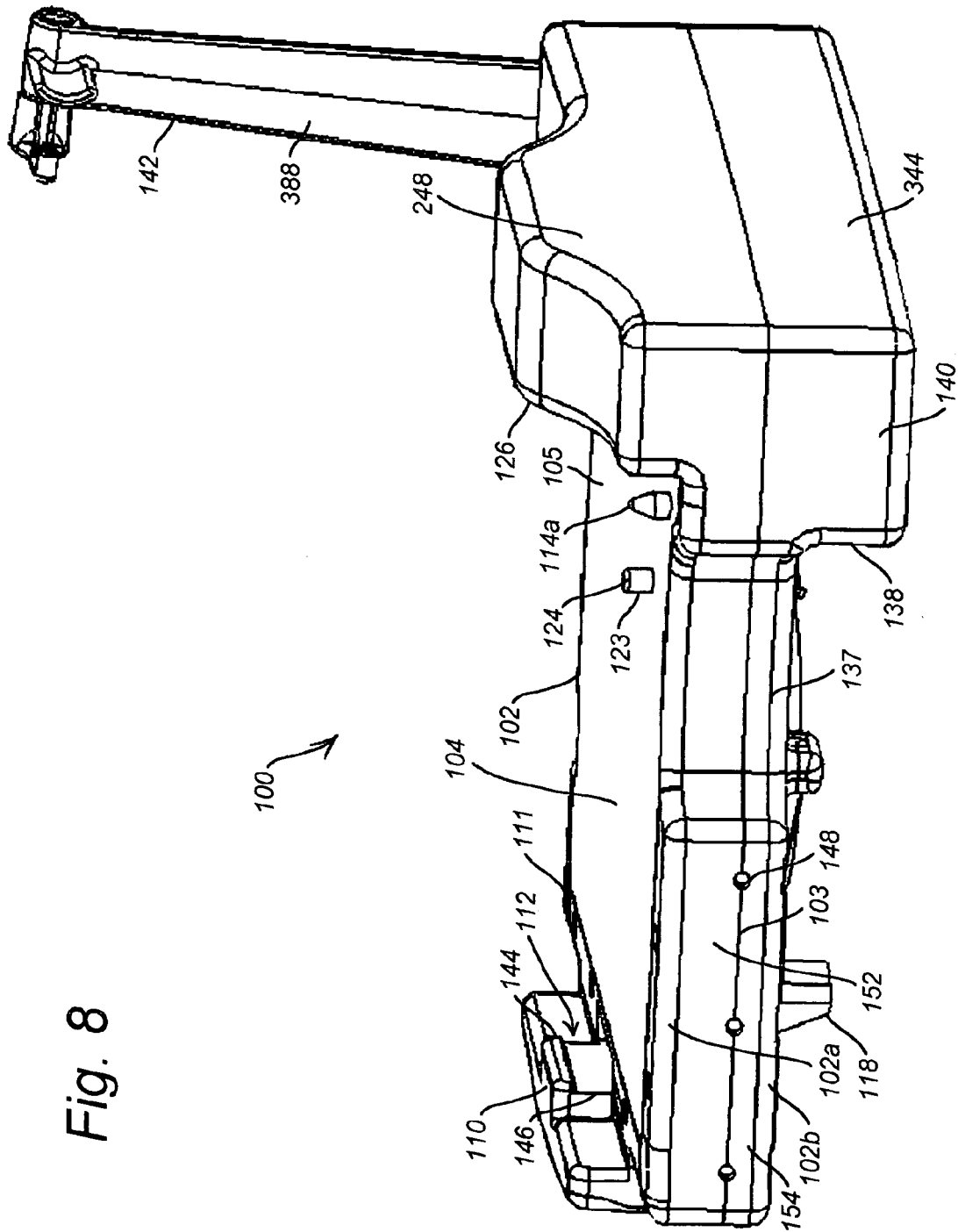
FIG. 8 is another side perspective view that illustrates the novel docking station of the invention.

FIG. 8 is another side perspective view that illustrates the present invention embodied by example and without limitation as a the docking station 100. Here, the receiver structure 110 is more clearly illustrated as having the open jaw structure 112 formed between the front portion 111 of the bearing surface 104 and an upper lip 144 which engages the top face 2b of the computer casing 2, while the front portion 111 of the bearing surface 104 engages the computer casing bottom face 2a. A recessed throat portion 146 of the receiver structure's jaw 112 is set back between the front portion 111 of the bearing surface 104 and the upper lip 144. The recessed throat portion 146 of the jaw 112 engages the front face 2c of the computer casing 2.

Here also are illustrated a plurality of edge mounting holes 148 formed along the mutual contact line 103 which also operates as a separation line between the upper and lower body portions 102a, 102b of the docking station's two-piece body 102. As discussed herein below, the edge mounting holes 148 each provide novel means for holding a square- or hex-head screw with its threaded shaft extending out of the respective mounting hole 148 substantially parallel with the bearing surface 104 and perpendicular to respective side faces 152 and 154 of the upper and lower body portions 102a, 102b. Any external device can be threadedly attached to the body 102 by means of a nut threaded to the extended shaft of the screw.

Figure 9:
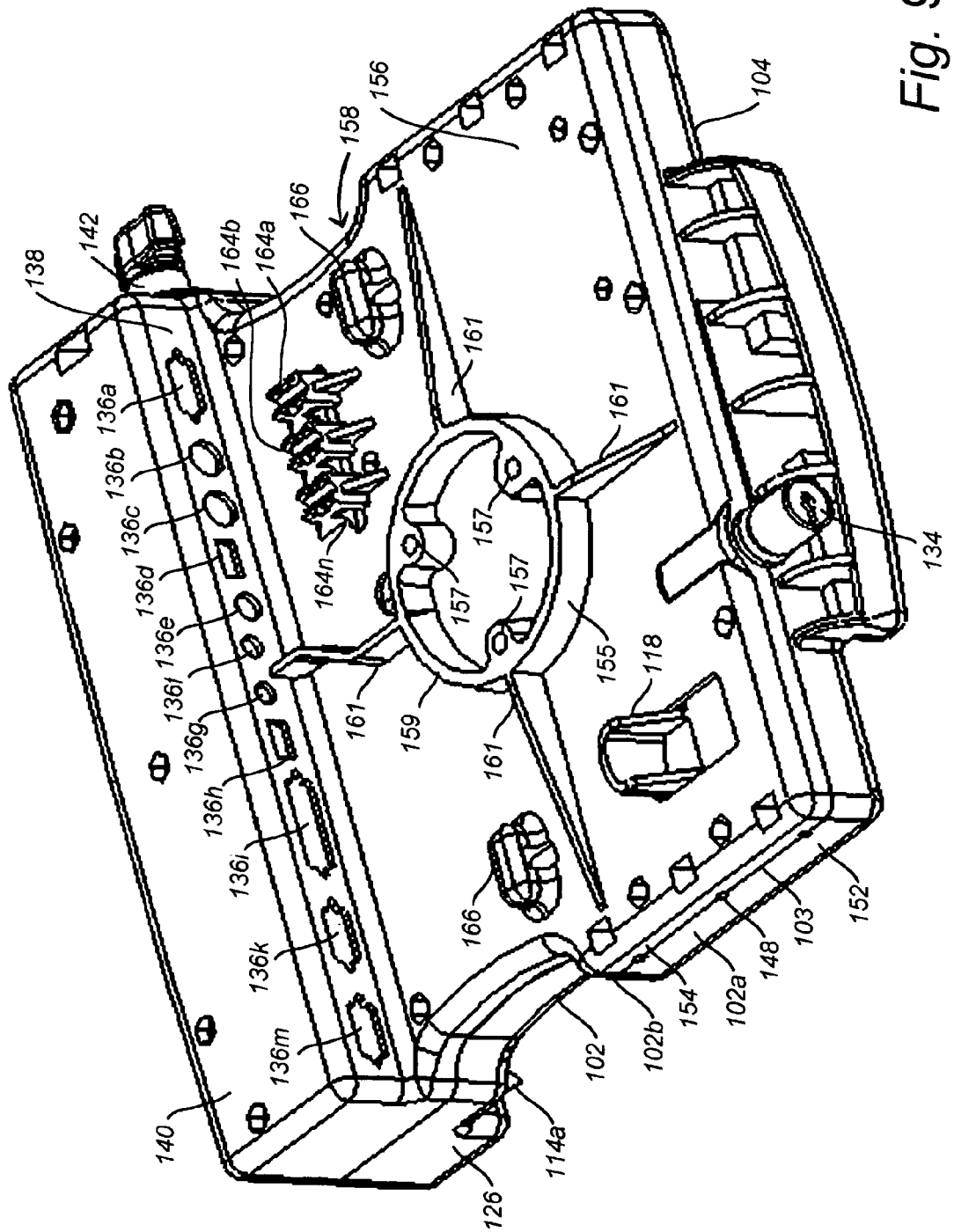
FIG. 9 is a bottom perspective view of the novel docking station of the invention.

FIG. 9 is a bottom perspective view of the docking station 100 of the invention that includes a mounting structure 155 that is structured to adapt the docking station 100 for mounting to an external support structure, by example and without limitation, the universally positionable device invented by the inventor of the present invention and disclosed in U.S. Pat. No. 5,845,885, which is incorporated herein by reference. By example and without limitation, the mounting structure 155 is provided as a plurality of mounting holes 157 projected from a bottom plane 156 of the lower body portion 102b within an integral ring 159 with optional supports 161 formed as elongated gussets integrally structured between the bottom plane 156 and the ring 159. Other mounting structures 155 are also contemplated and may be substituted without departing from the spirit and scope of the invention.

This view further illustrates the peripheral device connector presentation surface 138 of the lower body portion 102b having the a plurality of peripheral device connectors 136a, 136b through 136n, including by example and without limitation, a video display output 13a, a mouse connection 136, a keyboard connection 136c, USB (Universal Serial Bus) connection 136d, an external power supply connection 136e, an audio output 136f, a microphone input 136g, a modem 136h, serial connections 136j and 136k, and a parallel connection 136m. These peripheral device connectors 136a-136n are electrically coupled to the docking station's expansion connector 108, as discussed herein. As illustrated here, the peripheral device connector presentation surface 138 is projected from the bottom plane 156 of the lower body portion 102b and is optionally oriented substantially perpendicular thereto. Therefore, the peripheral device connectors 136a-136n face across the bottom plane 156 of the lower body portion 102b and are protected by the integral rear housing 140.

Additionally illustrated here is an external wire harness support 158 that provides strain relief to a plurality of connections between the peripheral device connectors 136a-136n and connectors 160 on a wiring harness 162, as illustrated in subsequent figures. By example and without limitation, the external wire harness support 158 includes one or more individual cable supports 164a, 164b through 164n projected from the bottom plane 156 of the lower body portion 102b adjacent to the peripheral device connector presentation surface 138 on the integral rear housing 140. As illustrated, each of the one or more individual cable supports 164a-164n positioned in close proximity to one of the peripheral device connectors 136a-136n. Optionally, each of the individual cable supports 164a-164n is substantially aligned with one of the peripheral device connectors 136a-136n. Each of the individual cable supports 164a-164n provides strain relief for a cable connected to a respective one of the peripheral device connectors 136a-136n. The external wire harness support 158 further includes one or more gang cable supports 166 projected from the bottom plane 156 of the lower body portion 102b in a position spaced away from the group of individual cable supports 164a-164n, and optionally spaced away from the peripheral device connector presentation surface 138 as well. Optionally, one or more additional gang cable supports 166 are provided on the bottom plane 156 of the lower body portion 102b in positions that are spaced away from the peripheral device connector presentation surface 138 and spaced away from others of the peripheral device connectors 136j-136m.

Figure 10:
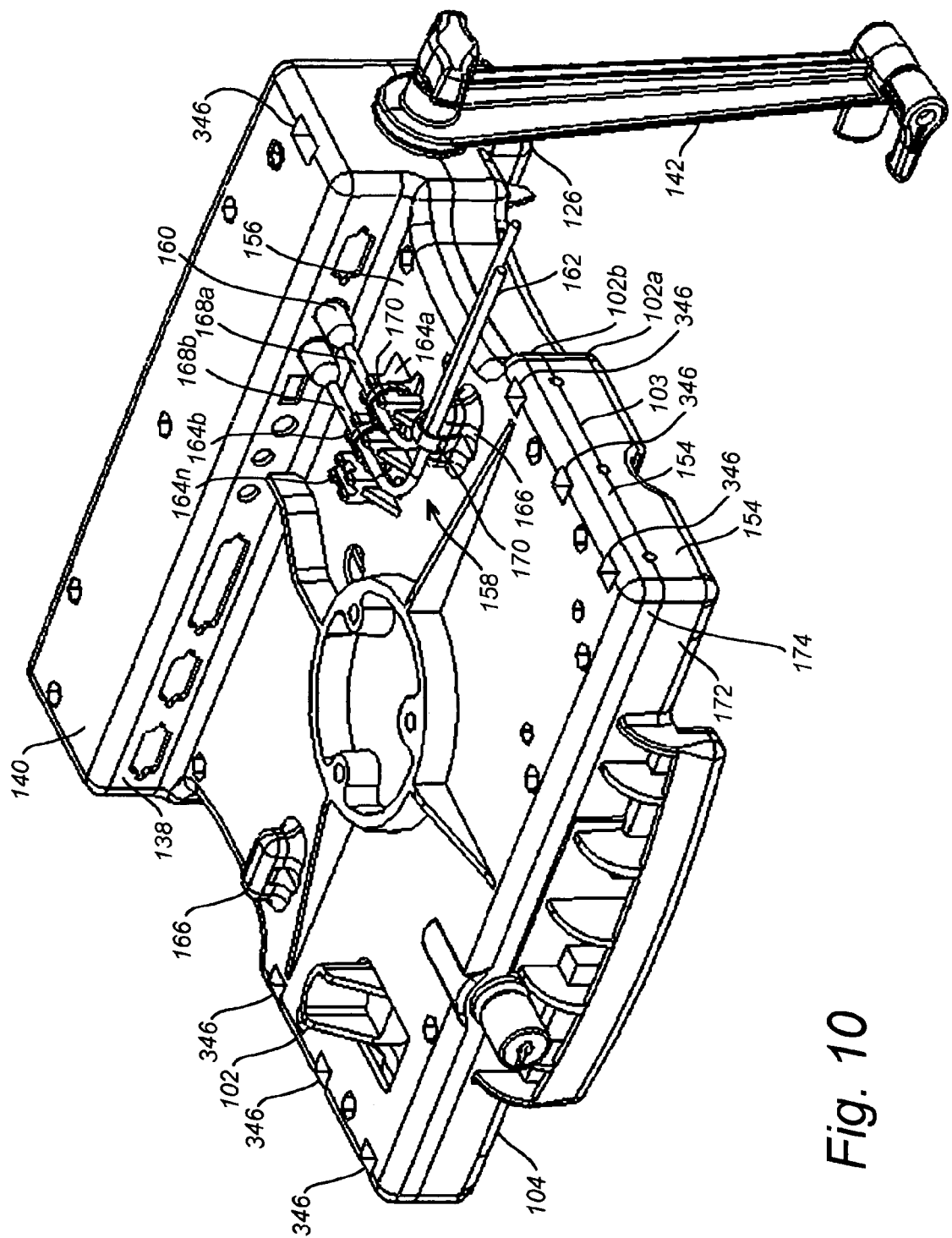
FIG. 10 is another bottom perspective view of the docking station of the invention.

FIG. 10 is another bottom perspective view of the docking station 100 of the invention that includes the wiring harness 162 having a plurality of individual cables 168 each having one of the connectors 160 coupled to a respective one of the peripheral device connectors 136a-136n presented on the peripheral device connector presentation surface 138 of the lower body portion 102b. For clarity and by example and without limitation, the wiring harness 162 is illustrated here having two individual cables 168a and 168b each having one of the connectors 160 coupled to one of the peripheral device connectors 136a-136n. The external wire harness support 158 of the invention is illustrated having wire ties 170 tying the individual cables 168a, 168b to respective individual cable supports 164a, 164b. Furthermore, another of the wire ties 170 straps a group or "gang" of the individual cables 168a, 168b to one of the gang supports 166. The wire ties 170 are any wire ties selected from a group of wire ties of various types that are generally well-known in the art. For example, the wire ties 170 may be plastic coated wires, plastic straps with a catch at one end that mates with teeth along one face, and other known wire ties.

Also illustrated are more of the edge mounting holes 148 formed along the mutual contact line 103 between the upper and lower body portions 102a, 102b of the docking station's two-piece body 102. Additional one or more of the edge mounting holes 148 are optionally formed along the mutual contact line 103 which extends between respective front faces 172 and 174 of the docking station's upper and lower body portions 102a, 102b.

Figure 11:
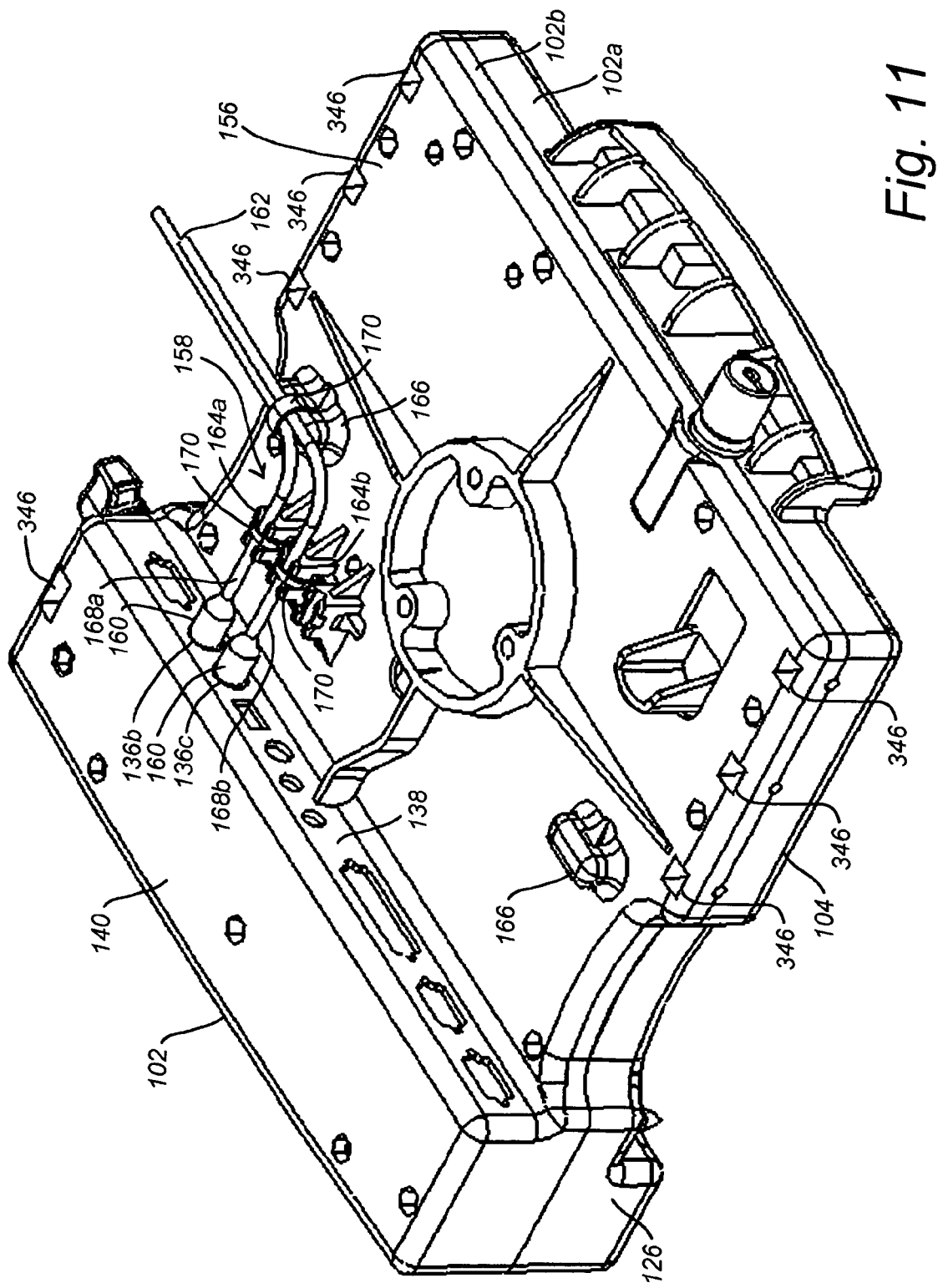
FIG. 11 is another bottom perspective view of the docking station of the invention.

FIG. 11 is another bottom perspective view of the docking station 100 of the invention that includes the wiring harness 162 having a plurality of individual cables each having one of the connectors 160 coupled to a respective one of the peripheral device connectors 136a-136n presented on the peripheral device connector presentation surface 138 of the lower body portion 102b. For clarity and by example and without limitation, the wiring harness 162 is illustrated here having two individual cables 168a and 168b each having one of the connectors 160 coupled to one of the peripheral device connectors 136b and 136c. The external wire harness support 158 of the invention is illustrated having wire ties 170 tying the individual cables 168a, 168b to respective individual cable supports 164a, 164b. Furthermore, another of the wire ties 170 straps a group or "gang" of the individual cables 168a, 168b to one of the gang supports 166. The wire ties 170 are any wire ties selected from a group of wire ties of various types that are generally well-known in the art. For example, the wire ties 170 may be plastic coated wires, plastic straps with a catch at one end that mates with teeth along one face, and other known wire ties.

Figure 12:
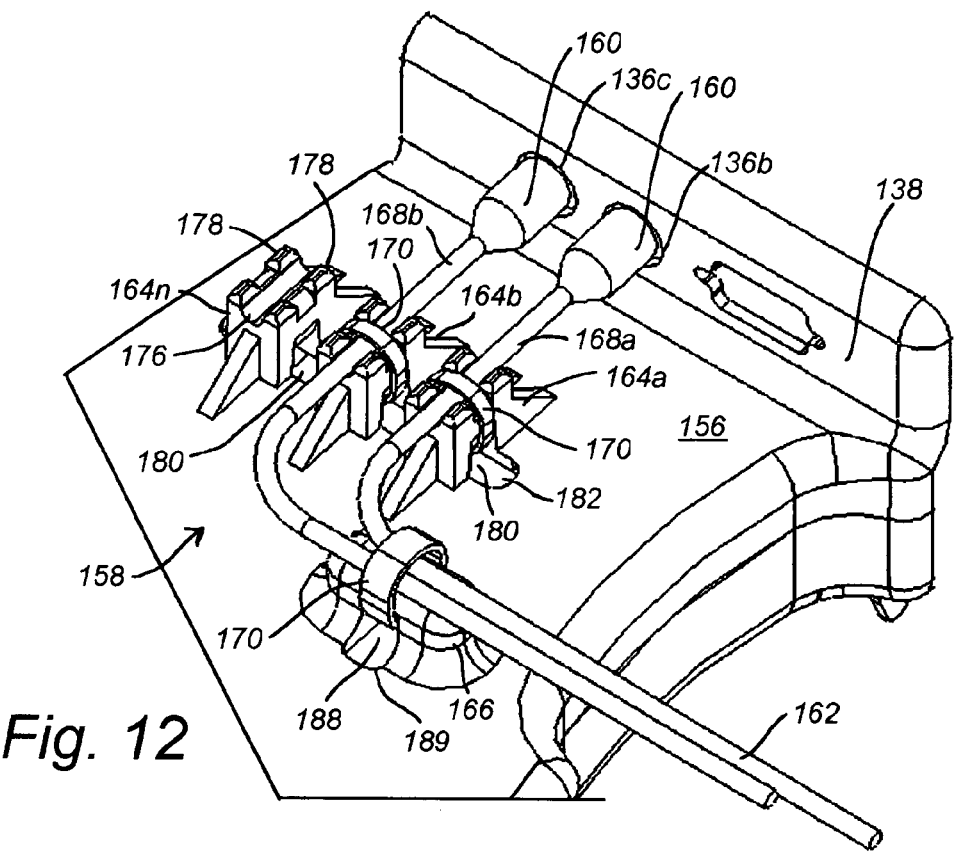
FIG. 12 is a close-up bottom perspective view of an external wire harness support of the invention of the docking station of the invention.

FIG. 12 is a close-up bottom perspective view of the docking station 100 of the invention that includes the wiring harness 162 having a plurality of individual cables 168 each having one of the connectors 160 coupled to a respective one of the peripheral device connectors 136a-136n presented on the peripheral device connector presentation surface 138 of the lower body portion 102b. For clarity and by example and without limitation, the wiring harness 162 is also illustrated here having two individual cables 168a and 168b each having one of the connectors 160 coupled to one of the peripheral device connectors 136a-136n. The external wire harness support 158 of the invention is illustrated having wire ties 170 tying the individual cables 168a, 168b to respective individual cable supports 164a, 164b. Furthermore, another of the wire ties 170 straps a group or "gang" of the individual cables 168a, 168b to one of the gang supports 166. The wire ties 170 are any wire ties selected from a group of wire ties of various types that are generally well-known in the art. For example, the wire ties 170 may be plastic coated wires, plastic straps with a catch at one end that mates with teeth along one face, and other known wire ties.

As also illustrated here with respect to the unoccupied individual cable 164n, each of the individual cable supports 164a-164n is formed with a valley 176 that is structured to securely receive the cable 168a, 168b thereinto. The valley 176 is spaced away from the bottom plane 156 of the lower body portion 102b to the extent that it is substantially aligned with the corresponding one of the peripheral device connectors 136a-136n on the presentation surface 138 of the lower body portion 102b such that the respective cable 168a-168n is substantially straight between the respective cable support 164a-164n and peripheral device connector 136a-136n. By example and without limitation, the valley 176 is optionally curved in a semi-tubular shape to conform to the typical round cable shape and sized to admit such cable. The cable support 164n is further shown to include wall portion 178 extended from either side of the curved valley 176 and substantially contiguous therewith and oriented tangentially therewith. The wall portions 178 are optionally crenellated as shown, or continuous.

Clearance is provided for the wire ties 170 between the valley 176 and the bottom plane 156 of the lower body portion 102b. By example and without limitation, the wire tie clearance is provided by a tunnel 180 that is extend under and completely through each of the individual cable supports 164a-164n directly below and slightly spaced away from the valley 176 and oriented crosswise of the valley 176. Optionally, a slight recess 182 is formed in the bottom plane 156 of the lower body portion 102b directly below the valley 176, such that the tunnel 180 is recessed into the bottom plane 156 of the lower body portion 102b directly below and slightly spaced away from the valley 176.

Figure 13:
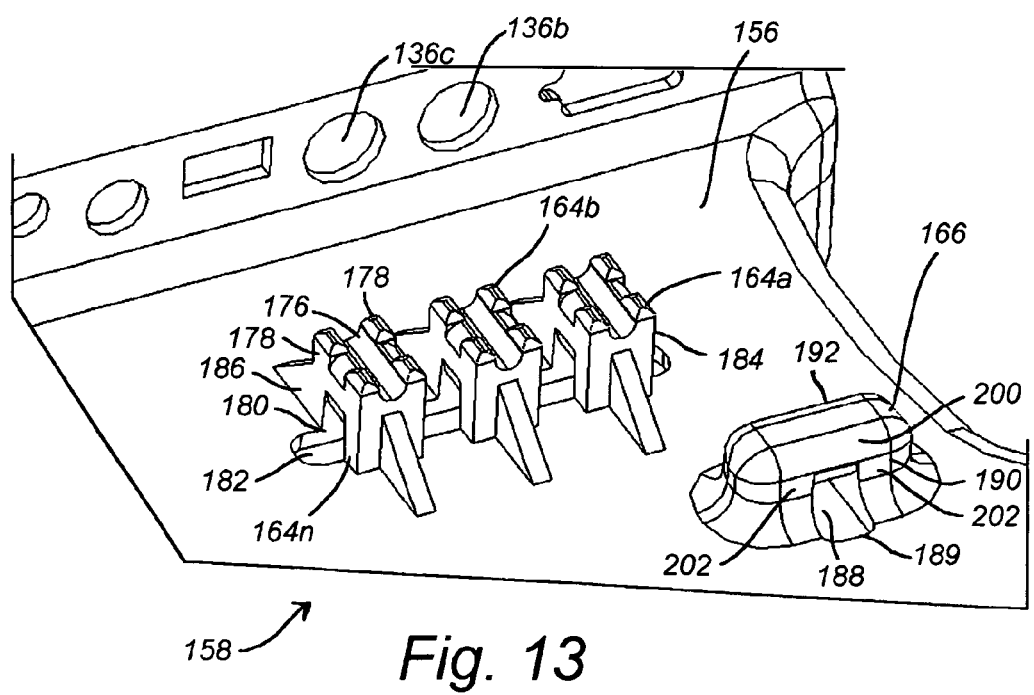
FIG. 13 is another close-up bottom perspective view of the external wire harness support of the invention.

FIG. 13 is another close-up bottom perspective view of the docking station's external wire harness support 158 of the invention without the wiring harness 162. As illustrated, the individual cable supports 164a-164n are each formed on the bottom plane 156 of the lower body portion 102b in a position that is spaced away from a corresponding one of the peripheral device connectors 136a-136n on the peripheral device connector presentation surface 138 of the lower body portion 102b. The valleys 176 are illustrated as being curved in a semi-cylindrical form that is substantially aligned with the corresponding peripheral device connectors 136a-136n on the peripheral device connector presentation surface 138. Additionally, the valley 176 portion of each cable support 164a-164n is illustrated with the wall portion 178 extended from either side thereof and substantially contiguous therewith and oriented tangentially therewith. The wall portions 178 are shown as being optionally crenellated, but the wall portions 178 are optionally continuous.

The tunnel 180 is illustrated here as an optional single common tunnel having the optional recess 182 extending under all of the individual cable supports 164a-164n and beyond them to either end 184 and 186.

The gang support 166 is illustrated as being formed with a substantial body portion 200 spaced from the bottom plane 156 of the lower body portion 102b on spaced apart legs 202 that are projected from the bottom plane 156. Furthermore, one of the gang supports 166 is illustrated as including a tunnel 188 formed thereunder and having an optional recess 189 recessed into the bottom plane 156 of the lower body portion 102b substantially crosswise thereof. Optionally, the tunnel 188 extends therebeyond to either side 190 and 192.

Figure 14:
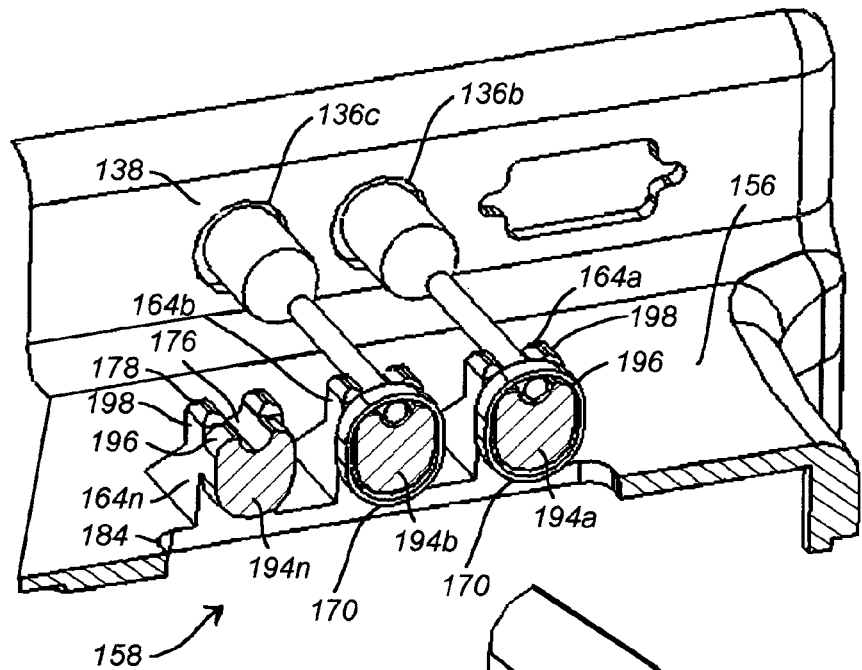
FIG. 14 is a cross-sectional view that shows novel cable supports of the external wire harness support of the invention.

FIG. 14 is a cross-sectional view that shows the cable supports 164a-164n of the external wire harness support 158 each being formed with a substantial body portion 194 projected from the bottom plane 156 of the lower body portion 102b. The valley 176 is formed in the body 194 distal of the bottom plane 156, and the crenellated wall portions 178 extended therefrom. The tunnel 180 is illustrated here as the optional single common tunnel having the optional recess 182 extending under all of the individual cable supports 164a-164n and beyond them to either end 184 and 186. Furthermore, the tunnel 180 is illustrated here as being formed completely through the bottom plane 156 of the lower body portion 102b.

The cables 168a, 168b are shown seated in the valleys 176 of the respective cable supports 164a, 164b of the docking station's external wire harness support 158. The cables 168a, 168b are secured in place by the wire ties 170 wrapped around the body portion 194a, 194b of the respective cable supports 164a, 164b. Furthermore, the wire ties 170 pass through embrasures 196 between spaced apart merlons 198 that form, the crenellated wall portions 178.

Figure 15:
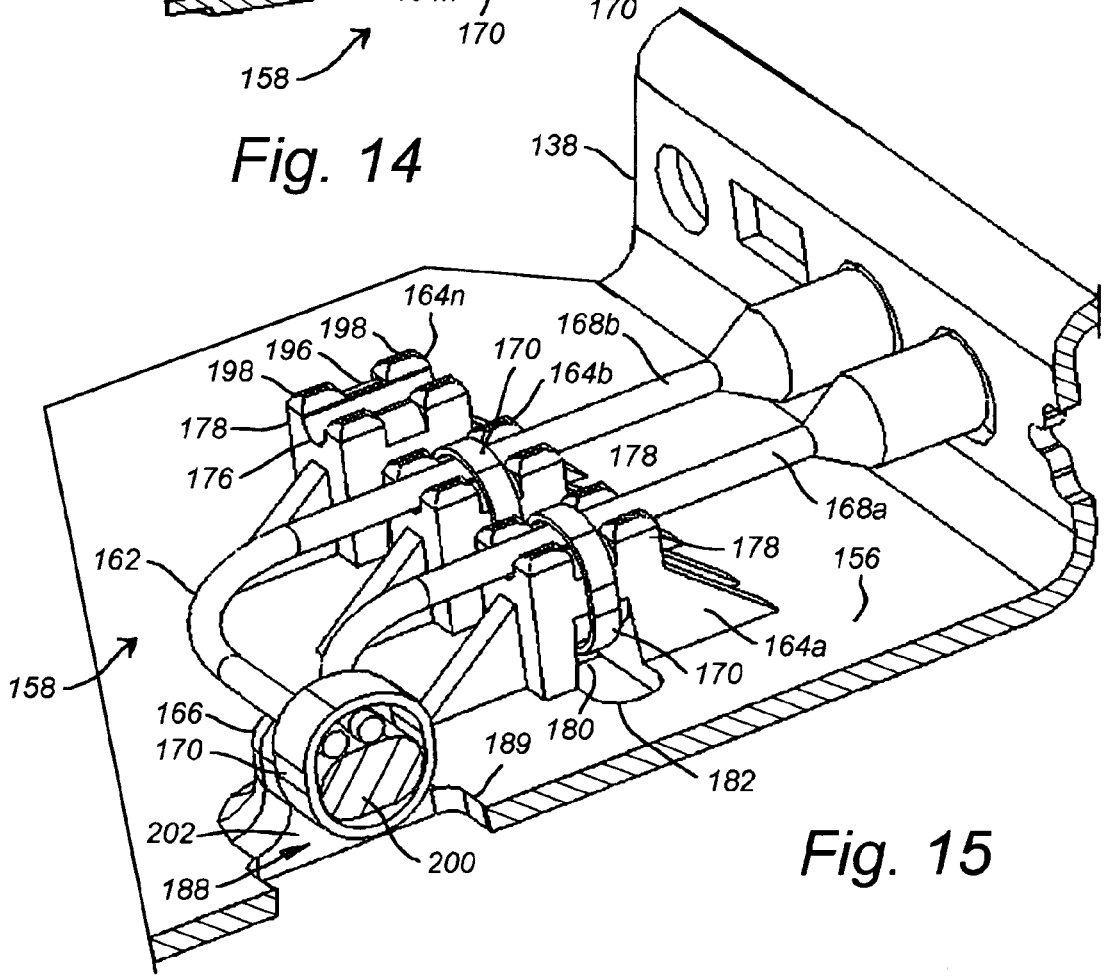
FIG. 15 is a perspective view of the external wire harness support of the invention illustrating a side view of the cable supports of the invention and an end cross-sectional view of one of a novel gang support of the invention.

FIG. 15 is a perspective view of the external wire harness support 158 that shows a side view of the cable supports 164a-164n and an end cross-sectional view of one of the gang supports 166 projected from the bottom plane 156 of the lower body portion 102b. The cables 168a, 168b are shown seated in the valleys 176 of the respective cable supports 164a, 164b and being secured in place by the wire ties 170 wrapped around the respective body portion 194a, 194b thereof. Furthermore, the wire ties 170 are shown passing through the embrasures 196 between the spaced apart merlons 198 that form the crenellated wall portions 178.

In the end cross-sectional view of the gang support 166, the gang support 166 is illustrated as being formed with the substantial body portion 200 that is projected from the bottom plane 156 of the lower body portion 102b on the spaced apart legs 202 (one shown, more clearly shown in FIG. 13). The cables 168a, 168b are gathered together and secured in place by a single wire tie 170 wrapped around the body portion 200. Furthermore, that form the crenellated wall portions 178. Optionally, the gang support 166 is substantially the same as the cable supports 164a-164n and includes the crenellated wall portions 178 spaced apart on either lengthwise side 190, 192 of the body portion 200 and formed distal of the bottom plane 156 of the lower body portion 102b, and the wire tie 170 pass through embrasures 196 between spaced apart merlons 198 of the crenellated wall portions 178.

Figure 16:
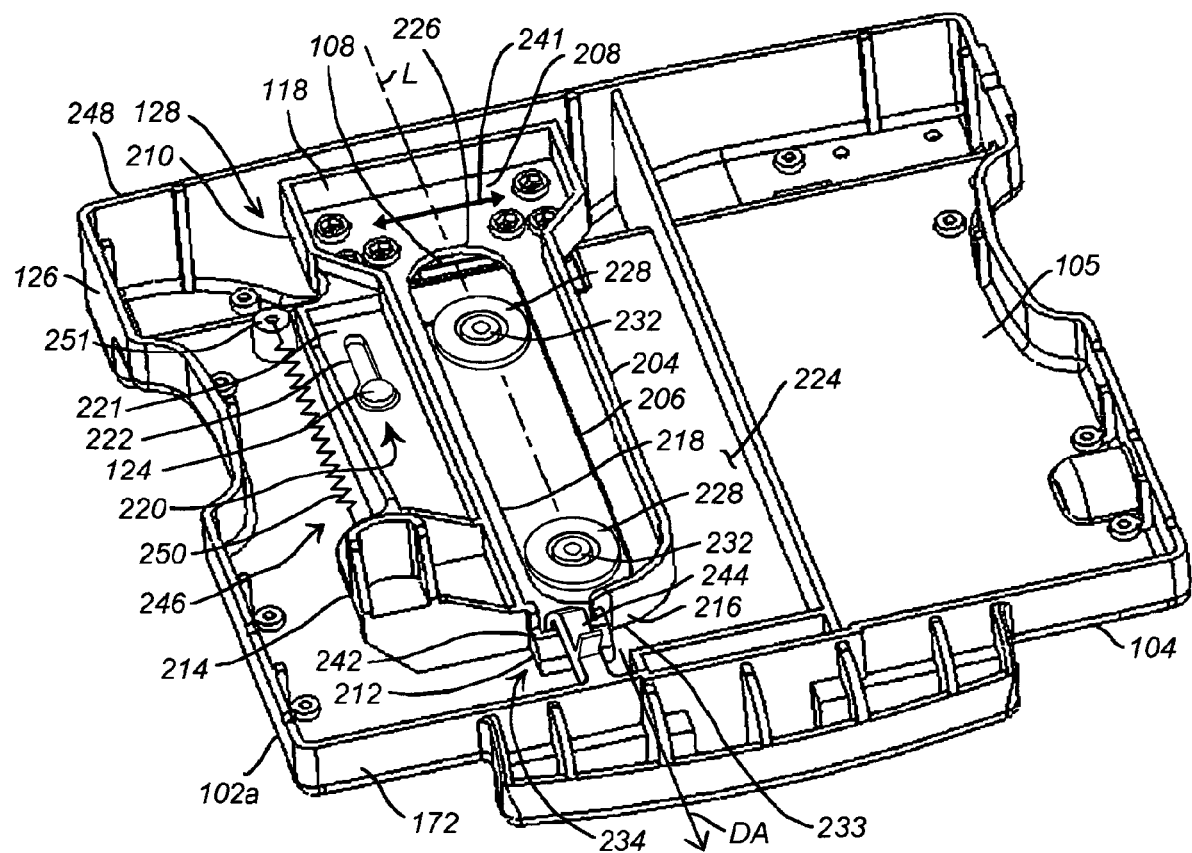
FIG. 16 is perspective view inside an upper body portion of the docking station of the invention and illustrates a novel expansion connector drive mechanism of the present invention as well as novel features of the upper body portion that operate with the expansion connector drive mechanism.

FIG. 16 is perspective view inside the upper body portion 102a and illustrates the expansion connector drive mechanism 118 of the present invention as well as features of the upper body portion 102a that operate with the expansion connector drive mechanism 118. By example and without limitation the expansion connector drive mechanism 118 is formed of a single-piece elongated frame 204 having a substantially planar interface surface 233 (shown in one or more subsequent figures). A follower mechanism 206 is provided by example and without limitation as an elongated lengthwise inner slot that extends substantially along a longitudinal axis L thereof for nearly the entire length of the frame 204 within a retention plate 207. An integral expanded connector seat 208 is positioned at a first distal or far end 210 of the frame 204 for mounting the expansion connector 108 thereon.

An inner surface 224 of the upper body portion's substantially rigid bearing plate 105 opposite from the bearing surface 104 includes a guide mechanism 226 that cooperates with the inner slot 206 to guide the frame 204 substantially along a drive axis DA that is substantially coincident with a longitudinal axis L of the slot 206. The inner slot follower mechanism 206 of the frame 204 thus cooperates with the guide mechanism 226 for moving the frame 204 across the inner surface 224 of the upper body portion 102a along the drive axis DA with the frame's substantially planar interface surface 233 moving substantially parallel with the inner surface 224 of the bearing plate 105. Here, the interior of the guide mechanism 226 is exposed for clarity. By example and without limitation, the guide mechanism 226 is formed by two guides 228 arranged on the upper body portion's inner surface 224 in spaced apart positions along the drive axis DA. Optionally the guides 228 are rotating disk guides formed as wheels or rollers that rotate about respective axles or hubs 232 provided on the upper body portion's inner surface 224. The axles or hubs 232 may be configured to space the rotating disk guides 228 slightly away from the upper body portion's inner surface 224 for easier rotation. By example and without limitation, the two guides 228 are optionally provided as one or more slides fixed to the inner surface 224 of the upper body portion 102a and permit the frame 204 to slide freely along the drive axis DA. As described herein below, the frame 204 is constrained relative to the guides 228 to move across the upper body portion's inner surface 224 along the drive axis DA.

When mounted on the connector seat 208 at the far end 210 of the frame 204, the expansion connector 108 fits within the cavity portion 128 of the housing 126 and extends above the bearing surface 104 of the upper body portion 102a. The frame 204 is moveable, either by sliding or rolling, in cooperation with the guide mechanism 226 across the inner surface 224 of the upper body portion 102a and along the drive axis DA.

The expansion connector drive mechanism 118 of the invention also provides a small amount of lateral play (indicated by arrow 241) such that the connector seat 208 is permitted to move laterally relative to the upper body portion's inner surface 224 and the bearing surface 104 on the opposite surface of the bearing plate 105 and substantially crosswise of the drive axis DA. For example, the follower mechanism or slot 206 fits with sufficient play on the guides 228 that the frame 204 is permitted sufficient lateral play along arrow 241 that lateral play the connector seat 208 permits the expansion connector 108 securely mounted thereon to move laterally relative to the bearing surface 104 of the upper body portion's bearing plate 105. Thus, although it is securely mounted on the bracket 130 without appreciable lateral play, the connector seat 208 actually has sufficient lateral play through the expansion connector drive mechanism 118 of the invention to establish both a nominal docking position of the expansion connector 108 relative to the computer's I/O connector 4 and a final insertion position of the pin receptors or pins (shown) 122 relative to the I/O connector's pin receptors (or pins) 4c. Thus, the complexity of the prior art bracket 18, as discussed herein above, is eliminated, while the positioning function is maintained as a feature of the expansion connector drive mechanism 118 of the invention.

An integral catch mechanism 212 and integral handle 214 are both positioned adjacent to a second proximal or near end 216 of the frame 204 opposite from the connector seat 208. The handle 214 may be provided, by example and without limitation, on one side 218 of the frame 204, while the catch mechanism 212 may be provided, by example and without limitation, at the near end 216. The catch mechanism 212 is structured to cooperate with the locking latch mechanism 134 for securely fixing the expansion connector drive mechanism 118 relative to the upper body portion 102a of the docking station 100 with the bracket 130 holding the expansion connector 108 and guide arms 116a, 116b on either side thereof in a deployed position, i.e., with the expansion connector 108 outside the cavity 128 and extended over the bearing surface 104. By example and without limitation, the frame's integral catch mechanism 212 includes a lip portion 242 of the that engages either the optional lock mechanism 134, or an alternative non-locking latch mechanism 244 (shown here), which is optionally substituted.

As illustrated here, the alternative non-locking latch mechanism 244 is substituted for the optional locking latch mechanism 134. The alternative non-locking latch mechanism 244 similarly constrains the expansion connector 108 to remain in the deployed position, as described herein. By example and without limitation, the alternative non-locking latch 244 is a flexible latch mechanism of the type illustrated in U.S. patent application Ser. No. 11/064,777 filed in the name of the inventor of the present invention on Feb. 23, 2005, which is incorporated herein in its entirety. Alternatively, when present, the optional locking mechanism 134 lockingly secures the expansion connector 108 in the deployed position.

The sensing means 123 is provided as a security mechanism 220 that is structured to cooperate with the safety catch 124 to resist deployment of the expansion connector 108 until the computer 1 is seated against the bearing surface 104 and the computer's I/O connector 4 is positioned to receive the expansion connector 108. By example and without limitation, the security mechanism 220 is provided in an integral security plate 221 formed, by example and without limitation, along the side 218 of the frame 204 and spaced away from the lengthwise inner slot 206, for example, between the connector seat 208 and the handle 214. The security mechanism 220 is provided as a keyhole 222 formed in the security plate 221, the keyhole 222 being structured for cooperating with the safety catch 124 such that, when the safety catch 124 is engaged with the keyhole 222, the frame 204 cannot be moved relative to the casing's upper body portion 102a. Furthermore, when the safety catch 124 is disengaged from the cooperating keyhole 222 in the security plate 221, the frame 204 is free to move along the longitudinal axis L.

The novel expansion connector drive mechanism 118 is operated by first depressing the safety catch 124 relative to the bearing surface 104 of the upper body portion 102a, for example by seating the bottom face 2a of the computer casing 2 against the bearing surface 104. Depressing the safety catch 124 simultaneously disengages the safety catch 124 of the security mechanism 220 from the cooperating keyhole portion 222 in the security plate 221, which thereby permits the frame 204 to move along the frame drive axis DA. The handle 214 of the expansion connector drive mechanism 118 is pulled along the drive axis DA toward the front face 172 of the casing's upper body portion 102a, which in turn pulls the expansion connector 108 and the guide arms 116a, 116b on either side thereof into the deployed position described herein, i.e., with the expansion connector 108 outside the cavity 128 and extended over the bearing surface 104. The lip portion 242 of the frame's integral catch mechanism 212 engages either the optional lock mechanism 134, or alternative non-locking latch mechanism 244 (shown here), which constrains the expansion connector drive mechanism 118 in the deployed position.

An optional retraction mechanism 246 is operated for retracting the expansion connector 108 from the deployed position by driving the frame 204 along the drive axis DA away from the upper body portion's front face 172 toward its rear face 248. By example and without limitation, the retraction mechanism 246 includes a resilient biasing mechanism 250, such as a tension spring (shown), that is coupled between the rear face 248 of the upper body portion 102a and the second or near end 216 of the frame 204 adjacent to the handle 214. The biasing mechanism 250 operates between the rear face 248 and the near end 216 of the frame 204 for pulling the frame 204 toward the rear face 248. The biasing mechanism 250 thereby operates to automatically retract the expansion connector 108 from the deployed position when the locking latch mechanism 134 or non-locking latch mechanism 244 (shown here) is operated to release the frame's integral catch mechanism 212. Alternatively, as illustrated, the spring 250 is coupled between a stanchion 251 near the rear face 248 and the near end 216 of the frame 204 for retracting the expansion connector 108.

Furthermore, the resilient biasing mechanism or tension spring 250 being mounted on one side 218 of the frame 204 offset of the drive axis DA provides leverage to the force applied by the spring 250. Therefore, the spring 250 also biases the frame 204 on the guides 228 relative to the upper body portion's inner surface 224 crosswise of the drive axis DA. Accordingly, the spring 250 also pulls the inner slot 206 of the frame 204 against the guides 228 so that the connector seat 208 and the expansion connector 108 securely mounted thereon are biased laterally relative to the upper body portion's inner surface 224 and the bearing surface 104 on the opposite surface of the bearing plate 105 and substantially crosswise of the drive axis DA. The lateral bias provided by the offset biasing mechanism 250 stabilizes the expansion connector 108 relative to the computer's I/O connector 4 for reducing effects on the interconnection of shocks and vibrations experienced by the docking station 100. The novel expansion connector drive mechanism 118 of the invention thus further improves the interconnection of expansion connector 108 with the computer's I/O connector 4 over the prior art docking station's expansion connector 15, as discussed above.

As disclosed herein, the safety catch 124 will not interfere with the retraction mechanism 246 retracting the frame 204. However, another biasing mechanism 252 (shown in subsequent figures) operates to reset the sensing means for sensing that the computer's casing 2 is emplaced on the docking station's bearing'surface 104 before the expansion connector drive 118 can be operated.

Figure 17:
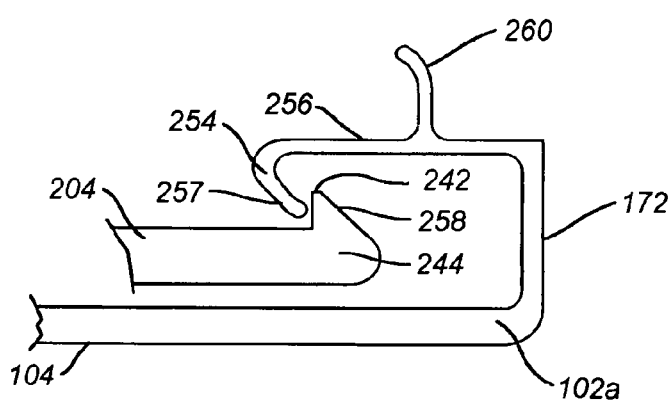
FIG. 17 illustrates the alternative non-locking latch mechanism by example and without limitation as a flexible latch mechanism useful with the novel expansion connector drive mechanism of the present invention.

FIG. 17 illustrates the alternative non-locking latch mechanism 244 by example and without limitation as a flexible latch mechanism of the type illustrated in U.S. patent application Ser. No. 11/064,777, which is incorporated herein in its entirety, for latching the expansion connector 108 in the deployed position. As illustrated here by example and without limitation the alternative non-locking latch mechanism 244 includes a tooth 254 positioned at one end of a flexible arm 256 that is integrally (shown) or separately attached at its opposite end to the upper body portion 102a, such as to the front face 172 thereof. Inclined surfaces 257 and 258 cooperate to allow the to tooth 254 to automatically engage the lip portion 242 of the frame's integral catch mechanism 212 when the frame 204 is moved into the position for deploying the expansion connector 108, i.e., when the near end 216 of the frame 204 is pulled close to the front face 172 of the upper body portion 102a. A handle 260 is provided on the flexible arm 256 or another part of the alternative non-locking latch mechanism 244 for disengaging the tooth 254 from the frame's lip portion 242, which releases the frame 204 for retracting the expansion connector 108 from the deployed position.

Figure 18:
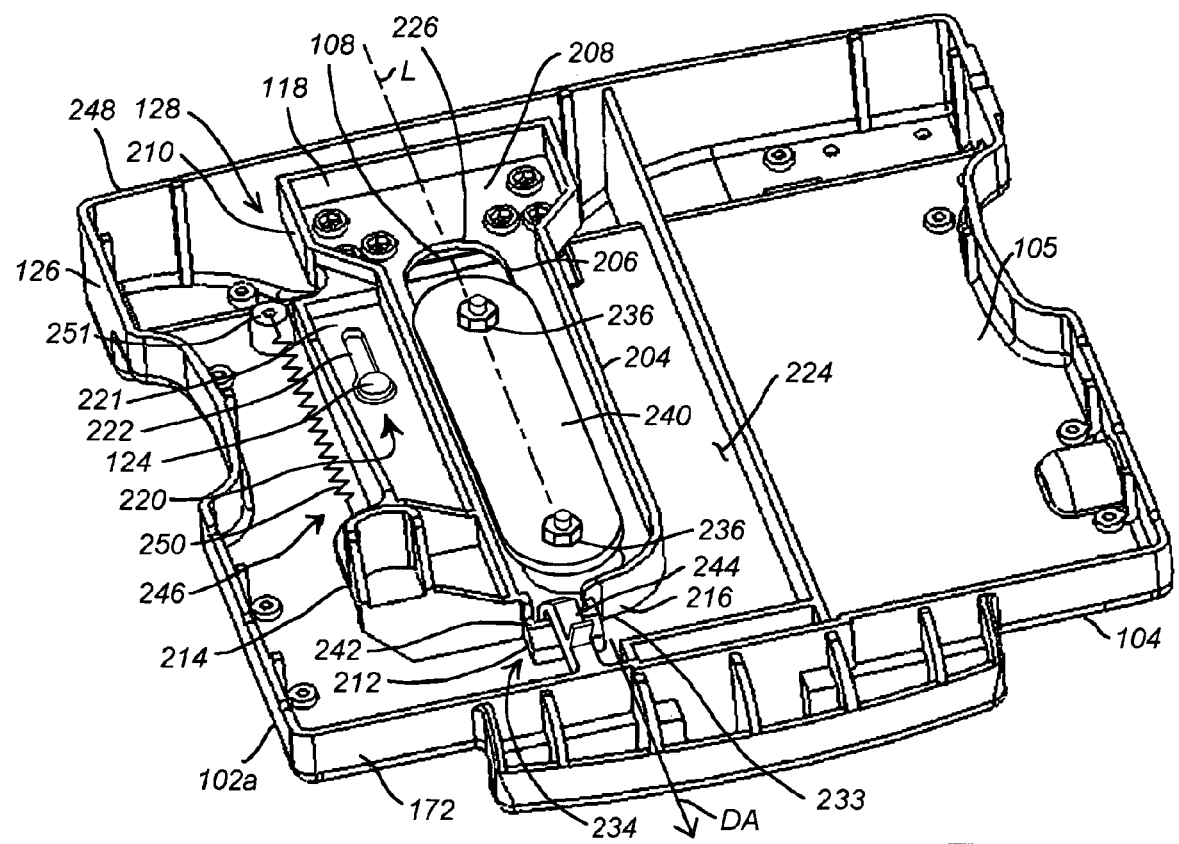
FIG. 18 illustrates a novel guide mechanism of the invention that cooperates with a novel frame portion of the novel expansion connector drive mechanism of the present invention.

FIG. 18 illustrates the guide mechanism 226 that cooperates with the inner slot 206 to guide the frame 204 substantially along the drive axis DA. As discussed above, the frame 204 is constrained to move along the two guides 228 relative to the upper body portion's inner surface 224 along the drive axis DA. Here, by example and without limitation one or more keepers 240 are secured to the upper body portion's inner surface 224 by one or more fasteners 236 for constraining the frame 204 to move along the drive axis DA. The one or more keepers 240 also operate to constrain the guide discs 228, when present, in a position for cooperating with the inner slot 206 of the frame 204. Other structures for the guide mechanism 226 are also contemplated and may be substituted without deviating from the scope and intent of the present invention. For example, the one or more keepers 240 are provided by a pair of disk-shaped keepers, i.e., flat washers, that are secured to the upper body portion's inner surface 224 by the fasteners 236 for constraining the frame 204 to move along the drive axis DA.

Figure 19:
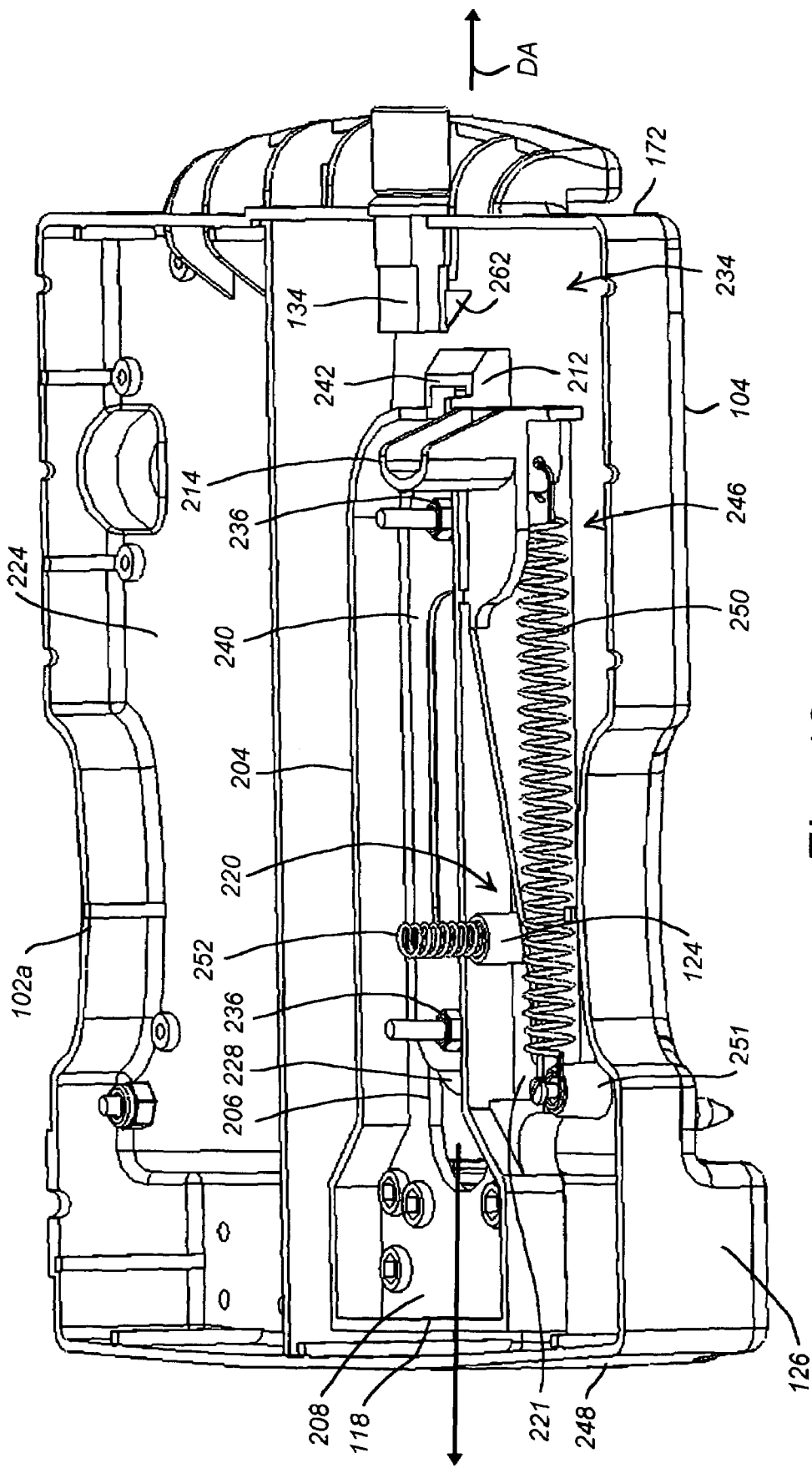
FIG. 19 illustrates the expansion connector drive mechanism of the present invention as well as novel features of the upper body portion that operate with the expansion connector drive mechanism.

FIG. 19 illustrates the expansion connector drive mechanism 118 of the present invention as well as features of the upper body portion 102a that operate with the expansion connector drive mechanism 118. Here, the frame 204 is shown adjacent to the rear face 248 of the upper body portion 102a with the expansion connector 108 retracted from its deployed position. However, the security mechanism 220 is disengaged by having the safety catch 124 disengaged from the cooperating keyhole 222 in the security plate 221 so that the frame 204 is free to move along the drive axis DA. As illustrated here, the biasing mechanism 252 is shown as a compression spring that operates between the safety catch 124 and, for example, an inner surface 253 of the lower body portion 102b (omitted here for clarity, shown in a subsequent figure) to drive the safety catch 124 into security plate 221 and reset the docking station's computer sensing means.

Figure 20:
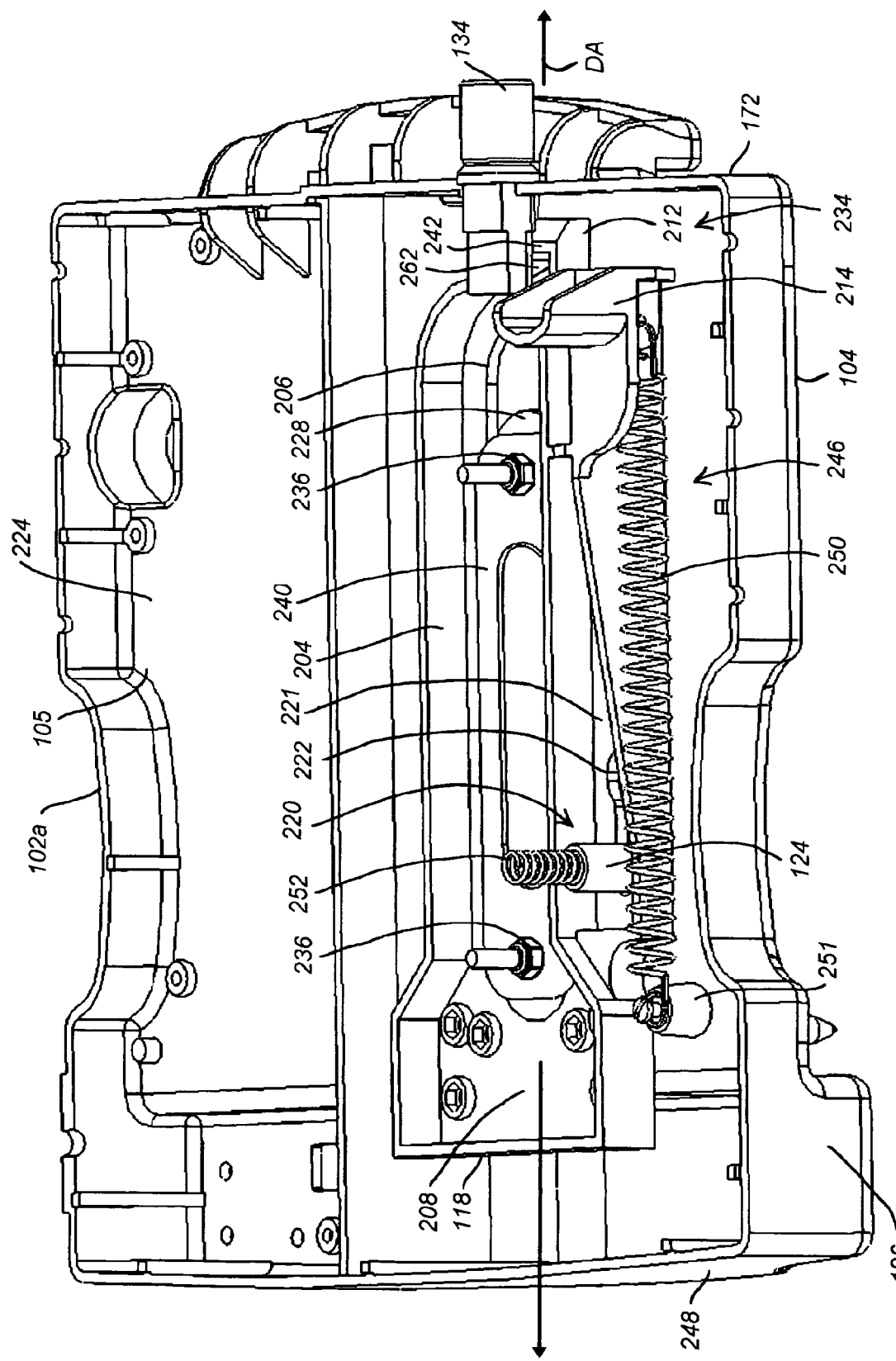
FIG. 20 illustrates the expansion connector drive mechanism of the present invention in a deployed position.

FIG. 20 illustrates the expansion connector drive mechanism 118 of the present invention with the frame 204 is shown adjacent to the front face 172 of the upper body portion 102a with the expansion connector 108 in its deployed position extended over the bearing surface 104. Here, the biasing mechanism 250 is shown as being in an expanded state for pulling the frame 204 toward the rear face 248 when the security mechanism 220 is subsequently disengaged. The biasing mechanism 250 thereupon operates to retract the expansion connector 108 from the deployed position when the optional lock mechanism 134 is operated to release the frame's integral catch mechanism 212.

FIG. 21 is a section view taken substantially along a drive axis DA of the expansion connector drive mechanism 118. This figure illustrates the novel guide mechanism 226 of the invention having the movable frame 204 shifted toward the front face 172 of the upper body portion 102a such that the integral connector seat 208 is positioned to place the expansion connector 108 (removed for clarity) in the deployed position relative to the bearing surface 104. As illustrated here, the guide mechanism 226 is formed by the two guides 228 arranged on the upper body portion's inner surface 224 in spaced apart positions along the drive axis DA within the cooperating inner slot 206 of the frame 204. By example and without limitation, the two guides 228 are illustrated here as wheels or rollers that rotate about respective axles or hubs 232 provided on the upper body portion's inner surface 224. The frame 204 is constrained to move relative to the upper body portion's inner surface 224 along the drive axis DA by a single one-piece keeper 240 that is held in place by the two fasteners 236.

As illustrated here the optionally lock mechanism 134 constrains the expansion connector 108 to remain in the deployed position, as described herein.

The latch on the upper body portion 102a, for securely fixing the expansion connector drive mechanism 118 relative to the upper body portions 102a of the docking station 100 is illustrated here as the lock mechanism 134. As illustrated, the lock mechanism 134 includes a retractable tooth 262 positioned at one end of a lock cylinder 264 that is attached at its opposite end to the upper body portion 102a, such as to the front face 172 thereof. An inclined lead surface 266 allows the to tooth 262 to automatically engage the lip portion 242 of the frame's integral catch mechanism 212 when the frame 204 is moved into the position for deploying the expansion connector 108, i.e., when the near end 216 of the frame 204 is pulled close to the front face 172 of the upper body portion 102a. A key 268 is applied to a key hole 270 in the lock cylinder 264 for disengaging the tooth 262 from the frame's lip portion 242, which releases the frame 204 for retracting the expansion connector 108 from the deployed position.

Figure 22:
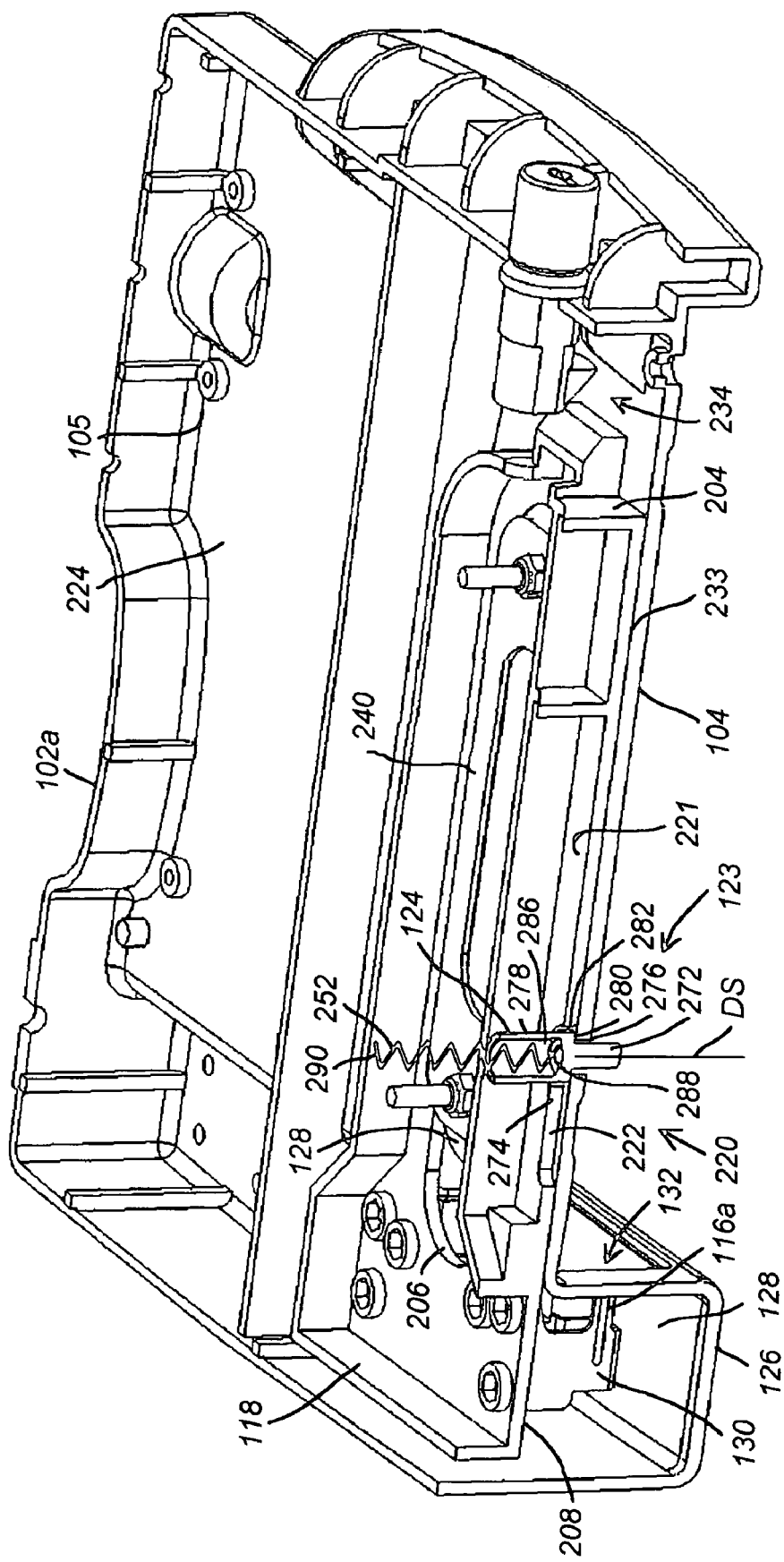
FIG. 22 illustrates the docking station of the invention being in an initial state of readiness to accept the computer.

FIG. 22 illustrates the docking station 100 being in an initial state of readiness to accept the computer 1 (shown in phantom), with the bottom face 2a of the casing 2 spaced away from the docking station's bearing surface 104. Here, the expansion connector 108 is mounted on the connector seat 208 at the far end 210 of the frame 204, and the expansion connector 108 along with the two guide pins or arms 116a, 116b that are positioned on opposite sides thereof are fully retracted within thee cavity portion 128 of the housing 126 adjacent to the bearing surface 104 at the rear face 248 of the upper body portion 102a.

As discussed herein, when the safety catch 124 of the optional sensing mechanism 123 is engaged with the keyhole 222 in the security plate 221, as shown, the frame 204 cannot be moved relative to the casing's upper body portion 102a and the bearing surface 104. Furthermore, the expansion connector 108 and guide pins or arms 116a, 116b are likewise cannot be moved out of the cavity 128 to interfere with seating the computer 1. For example, a stem portion 272 of the safety catch 124 projects above the bearing surface 104 where the computer 1 is to be seated. The stem 272 is sized to pass through both a narrow elongated slot portion 274 at a distal end of the keyhole 222, and a clearance passage 276 through the bearing surface 104. Furthermore, the stem portion 272 is cooperatively sized with the narrow slot portion 274 to slide freely along a substantial length thereof, which thus permits the frame 204 to move between the fully retracted position (shown here) and the fully deployed position (shown in subsequent figures). The stem portion 272 of the safety catch 124 extends from a base portion 278 having a shoulder 280 that is oversized relative to the passage 276 so that the upper body portion's inner surface 224 on the backside of the bearing surface 104 operates as a stop for the safety catch 124. Furthermore, the base portion 278 of the safety catch 124 is too large to pass through the narrow slot portion 274 of the keyhole 222. However, the keyhole 222 includes an enlarged passage 282 that communicates with a near end 284 of the slot portion 274 and is sized to pass the base portion 278 of the safety catch 124. As discussed herein, the safety catch 124 is structured to cooperate with the biasing mechanism 252 that operates to reset the sensing means for sensing that the computer's casing 2 is emplaced on the docking station's bearing surface 104 before the expansion connector drive 118 can be operated. By example and without limitation, when the biasing mechanism 252 is a conventional compression spring, as illustrated here, the base portion 278 of the safety catch 124 is structured with a cavity or pocket 286 that is sized to admit a first end portion 288 of the spring 252 and orient the spring 252 along a drive axis DS of the safety catch 124 that is by example and without limitation oriented substantially perpendicular to the bearing surface 104 of the upper body portion 102a. A second end portion 290 of the spring 252 is compressed against the inner surface 253 of the lower body portion 102b (omitted here for clarity). Accordingly, the spring 252 operates against the inner surface 253 of the lower body portion 102b to drive the safety catch 124 through the security plate 221 and the passage 276 to project from the bearing surface 104. Thus, the docking station's computer sensing means 123 is set and the expansion connector 108 is secure against being inadvertently deployed.

Figure 23:
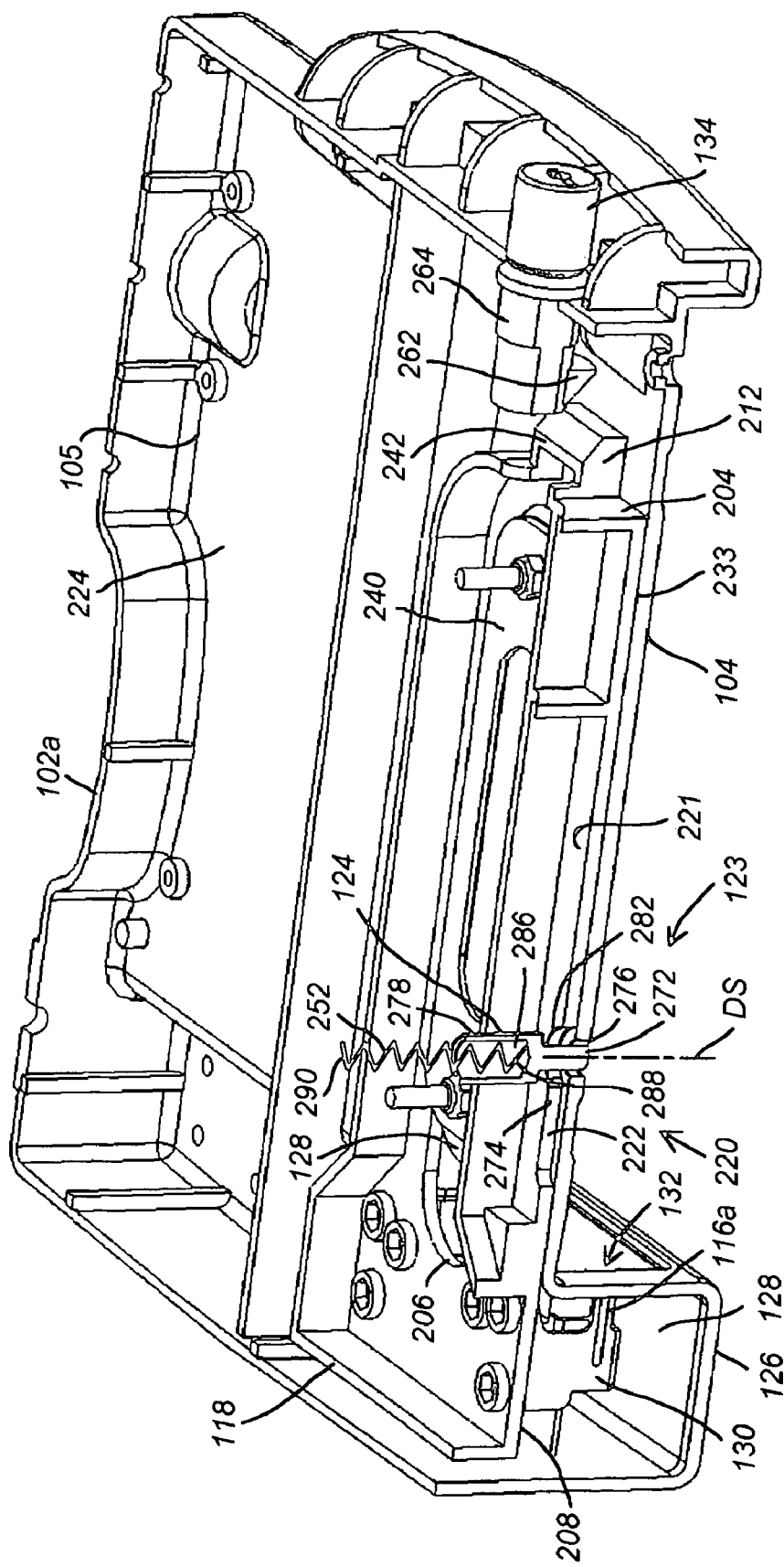
FIG. 23 illustrates the docking station of the invention being in an intermediate state of accepting the computer.

FIG. 23 illustrates the docking station 100 being in an intermediate state of accepting the computer 1 (shown in phantom) with the bottom face 2a of the casing 2 seated against the docking station's bearing surface 104. Here, the expansion connector 108 is mounted on the connector seat 208 at the far end 210 of the frame 204, and the expansion connector 108 along with the two guide pins or arms 116a, 116b on opposite sides thereof are still fully retracted within the cavity portion 128 of the housing 126 adjacent to the bearing surface 104 at the rear face 248 of the upper body portion 102a.

As discussed herein, when the bottom face 2a of the casing 2 is seated against the docking station's bearing surface 104, as shown, the compression spring of the biasing mechanism 252 is compressed against the inner surface 253 of the lower body portion 102b (shown in a subsequent figure, removed here for clarity). Accordingly, the safety catch 124 is pushed into the passage 276 and flush with the bearing surface 104. Simultaneously, the safety catch's base portion 278, which is oversized relative to the narrow slot portion 274 of the keyhole 222, is pushed through the keyhole 222 and completely out of the security plate 221. Only the stem portion 272 of the safety catch 124 now extends through the narrow slot portion 274 of the keyhole 222. Thus, the docking station's computer sensing means 123 recognizes the presence of the computer 1 as being firmly seated against the bearing surface 104, and the expansion connector 108 can now be safely deployed.

Figure 24:
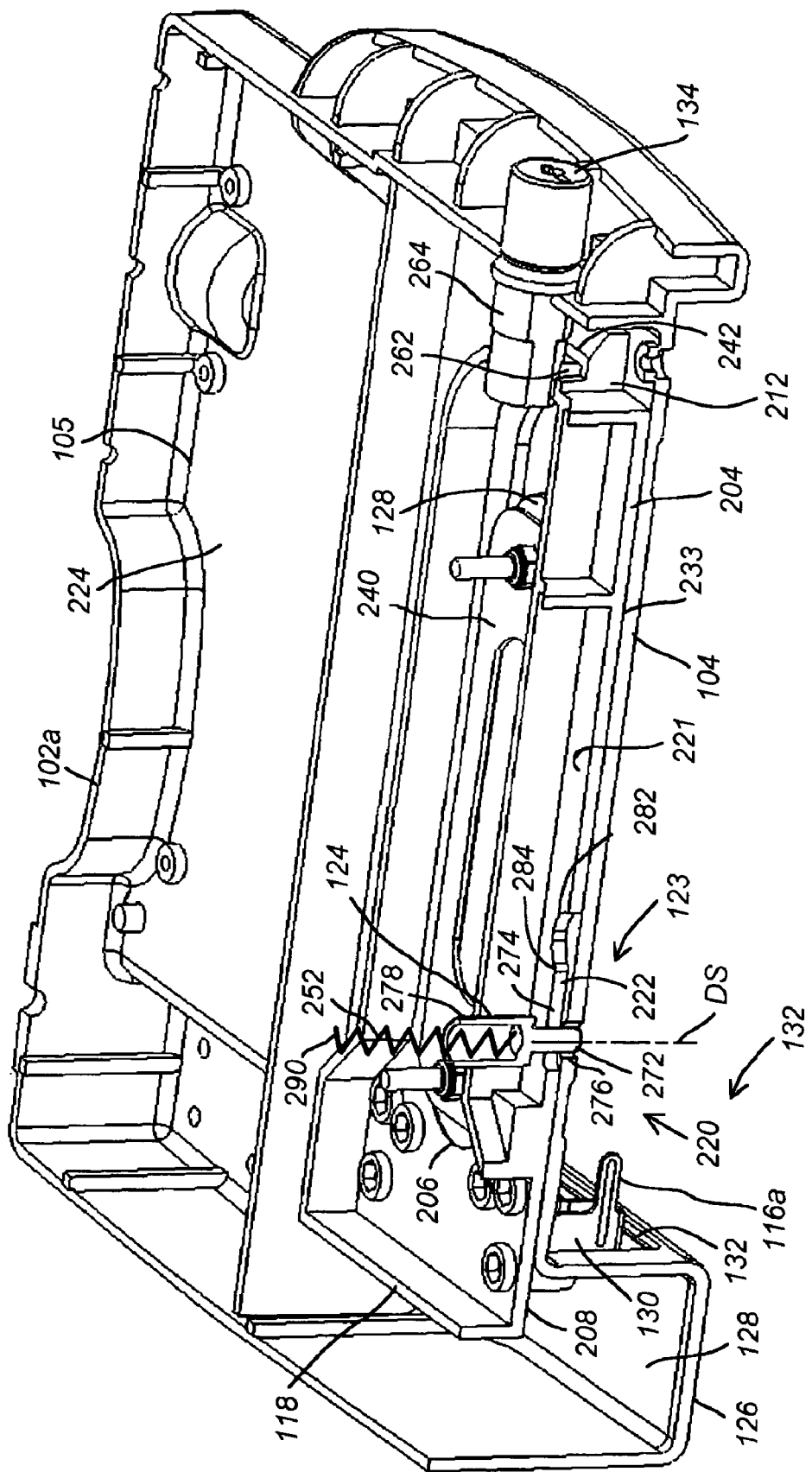
FIG. 24 illustrates the docking station of the invention being in final state of accepting the computer.

FIG. 24 illustrates the docking station 100 being in final state of accepting the computer 1 (shown in phantom) with the bottom face 2a of the casing 2 seated against the docking station's bearing surface 104. Furthermore, the expansion connector 108 mounted on the connector seat 208 is positioned to engage the computer's I/O connector 4. Here, the expansion connector 108 and the two guide pins or arms 116a, 116b on opposite sides thereof are shown as being deployed out of the cavity portion 128 of the housing 126 of the upper body portion 102a. Accordingly, as discussed herein, engagement of the guide pins or arms 116a, 116b with the respective interface apertures 4a, 4b fine tunes positioning of the expansion connector 108 relative to the computer's I/O connector 4, whereby operation of the expansion connector drive 118 has here caused the expansion connector 108 to engage the computer's I/O connector 4, and has here caused the pins (or pin receptors) 122 to engage the pin receptors (or pins) 4c.

As discussed herein, when the bottom face 2a of the casing 2 is seated against the docking station's bearing surface 104, as shown here, the compression spring of the biasing mechanism 252 is compressed against the inner surface 253 of the lower body portion 102b (shown in a subsequent figure, removed here for clarity). With the safety catch 124 being pushed into the passage 276 and flush with the bearing surface 104, the stem portion 272 of the safety catch 124 is freely moved along the narrow slot portion 274 of the keyhole 222. When only the stem portion 272 of the safety catch 124 extends through the narrow slot portion 274 of the keyhole 222, as here, the security plate 221 is moved along the drive axis DA toward the front face 172 of the upper body portion 102a for deploying the expansion connector 108. Thus, when the computer 1 is firmly seated against the bearing surface 104, the expansion connector 108 can now be fully deployed (as illustrated) by moving the frame 204 along the drive axis DA. For example, the frame's handle 214 (shown in previous figures) is pulled toward the front face 172 of the upper body portion 102a.

The lip portion 242 of the frame's integral catch mechanism 212 is fully engaged with the lock mechanism 134 provided on the upper body portion 102a. Accordingly, the expansion connector 108 and guide arms 116a, 116b on either side thereof are configured in the deployed position described herein, i.e., out of the cavity 128 and extended over the bearing surface 104 for coupling with the computer 1. Until released, the lock mechanism 134 thus constrains the expansion connector 108 to remain in the deployed position, as described herein.

When present, the locking latch mechanism 134 is released by application of the key 268 to the key hole 270 and subsequent operation thereof. Else, the alternative non-locking latch mechanism 244 is operated by application of pressure against the latch handle 260.

Upon release of either the locking latch mechanism 134 or non-locking latch mechanism 244, the retraction mechanism 246, for example the tension spring shown, automatically retracts the expansion connector drive mechanism 118 from its deployed position along with the expansion connector 108. As illustrated by example and without limitation, the frame 204 is automatically retracted from the deployed position adjacent to the front face 172 of the upper body portion 102a toward the retracted position adjacent to the rear face 248. The guide mechanism 226 cooperates with the inner slot 206 to guide the frame 204 toward the retracted position substantially along the drive axis DA. Retraction of the frame 204 simultaneously retracts the expansion connector 108 seated thereon from the computer 1 and into the safe position within the cavity 128 of the integral housing portion 126 of the casing upper body 102a adjacent the rear 115 of the bearing surface 104, where the expansion connector 108 is out of harm's way during removal of the computer 1, as illustrated and discussed herein.

FIG. 25 illustrates the docking station 100 being in final state of accepting the computer 1 (removed for clarity). Furthermore, the expansion connector 108 mounted on the connector seat 208 is positioned to engage the computer's I/O connector 4, as discussed herein. Here, the expansion connector 108 and the two guide pins or arms 116a, 116b on opposite sides thereof are shown as being deployed out of the cavity portion 128 of the housing 126 of the upper body portion 102a by operation of the expansion connector drive 118, as discussed herein.

As discussed herein, when the bottom face 2a of the casing 2 is seated against the docking station's bearing surface 104, as shown in previous figures, the compression spring of the biasing mechanism 252 is compressed against the inner surface 253 of the lower body portion 102b. By example and without limitation, a cavity or pocket 292 is provided on the inner surface 253 of the lower body portion 102b, the pocket 292 being sized to admit the second end portion 290 of the spring 252 opposite from the pocket 286 in the safety catch base portion 278, and being structured to cooperate with the pocket 286 in the safety catch base portion 278 for orienting the spring 252 along the drive axis DS of the safety catch 124. The spring 252 is thus compressed between the two pockets 286 and 292 for driving the safety catch 124 through the security plate 221 and the passage 276 to project from the bearing surface 104. Thus, the spring 252 operates to set the docking station's computer sensing means 123 for securing the expansion connector 108 against inadvertent deployment.

Figure 26:
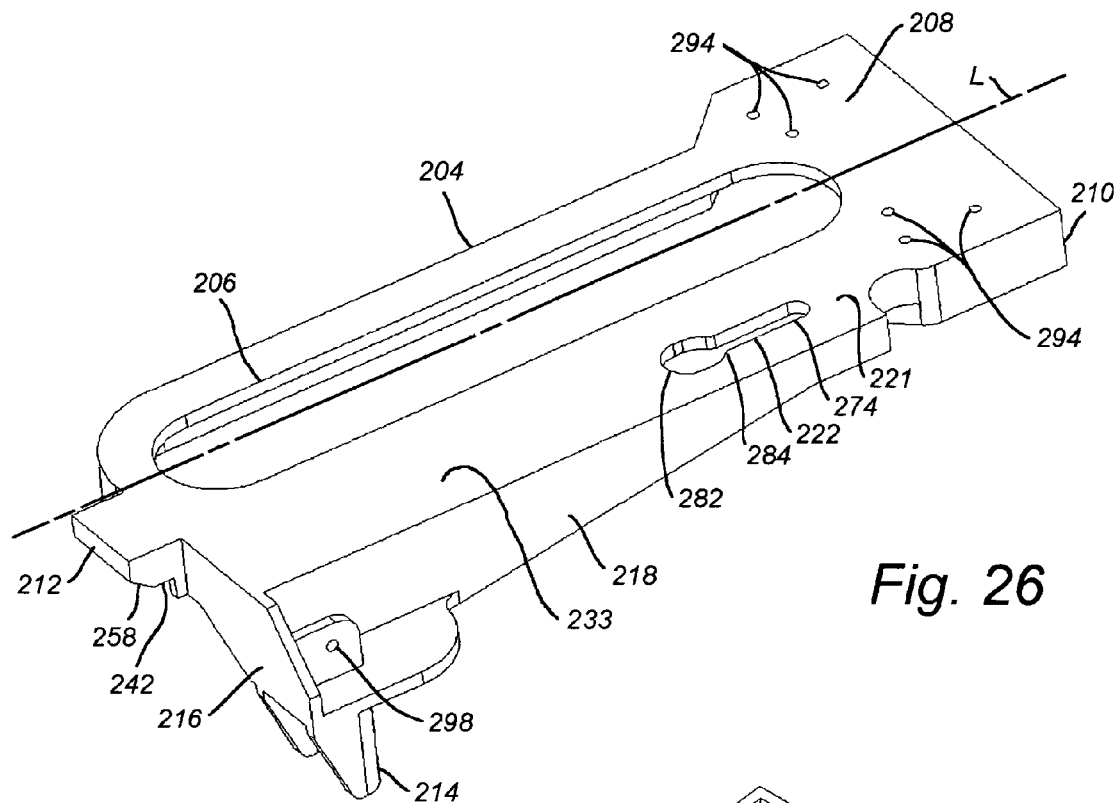
FIGS. 26 and 27 are respective top and bottom perspective views that together illustrate one embodiment of a frame portion of the expansion connector drive of the invention.
Figure 27:
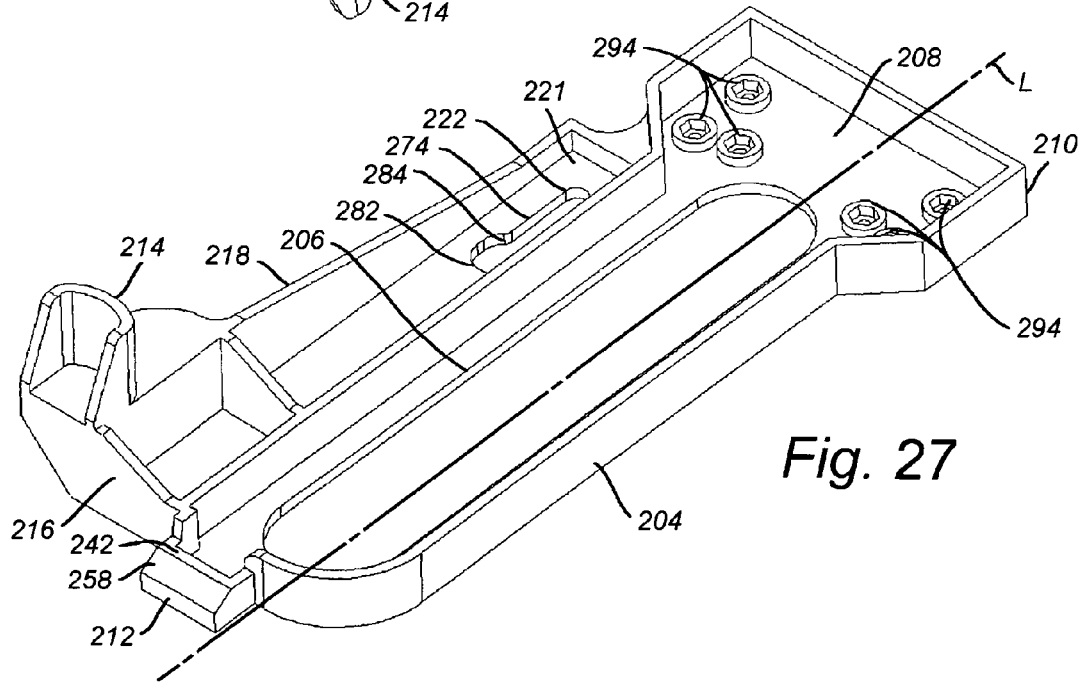

FIG. 26 and FIG. 27 are respective top and bottom perspective views that together illustrate one embodiment of the frame 204 portion of the expansion connector drive 118 of the invention. Here, the single-piece elongated frame 204 is illustrated having the elongated lengthwise inner slot 206 extending nearly the entire length thereof substantially along the longitudinal axis L thereof. The integral expanded connector seat 208 is positioned at the first distal or far end 210 for mounting the expansion connector 108 thereon, and includes a pattern of several mounting holes 294 for attaching the expansion connector 108. The integral catch mechanism 212 and integral handle 214 portions are both positioned adjacent to the second proximal or near end 216 of the frame 204 opposite from the connector seat 208. The handle 214 may be provided, by example and without limitation, on one side 218 of the frame 204, while the catch mechanism 212 may be provided, by example and without limitation, at the near end 216. As discussed herein, the catch mechanism 212 includes the lip portion 242 that is structured to cooperate with either the locking latch mechanism 134 or alternative non-locking latch mechanism 244 for securely fixing the expansion connector drive mechanism 118 relative to the upper body portion 102a of the docking station 100 with the expansion connector 108 in a deployed position. As illustrated here by example and without limitation the lip portion 242 is integrally formed with the inclined surface 258 that cooperates with the inclined surface 257 of the latch mechanism's tooth 254 for helping the to tooth 254 to automatically engage the lip portion 242 when the frame 204 is moved into the position for deploying the expansion connector 108.

The inclined surface 258 of the lip portion 242 similarly cooperates with the inclined surface 266 of the retractable tooth 262 of the optional lock mechanism 134, when present. The inclined surface 258 similarly helps the to tooth 262 to automatically engage the lip portion 242 when the frame 204 is moved into the position for deploying the expansion connector 108.

The security mechanism 220 is structured to cooperate with the safety catch 124 to resist deployment of the expansion connector 108 until the computer 1 is seated against the bearing surface 104. Accordingly, the frame 204 includes the integral security plate 221 formed along the side 218 thereof and spaced away from the lengthwise inner slot 206 between the connector seat 208 and the handle 214. The keyhole 222 is formed in the security plate 221 with the narrow slot portion 274 formed substantially parallel with the longitudinal axis L and having the enlarged passage 282 communicating with the proximal or near end 284 thereof The second proximal or near end 216 of the frame 204 includes means for coupling the resilient biasing mechanism 250 for retracting the expansion connector 108 from the deployed position along the drive axis DA. By example and without limitation, the second proximal or near end 216 of the frame 204 includes a simple clearance hole 298 for coupling the biasing mechanism 250, i.e., spring 252, between it and the rear face 248 of the upper body portion 102a, as shown in FIG. 16. The resilient biasing mechanism 250 thus operates between the upper body portion's rear face 248 and the near end 216 of the frame 204 for retracting the expansion connector drive 118 from the deployed position when the locking latch mechanism 134 or alternative non-locking latch mechanism 244 is operated to release the frame's integral catch mechanism 212.

Figure 28:
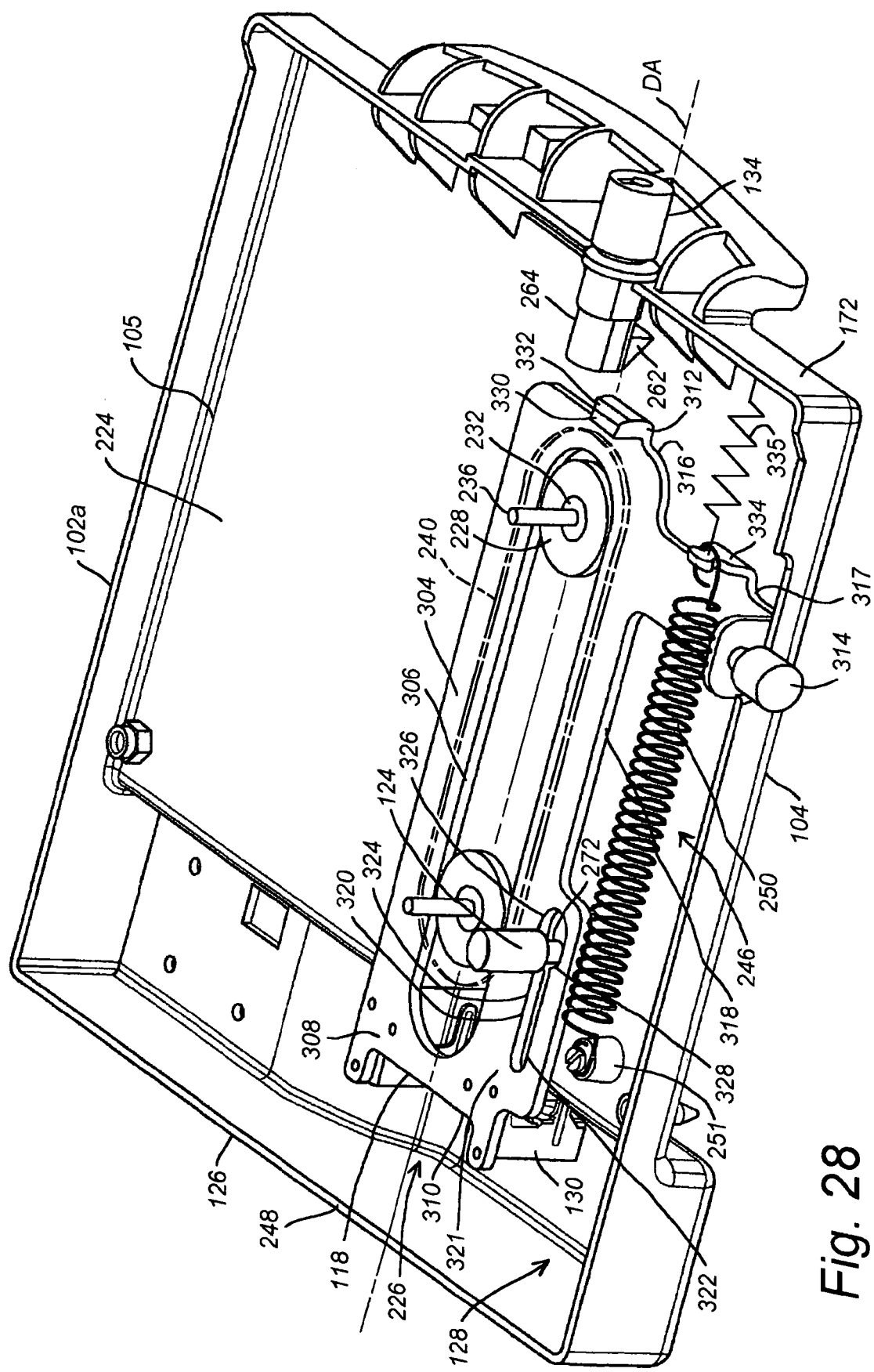
FIG. 28 is perspective view inside the upper body portion of the docking station of the invention and further illustrates a simplified expansion connector drive mechanism of the present invention.

FIG. 28 is perspective view inside the upper body portion 102a and illustrates the expansion connector drive mechanism 118 of the present invention having a simplified single-piece elongated frame 304 having an elongated lengthwise inner slot 306 extending nearly the entire length of the frame 304 substantially along a longitudinal axis LA thereof. An integral expanded connector seat 308 is positioned at a first distal or far end 310 of the frame 304 for mounting the expansion connector 108 thereon. An integral catch mechanism 312 and integral handle portion 314 are both positioned adjacent to a second proximal or near end 316 of the frame 304 opposite from the connector seat 308. The handle 314 may be provided, by example and without limitation, on an arm 317 extended from one side 318 of the frame 304, while the catch mechanism 312 may be provided, by example and without limitation, at the near end 316. The catch mechanism 312 is structured to cooperate with either the locking latch mechanism 134 or alternative non-locking latch mechanism 244 for constraining the expansion connector 108 to remain in the deployed position, as described herein.

The lengthwise slot 306 in the alternate frame 304 cooperates with the guide mechanism 226 on the inner surface 224 of the upper body portion 102a opposite from the bearing surface 104 for guiding the frame 304 substantially along the drive axis DA, as described herein. By example and without limitation, lengthwise slot 306 cooperates with the two guides 228 of the guide mechanism 226 that are arranged on the upper body portion's inner surface 224 in spaced apart positions along the drive axis DA. By example and without limitation, the two guides 228 are optionally provided as one or more slides that permit the frame 304 to slide freely along the drive axis DA. Alternatively, the guides 228 are optionally formed as wheels or rollers that rotate about respective axles or hubs 232 provided on the upper body portion's inner surface 224. The axles or hubs 232 may be configured to space the guides 228 slightly away from the upper body portion's inner surface 224 for easier rotation. The frame 304 is constrained to move relative to the upper body portion's inner surface 224 along the drive axis DA by one or more keepers 240 (shown in phantom). For example, a pair of disc-shaped keepers 240 are secured to the upper body portion's inner surface 224 by one or more fasteners 236 for constraining the frame 304 to move along the drive axis DA. The one or more keepers 240 also operate to constrain the guide wheels 228, when present, in a position for cooperating with the inner slot 306 of the frame 304. Other structures for the guide mechanism 226 are also contemplated and may be substituted without deviating from the scope and intent of the present invention.

The alternate frame 304 is structured such that, when the expansion connector 108 is mounted on the connector seat 308 at the far end 310 of the frame 304, it fits within the cavity portion 128 of the housing 126 and extends above the bearing surface 104 of the upper body portion 102a. The alternate frame 304 is moveable, either by sliding or rolling, in cooperation with the guide mechanism 226 across the inner surface 224 of the upper body portion 102a and along the drive axis DA.

A security mechanism 320 is structured to cooperate with the safety catch 124 to resist deployment of the expansion connector 108 until the computer 1 is seated against the bearing surface 104 and the computer's I/O connector 4 is positioned to receive the expansion connector 108. Similar to the security mechanism 220 of the frame 204 discussed herein, by example and without limitation, the security mechanism 320 of the alternate frame 304 is provided in an integral security plate 321 formed, by example and without limitation, along the side 318 of the frame 304 and spaced away from the lengthwise inner slot 306, for example, between the connector seat 308 and the handle 314. The security mechanism 320 is provided as a keyhole 322 formed in the security plate 321, the keyhole 322 being structured for cooperating with the safety catch 124 such that, when the safety catch 124 is engaged with the keyhole 322, the frame 304 cannot be moved relative to the casing's upper body portion 102a. For example, the keyhole 322 includes at a distal end thereof a narrow slot portion 324 sized to freely move the stem portion 272 of the safety catch 124 along a substantial length thereof so that the frame 304 is permitted to move between the fully retracted position (shown here) and the fully deployed position (shown in previous figures). The keyhole 322 also includes an enlarged passage 326 that communicates with a near end 328 of the slot portion 324 and is sized to pass the base portion 278 of the safety catch 124 for disarming the safety catch 124.

Similar to the novel expansion connector drive mechanism 118 operated with the frame 204, here the novel expansion connector drive mechanism 118 of the invention is operated by first depressing the safety catch 124 relative to the bearing surface 104 of the upper body portion 102a, for example by seating the bottom face 2a of the computer casing 2 against the bearing surface 104. Depressing the safety catch 124 simultaneously disengages the safety catch 124 of the security mechanism 320 from the cooperating keyhole portion 322 in the security plate 321, which thereby permits the frame 304 to move along the frame drive axis DA. The handle 314 of the expansion connector drive mechanism 118 is pulled parallel to the drive axis DA toward the front face 172 of the casing's upper body portion 102a, which in turn pulls the expansion connector 108 and guide arms 116a, 116b on either side thereof into the deployed position described herein, i.e., the expansion connector 108 outside the cavity 128 and extended over the bearing surface 104. A integral lip portion 330 of the frame's integral catch mechanism 312 engages either the locking latch mechanism 134 (shown) or the alternative non-locking latch mechanism 244 provided on the upper body portion 102a. The locking latch mechanism 134 (shown) or alternative non-locking latch mechanism 244 constrains the expansion connector 108 to remain in the deployed position, as described herein. As illustrated, the a retractable tooth 262 of the lock mechanism 134 automatically engages the lip 330 when the alternate frame 304 is moved into the position for deploying the expansion connector 108 as discussed herein. For example, an inclined lead surface 332 on the frame's lip portion 330 cooperates with the lead surface 258 to automatically engage the tooth 262 of the lock mechanism 134 when the alternate frame 304 is moved into the position for deploying the expansion connector 108.

The retraction mechanism 246 automatically retracts the expansion connector 108 from the deployed position by pulling the frame 304 along the drive axis DA away from the upper body portion's front face 172 toward its rear face 248. By example and without limitation, the biasing mechanism 250, such as a tension spring (shown), is coupled between the rear face 248 and a simple catchment 334 at the second or near end 316 of the frame 304 adjacent to the handle 314. The biasing mechanism 250 operates between the rear face 248 the catchment 334 for retracting the frame 304 toward the rear face 248. The biasing mechanism 250 thereby operates to retract the expansion connector 108 from the deployed position when the locking latch mechanism 134 (shown) or alternative non-locking latch mechanism 244 is operated to release the frame's integral catch mechanism 312.

Alternatively, a compression spring 335 is substituted for the compression spring as the biasing mechanism 250 of the retraction mechanism 246 for automatically retracting the expansion connector 108 from the deployed position. The compression spring 335 operates by pushing the frame 304 along the drive axis DA away from the upper body portion's front face 172 toward its rear face 248.

As disclosed herein, the safety catch 124 will not interfere with retraction of the alternate frame 304. However, the biasing mechanism 252 operates to reset the sensing means for sensing that the computer's casing 2 is emplaced on the docking station's bearing surface 104 before the expansion connector drive 118 can be operated.

Figures 29, 30:
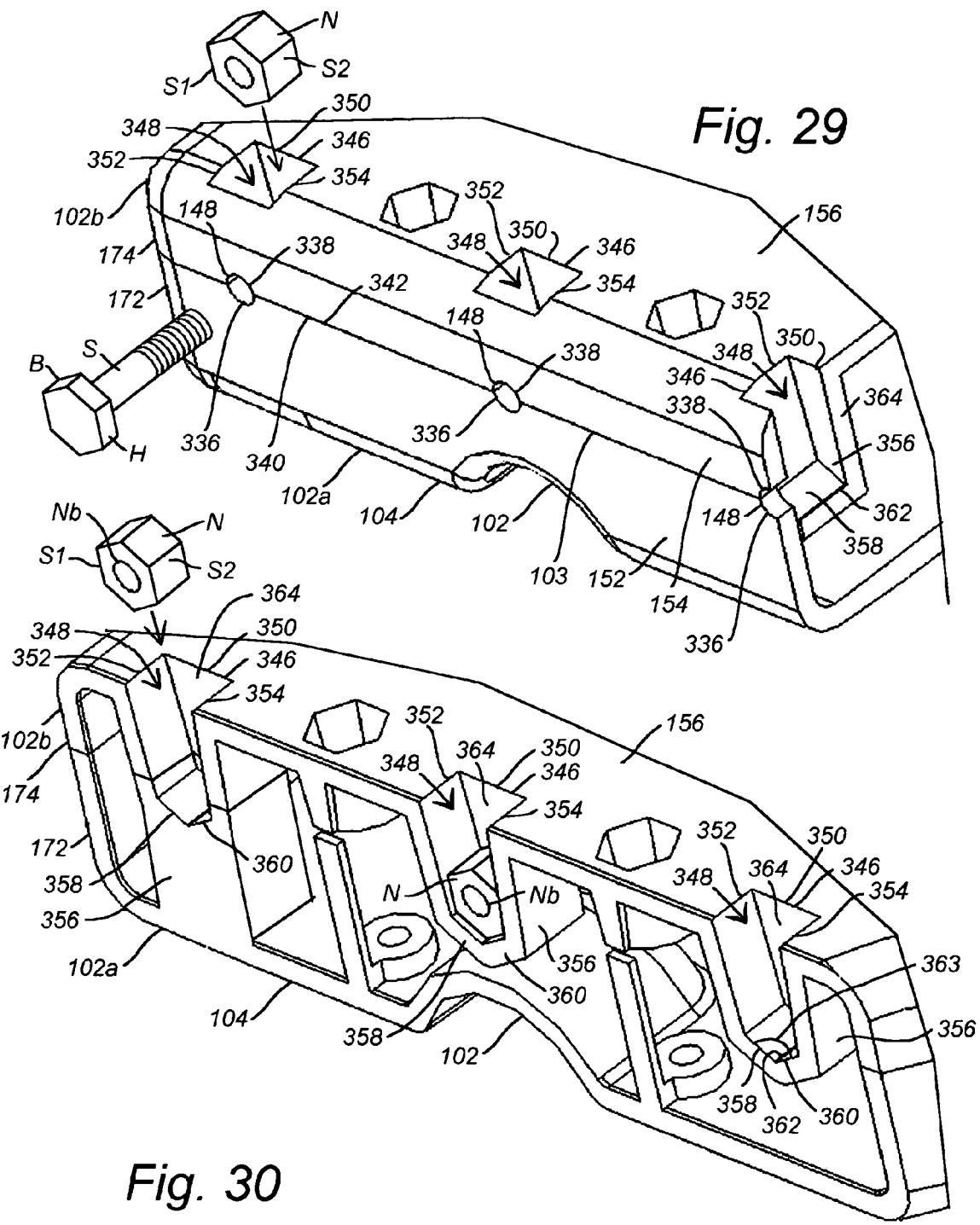
FIG. 29 is an upside-down close-up view showing novel edge mounting holes of the invention formed along a mutual contact line between the upper and lower body portions of the novel docking station's two-piece body.
FIG. 30 illustrates that an extension portion of a well portion of a novel nut pocket of the invention extends past the contact line between the upper and lower body portions of the novel docking station's two-piece body.

FIG. 29 is an upside-down close-up view showing the edge mounting holes 148 formed along the mutual contact line 103 between the upper and lower body portions 102a, 102b of the docking station's two-piece body 102. As discussed herein, the edge mounting holes 148 each provide novel means for holding for example but not limited to a square- or hex-shaped mechanical nut N with its threaded bore aligned with the respective mounting hole 148 substantially parallel with the bearing surface 104 and perpendicular to respective side faces 152 and 154 of the upper and lower body portions 102a, 102b. Any external device can be threadedly attached to the body 102 by means of the shaft S of a screw or bolt B being inserted into a selected one of the edge mounting holes 148 and threaded into the bore of the nut N.

The edge mounting holes 148 are formed by a pair of mating shapes 336 and 338 formed in the docking station's two-piece body 102 through the mating upper and lower body portions 102a, 102b. The shapes 336, 338 meet along the mutual contact line 103. By example and without limitation, the edge mounting holes 148 are formed by a pair of mating semi-circular holes 336 and 338 formed in the docking station's two-piece body 102 through the mating upper and lower body portions 102a, 102b along the mutual contact line 103. However, the mating holes 336, 338 may alternatively be different in shape from semi-circular, for example, the holes 336, 338 may be mating rectangular shapes that form a square hole when mated, or semi-hexagonal shapes that form a hexagonal shape when mated, or another combination of shapes that form an aperture adjacent to the mating line 103 of the upper and lower body portions 102a, 102b, and such shapes may be substituted for the semi-circular shapes illustrated without departing from the spirit and scope of the invention. Furthermore, the entire shape of the resultant edge mounting holes 148 may be alternatively formed in the edge of either one of the upper and lower body portions 102a, 102b without departing from the spirit and scope of the invention. For example, as illustrated by the edge mounting hole 148 at the far left of the figure, the edge mounting holes 148 may alternatively be formed as a generally "U" or "V" or square-shaped hole 336 entirely within an edge portion 340 of one of the side faces 154 of the lower body portion 102b, or the front 172 or rear face 248, while the mating hole is entirely eliminated from the upper body portion 102a, and the shape 338 is an edge portion 342 of an opposite face 154, 174 or 248 of the upper body portion 102a that is exposed by the hole 336 in the lower body portion 102b, whereby the edge mounting hole 148 is formed by the shaped hole 336 that is closed by the mating shape 338 of the upper body portion's exposed edge portion 342. Alternatively, as illustrated by the edge mounting hole 148 at the center of the figure, the edge mounting holes 148 may alternatively be formed as a generally "U" or "V" or square-shaped hole 338 entirely within the edge portion 342 of the upper body portion 102a, while the mating hole 336 is entirely eliminated from the lower body portion 102b, and the shape 336 is the edge portion 340 of the lower body portion 102b that is exposed by the hole 338 in the upper body portion 102a, whereby the edge mounting hole 148 is formed by the shaped hole 338 that is closed by the mating shape 336 of the lower body portion's exposed edge portion 340.

Each of the edge mounting holes 148 is backed by a respective nut pocket 346 formed by an open well 348. As illustrated by the cross-sectional view of the edge mounting hole 148 and corresponding nut pocket 346, the well 348 of the integral nut pocket 346 is formed in one of the upper body portion 102a or the lower body portion 102b (shown). The well 348 is generally rectangular in cross-section and extends through the bottom plane 156 of the lower body portion 102b past the contact line 103. The well 348 is formed having an opening 350 formed in the bottom plane 156 of the lower body portion 102b (shown) or adjacent to the bearing surface 104 in the upper body portion 102a. The nut pocket's well 348 and opening 350 thereto are sized to admit a nut N of a desired size, such as #2, #4, #6, #8, #10, ¼ inch, or metric size nut or bolt head H. For example, the well 348 is formed by a pair of spaced apart rigid side walls 352 and 354 that extend inwardly of the side face 154 of the lower body portion 102b and downwardly of the bottom plane 156 and substantially perpendicular to each. The side walls 352, 354 are sufficiently spaced to easily admit the nut N of the desired size without being significantly oversized such that the nut N cannot rotate in the well 348. The side walls 352, 354 may include a slight draft angle from the opening 350 toward the contact line 103. The mating shapes 336, 338 along the contact line 103 are correspondingly sized to admit the shaft of the bolt B sized to mate with the nut N.

FIG. 30 illustrates that an extension portion 356 of each well 348 extends past the contact line 103. The extension portion 356 closes the end of the corresponding well 348. The extension portion 356 is optionally formed integrally with the corresponding well 348, and may optionally be formed into a point having integral bottom walls 358 and 360 that are contiguous along a corner 362 in the central bottom of the nut pocket's well 348. Additionally, the bottom walls 358, 360 may optionally form an included angle 363 therebetween centered about the corner 362, the included angle 363 being constructed to mate with the angled walls of the nut N of the desired size and shape, i.e., square or hex. For example, the included angle 363 between the bottom walls 358, 360 is structured to mate with the nut N such as a square or hex nut (shown), whereby the nut N is constrained from turning when torque is applied during insertion and tightening of the screw or bolt B. For example, the angle 363 formed by the bottom walls 358, 360 is about 90 degrees to accommodate a square nut. Alternatively, the angle 363 is about 120 degrees to accommodate a hex nut.

The extension portion 356 of the well 348 may be integral with the side walls 352, 354 (shown at center and right) and extended from the upper or lower body portion 102b (shown) past the contact line 103 toward the opposite lower or upper body portion 102a (shown). As illustrated (center and right) the nut pockets 346 are optionally fully formed in the selected upper body portion 102a or lower body portion 102b (shown). Alternatively, as illustrated by the nut pocket 340 (far left) the extension portion 356 is optionally formed in the opposing body portion 102a (shown) and positioned to align with the walls 352, 354 of the well 348.

Each nut pocket's well 348 also includes a backing panel 364 that is optionally integral with the well's side walls 352, 354 and is spaced away from the side faces 152 and 154 of the upper and lower body portions 102a, 102b sufficiently to admit the nut N of desired size. The backing panel 364 is a means for constraining the nut N from backing away from the edge hole 148 when the screw or bolt B is applied thereto.

Also illustrated here is the simplicity of operation of the nut pockets 346. Here, the nut pocket 346 is operated by simply dropping the nut N of the appropriate size through the opening 350 into the well 348 corresponding to the selected edge mounting hole 148 with two of the nut's parallel sides S1 and S2 oriented substantially parallel with the well's side walls 352, 354, as illustrated. Thereafter, the nut N falls into the extension portion 356 at the end of the well 348 and nests between the side walls 352, 354 and the bottom walls 358, 360 of the extension 356 that combine to form the bottom of the well 348. Upon the nut N nesting in the extension portion 356 of the well 348, the nut's threaded bore Nb substantially automatically self-aligns with the edge mounting hole 148. Thereafter, the screw or bolt B of the appropriate size is inserted through the corresponding hole 148 and threaded into the nut's bore Nb for attaching a desired edge attachment.

Figure 31:
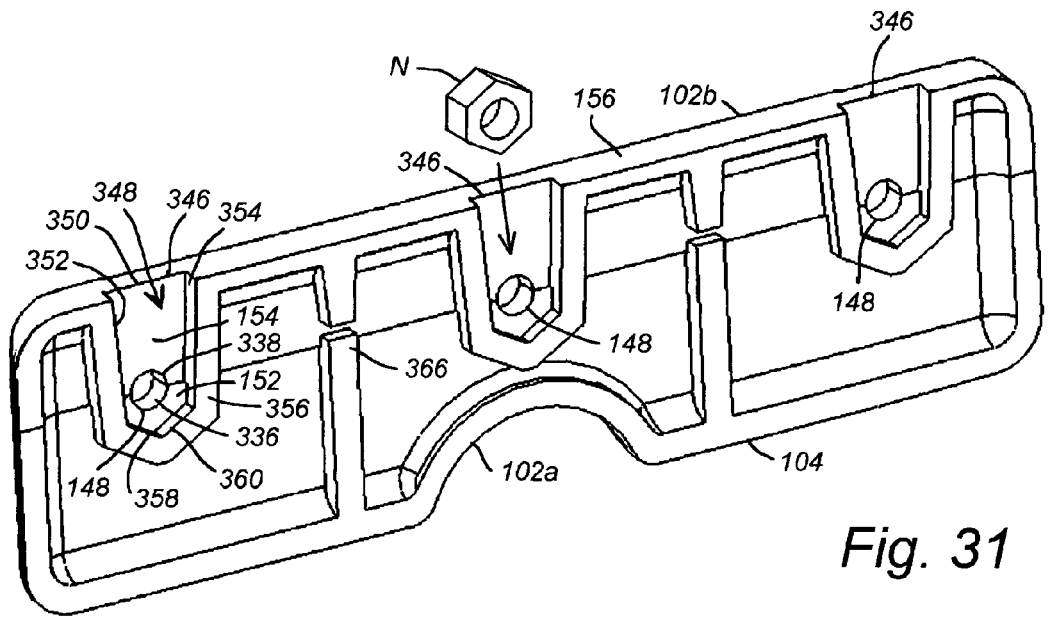
FIG. 31 is a section view of the nut pockets of the invention taken from inside the two-piece body of the docking station of the invention.

FIG. 31 is a section view of the nut pockets 346 taken from inside the two-piece body 102 of the docking station 100 of the invention. Here, the nut pocket 346 (far left) is illustrated having the extension portion 356 optionally formed in the opposing body portion 102a (shown) and positioned in alignment with the walls 352, 354 of the well 348.

This, view also illustrates two of a plurality of optional tabs 366 that extend between the upper and lower body portions 102a, 102b for alignment therebetween.

Figure 32:
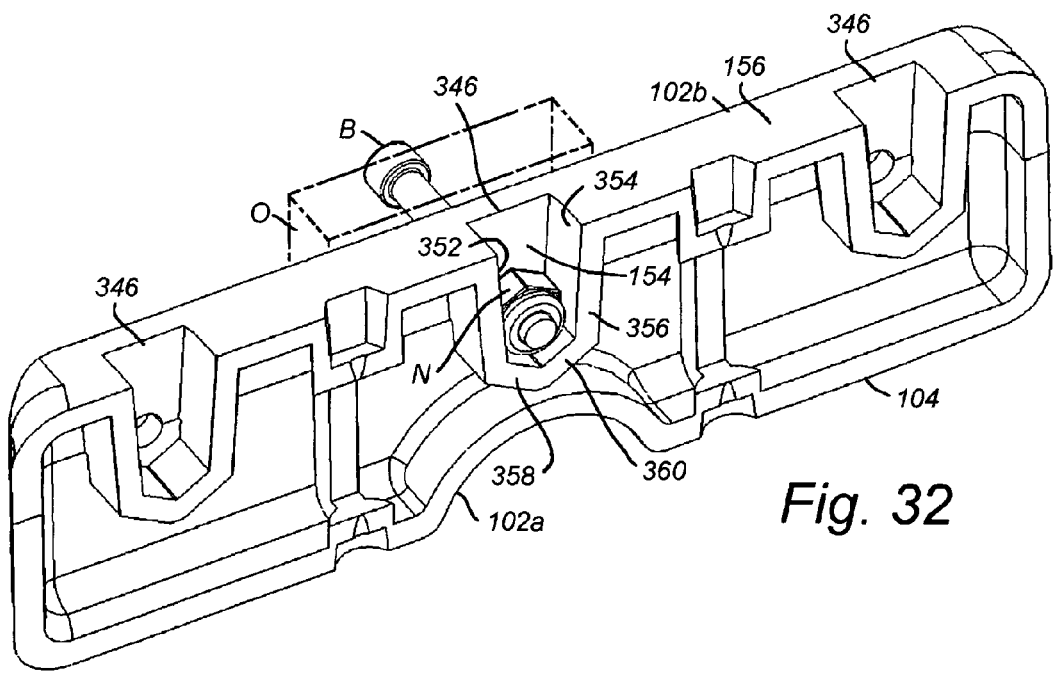
FIG. 32 is a section view of the nut pockets of the invention taken from inside the two-piece body of the docking station of the invention.

FIG. 32 is a section view of the nut pockets 346 taken from inside the two-piece body 102 of the docking station 100 of the invention. Here, the nut pocket 346 (far left) is illustrated having the extension portion 356 optionally formed in the opposing body portion 102a (shown) and positioned in alignment with the walls 352, 354 of the well 348. The nut N is illustrated as being installed in the nut pocket 346 with the screw or bolt B inserted through the edge mounting hole 148 and mated with the nut N. The screw or bolt B is thereby positioned to secure an external object O (shown in phantom) to the sides 152, 154 of the upper and lower body portions 102a, 102b of the docking station 100 of the invention.

Figure 33:
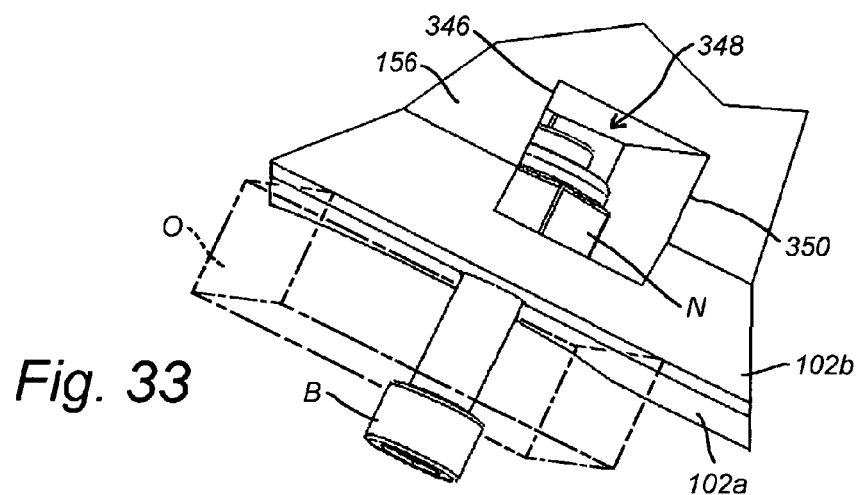
FIG. 33 illustrates a mechanical nut installed in the nut pocket of the invention with a screw or bolt inserted through the edge mounting hole of the invention and mated with the nut.

FIG. 33 illustrates the nut N installed in the nut pocket 346 with the screw or bolt B inserted through the edge mounting hole 148 and mated with the nut N. The screw or bolt B is thereby positioned to secure the external object O (shown in phantom) to the sides 152, 154 of the upper and lower body portions 102a, 102b of the docking station 100 of the invention.

Figure 34:
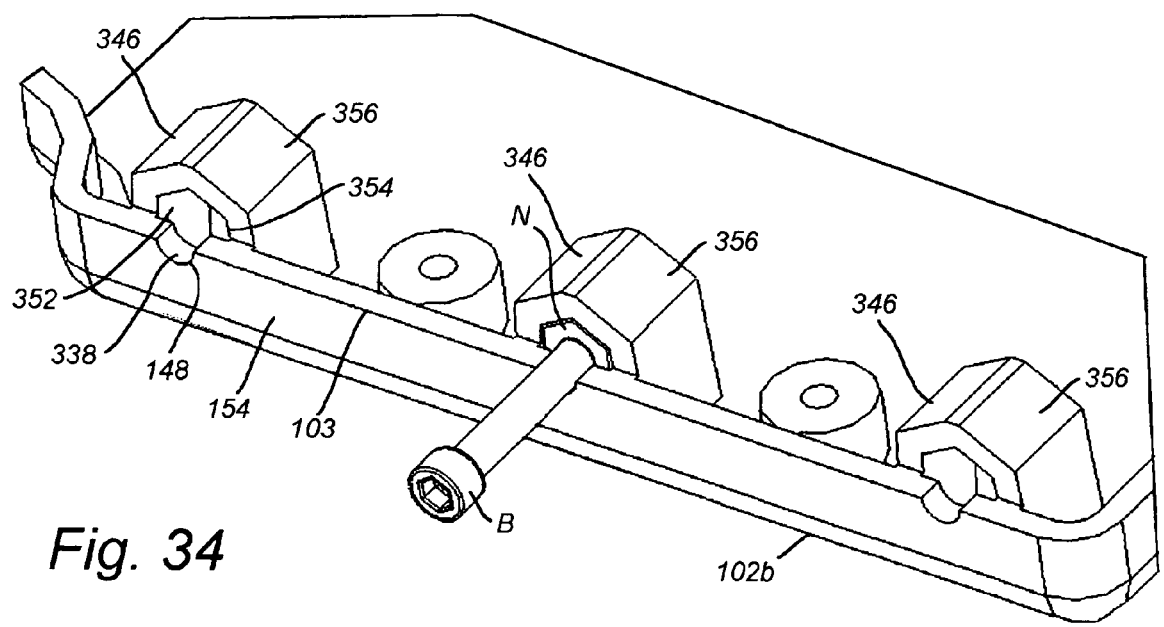
FIG. 34 illustrates the lower body portion of the novel docking station with the upper body portion removed for clarity, the nut pockets here illustrated as being optionally fully formed in the selected upper body portion or lower body portion (shown)

FIG. 34 illustrates lower body portion 102b with the upper body portion 102a removed for clarity. Here, the nut pockets 346 are illustrated as being optionally fully formed in the selected upper body portion 102a or lower body portion 102b (shown). The extension portion 356 of the well 348 is integral with the side walls 352, 354 and extended from the upper or lower body portion 102b (shown) past, the contact line 103 toward the opposite lower or upper body portion 102a (shown). The nut N is illustrated as being installed in the nut pocket 346 with the screw or bolt B inserted through the edge mounting hole 148 and mated with the nut N.

Figure 35:
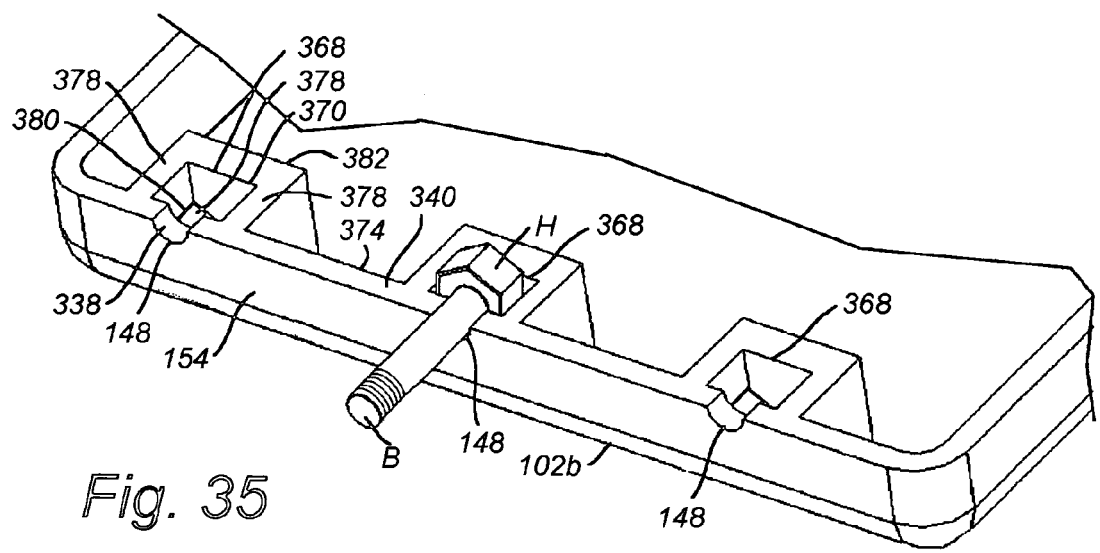
FIG. 35 illustrates one of the novel edge mounting holes of the invention alternatively formed with a novel screw or bolt pocket of the invention formed by example and without limitation as a pair of mating pockets (shown in a subsequent figure) integrally formed on inside surfaces of the respective lower body portion and upper body portion of the docking station of the invention and adjacent to the respective edges thereof.

FIG. 35 illustrates one of the edge mounting holes 148 alternatively formed with a screw or bolt pocket 368 formed by example and without limitation as a pair of mating pockets 370 and 372 (shown in a subsequent figure) integrally formed on inside surfaces 374 and 376 of the respective lower body portion 112b and upper body portion 102a and adjacent to the respective edges 340 and 342 thereof. The pocket 370 is formed by example and without limitation as a construction of integral walls 378 interconnected along corners 380 and a backing panel 382 integrated with the walls 378. The pockets 370, 372 mate along the contact line 103 of the upper and lower body portions 102a, 102b in substantial alignment with the corresponding shaped holes 336, 338 that form the edge mounting hole 148. The screw pockets 368 are optionally formed with a substantially square shape to accommodate a square-head screw or bolt of a desired size, or may be formed with a substantially hexagonal shape (shown) to accommodate a hex-head screw or bolt of the desired size. Each screw pocket 368 is thus structured to mate with the square or hex head of the screw or bolt B, whereby the screw or bolt B is constrained from turning when torque is applied during installation and tightening of the mating nut N for securing the external object.

Figure 36:
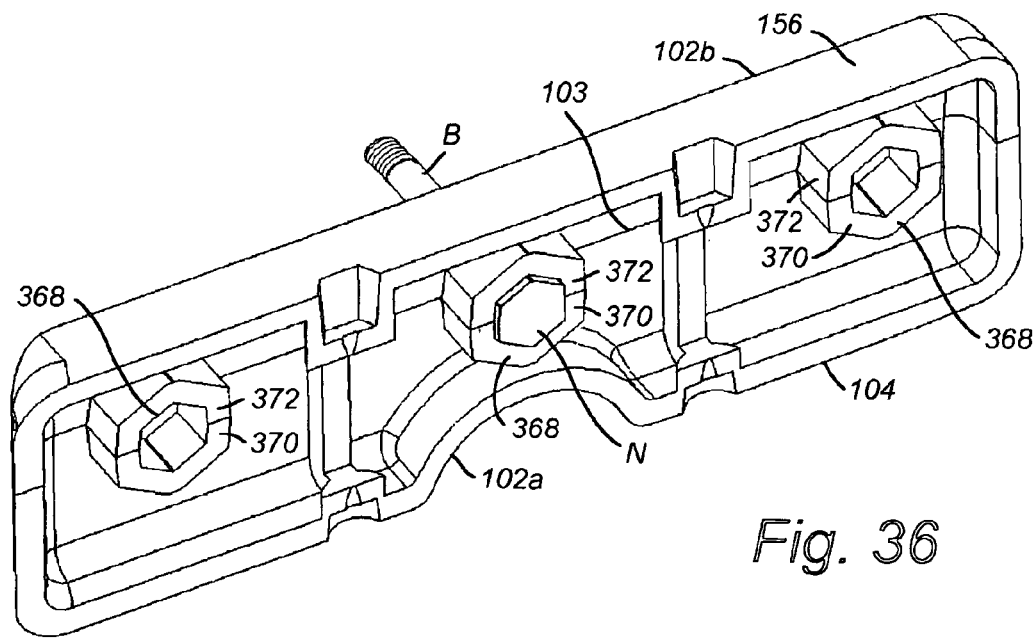
FIG. 36 is a section view of one of the novel screw pockets of the invention taken from inside the two-piece body of the docking station of the invention.

FIG. 36 is a section view of one of the screw pockets 368 taken from inside the two-piece body 102 of the docking station 100 of the invention. Here, the screw pocket 368 is illustrated having the mating pockets 370 and 372 integrally formed on inside surfaces 374 and 376 of the respective lower body portion 102b and upper body portion 102a and adjacent to the respective edges 340 and 342 thereof. The mating pockets 370 and 372 are illustrated with the respective backing panels 382 removed for clarity. The mating pockets 370 and 372 are positioned in alignment with the shaped holes 336, 338 that form the corresponding edge mounting hole 148 (shown in previous figures). The screw pockets 368 are optionally formed with a substantially square shape to accommodate the head H of the square head screw or bolt B of a desired size, or may be formed with a substantially hexagonal shape (shown) to accommodate a hex-head screw or bolt B of the desired size.

Figure 37:
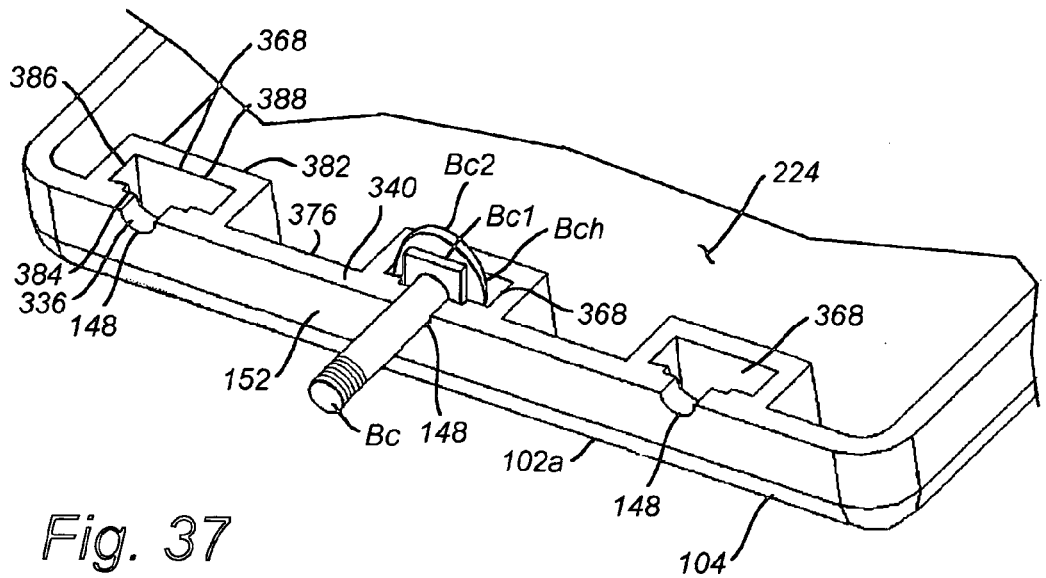
FIG. 37 illustrates the novel screw pocket of the invention being alternatively configured to accommodate a carriage bolt (shown in phantom) wherein the nut pocket is formed having integral near and far portions substantially aligned with a novel edge mounting hole of the invention.

FIG. 37 illustrates the screw pocket 368 being alternatively configured to accommodate a carriage bolt Bc (shown in phantom) wherein the pocket 368 is formed having integral near and far portions 384 and 386 substantially aligned with the shaped nut hole 338 (or 336), and the integral backing panel 364. The near portion 384 adjacent to the wall 152 (or 154) of the body portion 102a (or 102b) is formed as one half of a square, either as an approximately 90 degree "V" shape or a rectangle (shown) that is sized to accept a square base portion Bc1 of the carriage bolt head Bch without turning when the nut N is installed and tightened. The far portion 386 spaced away from the wall 152 of the body portion 102a by the depth of the near portion 384 is structured to accept a round pan portion Bc2 of the carriage bolt Bc. By example and without limitation, the far portion 386 of the screw pocket 368 is a "V" shape or a rectangle shape (shown) aligned with the shaped hole 338 (or 336) and sized to accept the round pan portion Bc2 of the carriage bolt Bc.

Figure 38:
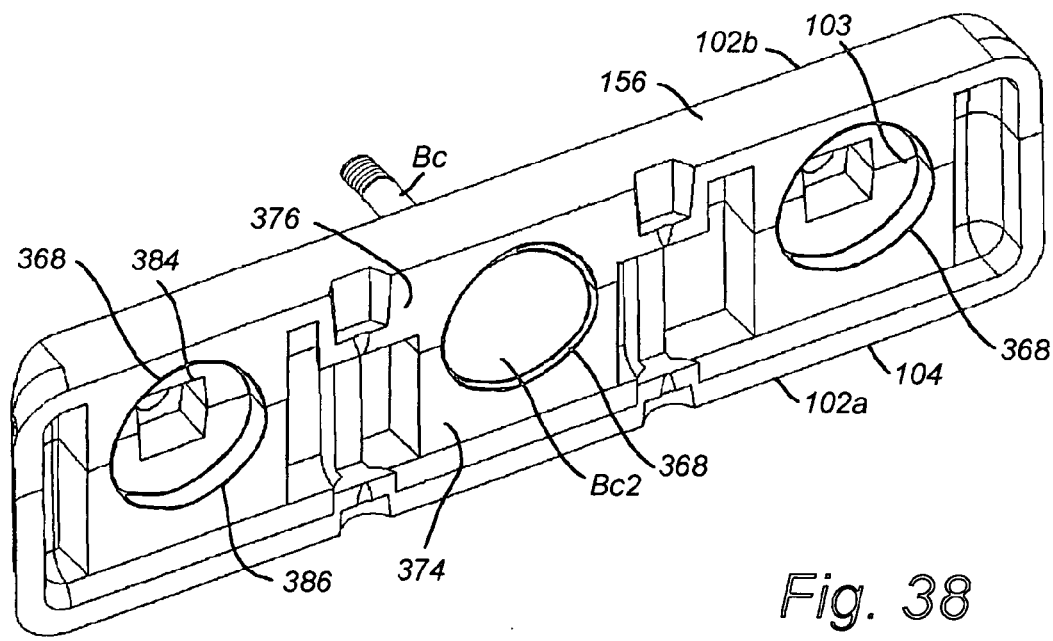
FIG. 38 is a section view of the novel screw or carriage bolt pocket of the invention taken from inside the two-piece body of the docking station of the invention.

FIG. 38 is a section view of the screw or carriage bolt pocket 368 taken from inside the two-piece body 102 of the docking station 100 of the invention. Here, the carriage bolt pocket 368 is illustrated by example and without limitation as having the far portion 386 of the screw pocket 368 being a semi-cylindrical shape aligned with the shaped hole 338 (or 336) and sized to accept the round pan portion Bc2 of the carriage bolt Bc.

Figure 39:
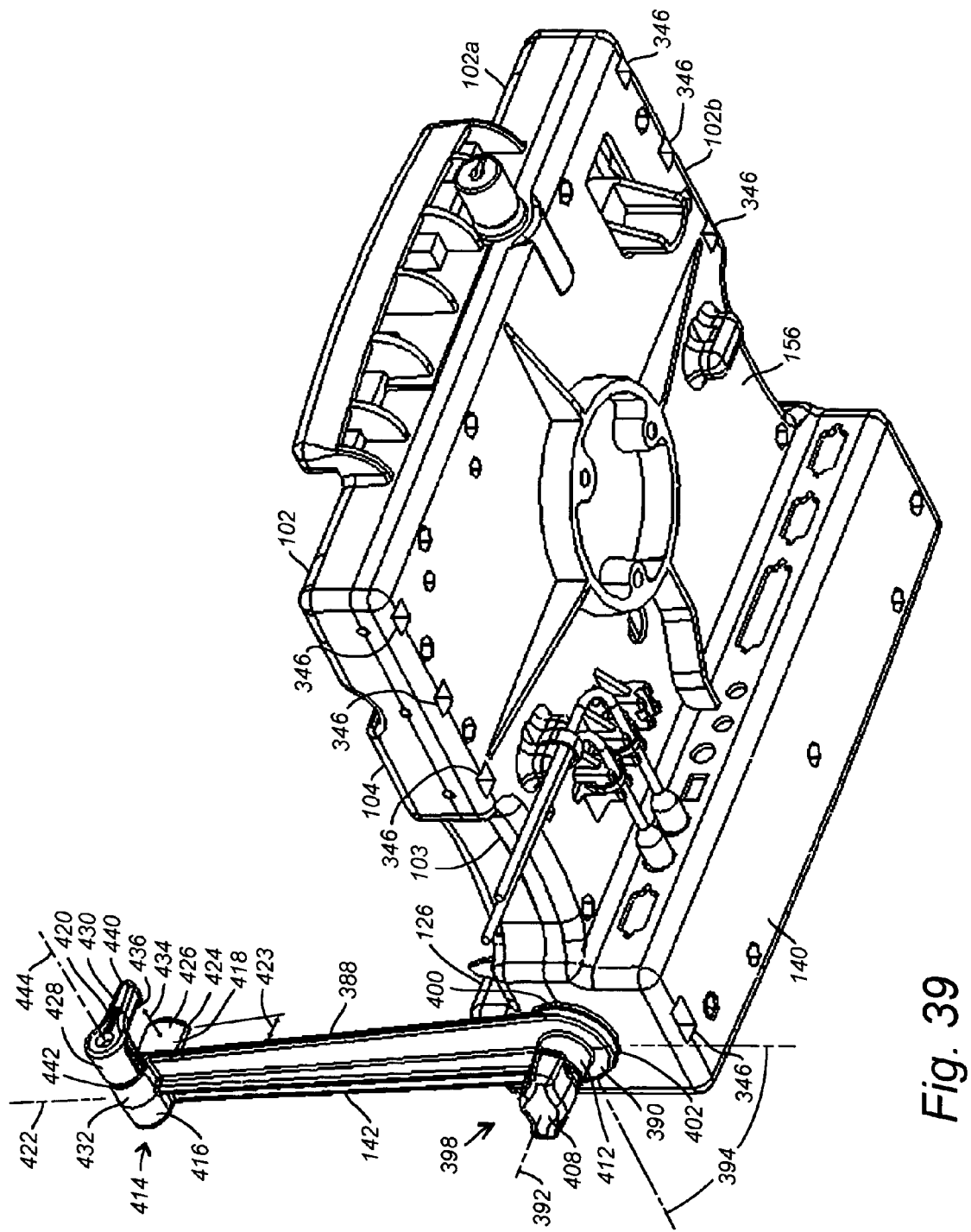
FIG. 39 illustrates a novel display unit support of the invention that is structured for supporting the computer's flat display unit.

FIG. 39 illustrates the novel display unit support 142 of the invention that is structured for supporting the computer's flat display unit 9. The display unit support 142 includes an elongated rigid support arm 388 having a first pivot end portion 390 that is pivotally coupled to the docking station body 102, the rigid support arm 388 being pivotal about a pivot axis 392 in a plane 394 that is substantially parallel and adjacent to the side faces 152, 154 of the body portions 102a, 102b and substantially perpendicular to the upper body portion's bearing surface 104. By example and without limitations the pivot end 390 of the support arm 388 is coupled in a pivotal relationship with the two-piece body 102 by a pivot mechanism 398. For example, the pivot mechanism 398 operates about the pivot axis 392 between a hub portion 400 of the body 102 and an enlarged shoulder portion 402 at the pivot end 390 of the arm 388. According to one optional embodiment of the display unit support 142, the shoulder portion 402 of the support arm 388 rotates about a pivot axle 404 (shown in one or more subsequent figures) that is aligned along the pivot axis 392 and extends between a hub portion 400 of the body 102 and the arm's shoulder portion 402. Alternative embodiments of the pivot mechanism 398 may be substituted without departing from the spirit and scope of the invention.

The support arm 388 is constrained to operate about the pivot mechanism 398 with the shoulder portion 402 abutting the body's hub portion 400 by the pivot mechanism 398. By example and without limitation, the axle 404 is optionally a screw or bolt passed through one of the edge mounting holes 148 of the type described herein and threaded into a nut 406 (shown in one or more subsequent figures) in one of the nut pockets 346 of the type described herein. Thereafter, a knob or handle 408 on the axle 404 is operated for tightening and loosening of the shoulder portion 402 of the support arm 388 vis-à-vis the hub portion 400 of the body 102 by turning relative to the nut 406 in the nut pocket 346 of the body 102. Thus, the handle 408 on the head portion 410 of the axle 404 operates against an outside face 412 of the shoulder portion 402 of the support arm 388 to compress the shoulder portion 402 against the body's hub 400. Accordingly, friction between the shoulder portion 402 and the hub 400 caused by tightening of the handle 408 on the head portion 410 of the axle 404, constrains the support arm 388 to remain in a selected rotational orientation with the upper body portion's bearing surface 104. The display unit support 142 thus constrains the computer's flat display unit 9 in the selected rotational orientation. The rotational orientation of the support arm 388 of the display unit support 142 with the upper body portion's bearing surface 104 is thus infinitely adjustable by alternately loosening and tightening the handle 408.

The novel display unit support 142 of the invention also includes a novel display unit clamping mechanism 414 adjacent to a second extreme support end portion 416 of the rigid support arm 388 opposite from the first pivot end portion 390. By example and without limitation, the display unit clamping mechanism 414 adjacent to the second support end portion 416 of the support arm 388 is structured as a spring-loaded vice for constraining the display unit 9 relative to the support end portion 416 of the support arm 388. Accordingly, the display unit 9 is pinched between an integral substantially rigid anvil 418 and a separate and rotatable substantially rigid jaw 420. By example and without limitation, the clamping mechanism 414 includes the substantially rigid anvil 418 being integral with the elongated support arm 388. The supporting anvil 418 is extended laterally to a longitudinal axis 422 of the support arm 388 to an extent 423 that at least an end portion 424 of the anvil 418 distal from the support arm 388 is projected into space in a position opposite from a portion of the bearing surface 104 in the vicinity of either one of the pair of fixedly positioned engaging pins 114a and 114b (shown) and spaced away from the computer bearing surface 104 by several inches. The anvil 418 is formed with an arcuate support surface 426 that is curved in a convex shape covering an extended arc having a substantially smooth face aligned generally with the longitudinal axis 422 of the elongated support arm 388 and facing toward the front face 172 of the body 102a such that the hard shell backing portion 9b of the display unit 9 is supported in an upright position relative to the keyboard 7 on the top face 2b of the computer casing 2 by resting against the arcuate support surface 426 of the anvil 418, as illustrated herein.

The separate substantially rigid jaw 420 includes a first proximate barrel-shaped knuckle portion 428 that is projected inward of a substantially rigid finger 430. The knuckle portion 428 of the jaw 420 is coupled to the anvil 418 adjacent to a heal portion 432 thereof proximate to the end portion 416 of the support arm 388. The knuckle portion 428 spaces the rigid finger 430 away from the arcuate support surface 426 of the anvil 448 by a variable short distance 434 that is adjustably configured to permit the flat display unit 9 of the computer 1 to fit therebetween. The short distance 434 by which the finger 430 is spaced away from the arcuate support surface 426 of the anvil 418 is adjustable to accept therebetween different thicknesses t of flat display units 9 of different computers 1 (illustrated in FIG. 1). The short distance 434 is also variable as discussed herein to permit the flat display units 9 to rotate to different orientations with the keyboard 7 on the top face 2b of the computer casing 2, while remaining constrained against the arcuate support surface 426 of the anvil 418 by the jaw 420.

Furthermore, an integral hard nub or button 436 (more clearly shown in one or more subsequent figures) is optionally projected slightly from an inward facing surface 438 of the rigid finger 430 adjacent to a second end 440 thereof distal from the first proximate knuckle portion 428 thereof. The jaw 420 is thus positioned in a pinching relationship to the anvil 418 such as to capture the display unit 9 between the arcuate support surface 426 of the anvil 418 and the nub 436 projected from the distal end 440 of the rigid finger 430. Thus, the display screen surface portion 9*a* of the display unit 9 is supported in an upright position relative to the keyboard 7 on the top face 2*b* of the computer casing 2 by the rigid jaw 420, as illustrated herein. Accordingly, the display unit 9 of the computer 1 is constrained from falling backward away from the keyboard 7 by the anvil 418, and is simultaneously constrained from falling forward toward the keyboard 7 by the jaw 420.

The display unit clamping mechanism 414 also includes a variable pressure resilient biasing mechanism 442 (detailed in a subsequent figure) that resiliently biases the jaw 420 toward the arcuate support surface 426 of the anvil 418 in the pinching relationship described herein. By example and without limitation, the biasing mechanism 442 automatically varies the spacing distance 434 to accommodate the varying cross-sectional thickness of the display unit 9 of the computer 1 of the prior art as the display unit 9 is rotated relative to the top face 2*b* of the computer casing 2 about its hinge axis h into different upright positions at the back of the keyboard 7.

Figure 40:
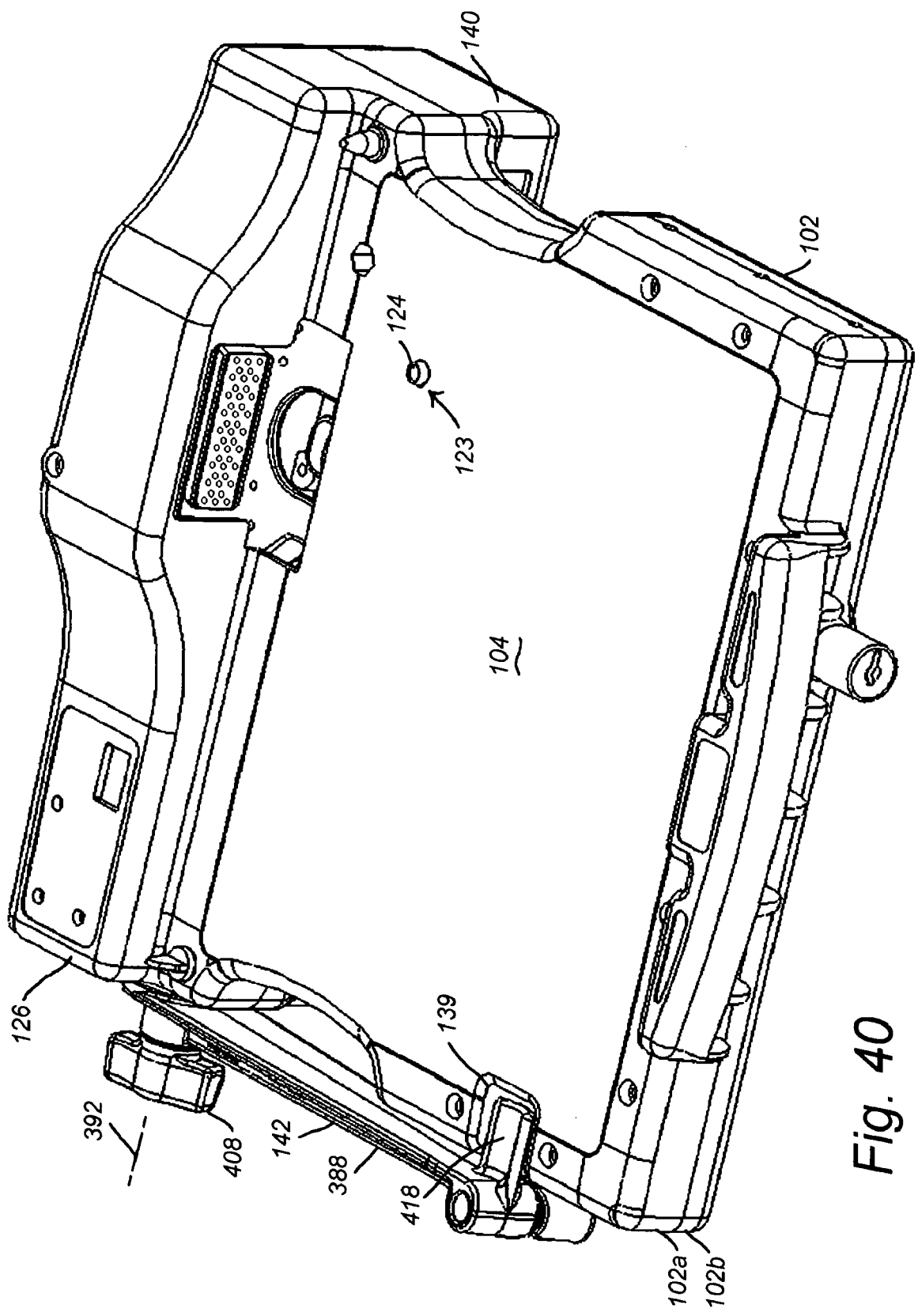
FIG. 40 illustrates the novel display unit support of the invention in a stored position having a rigid support arm rotated about a pivot axis toward a bearing surface of the upper body portion of the novel docking station of the invention, and an anvil of the novel display unit support being nested in an edge recess of the novel body portion.

FIG. 40 illustrates the novel display unit support 142 of the invention in a stored position having the support arm 388 rotated about the pivot axis 392 toward the bearing surface 104 of the upper body portion 102*a*, and the anvil 419 is nested in the edge recess 139. The edge recess 139 is sized such that the anvil 418 is nested below the bearing surface 104 so as not to interfere with seating of the computer 1. The knob 408 may be tightened to secure the support arm 388 in the stored position.

Figure 41:
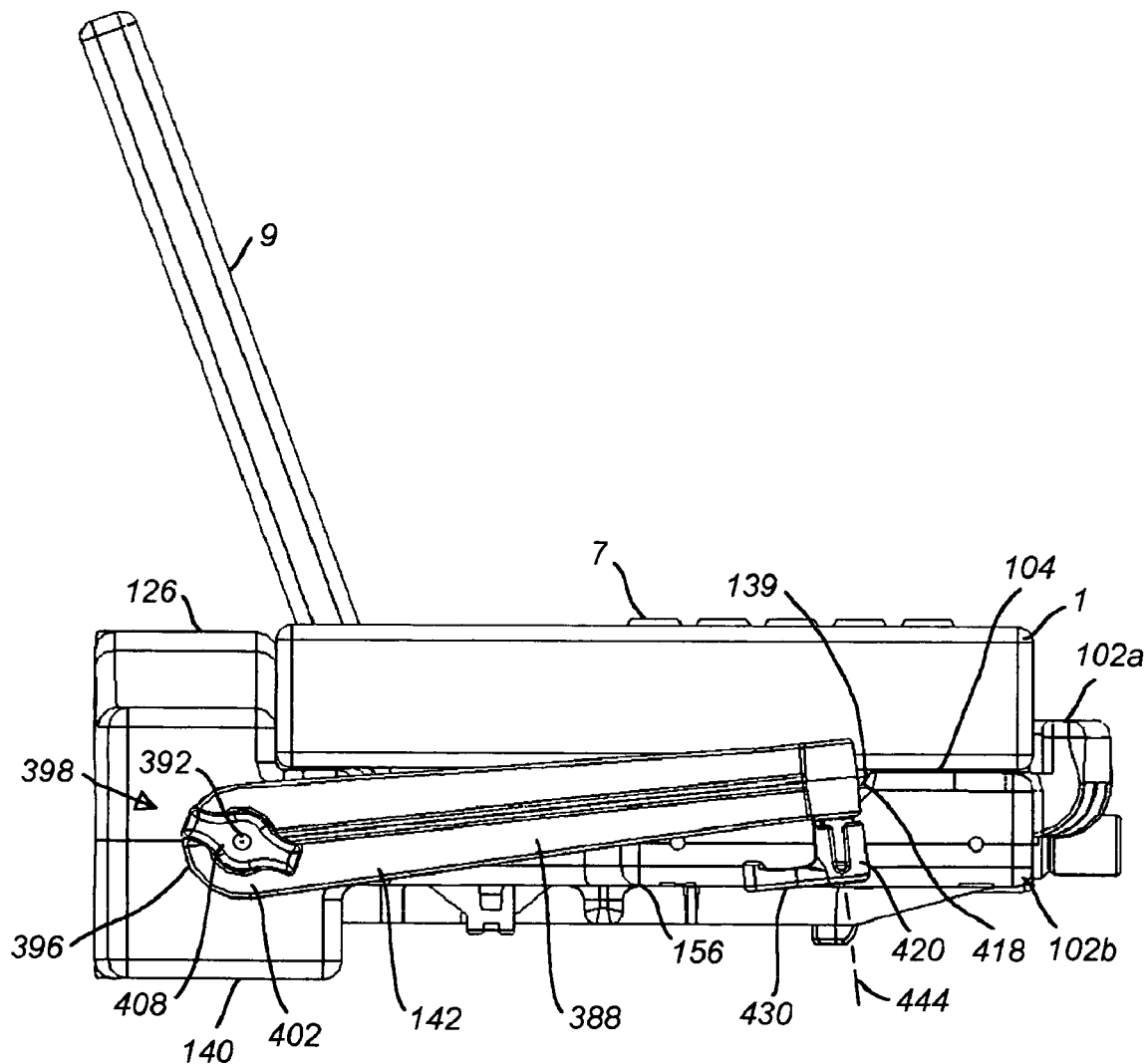
FIG. 41 is a side view that illustrates the jaw of the novel display unit support of the invention being rotated about a drive axis of a novel biasing mechanism into substantial alignment with the support arm during storing of the novel display unit support.

FIG. 41 is a side view that illustrates the jaw 420 of the display unit support 142 of the invention being rotated about a drive axis 444 of the biasing mechanism 442 into substantial alignment with the support arm 388 during storing of the display unit support 142. When rotated into this rest position, the jaw 420 does not interfere with nesting of the anvil 418 in the edge recess 139.

Figure 42:
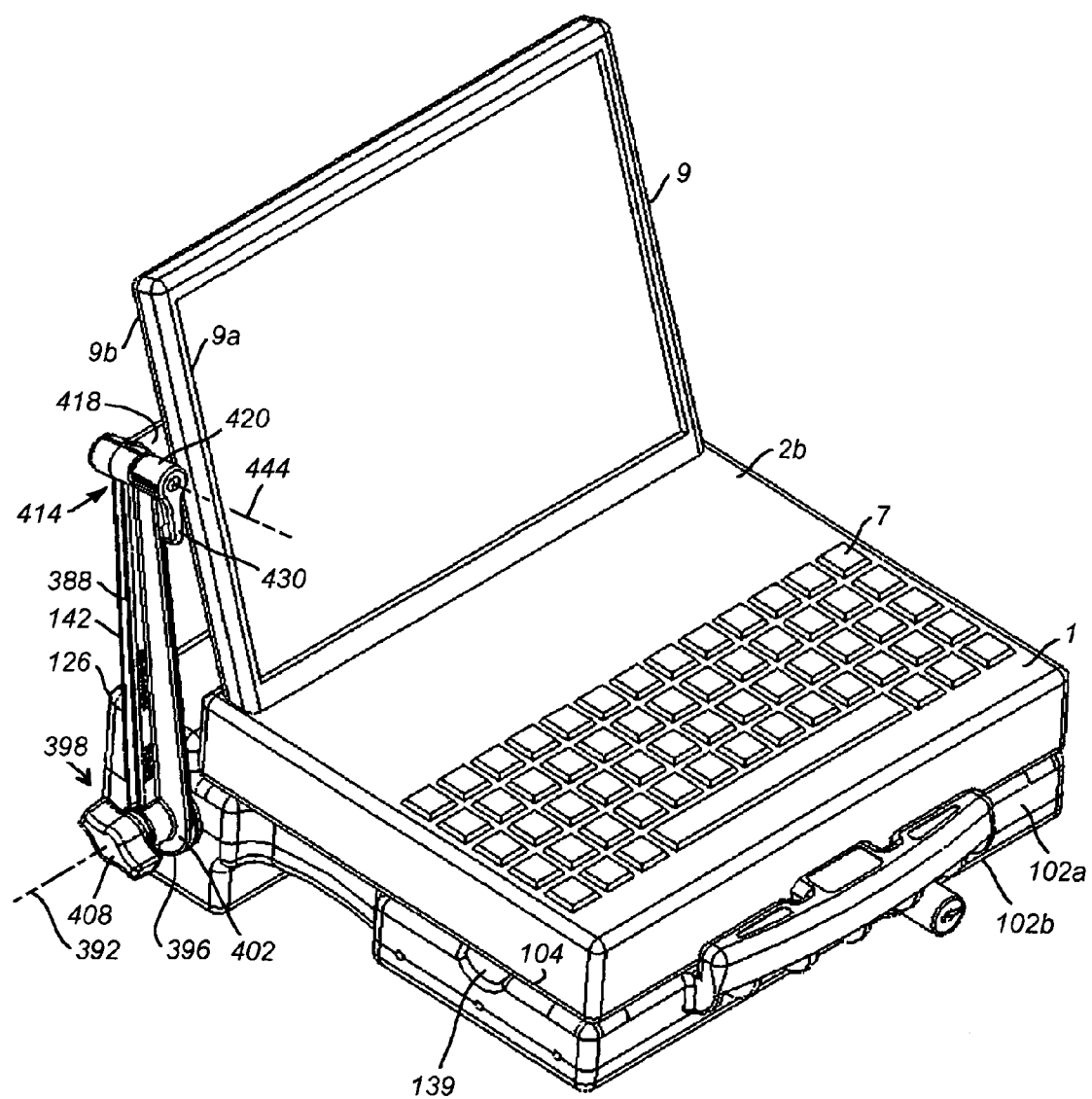
FIG. 42 illustrates the novel docking station of the invention with the novel display unit support in an active position having the support arm rotated about the pivot axis with the novel display unit clamping mechanism supporting the display unit of the computer in an open upright position relative to the computer's keyboard on the computer casing top face.

FIG. 42 illustrates the docking station 100 of the invention with the novel display unit support 142 in an active position having the support arm 388 rotated about the pivot axis 392 with the display unit clamping mechanism 414 supporting the display unit 9 in an open upright position relative to the keyboard 7 on the top face 2*b* of the computer casing 2. Accordingly, the anvil 418 is positioned supporting the hard shell backing portion 9*b* of the display unit 9. Here, the jaw 420 is illustrated as being rotated about the drive axis 444 into substantial alignment with the support arm 388. Accordingly, the jaw 420 does not interfere with closing the display unit 9 over the top face 2*b* of the computer casing 2. The knob 408 may be tightened to secure the support arm 388 in the active position.

Figure 43:
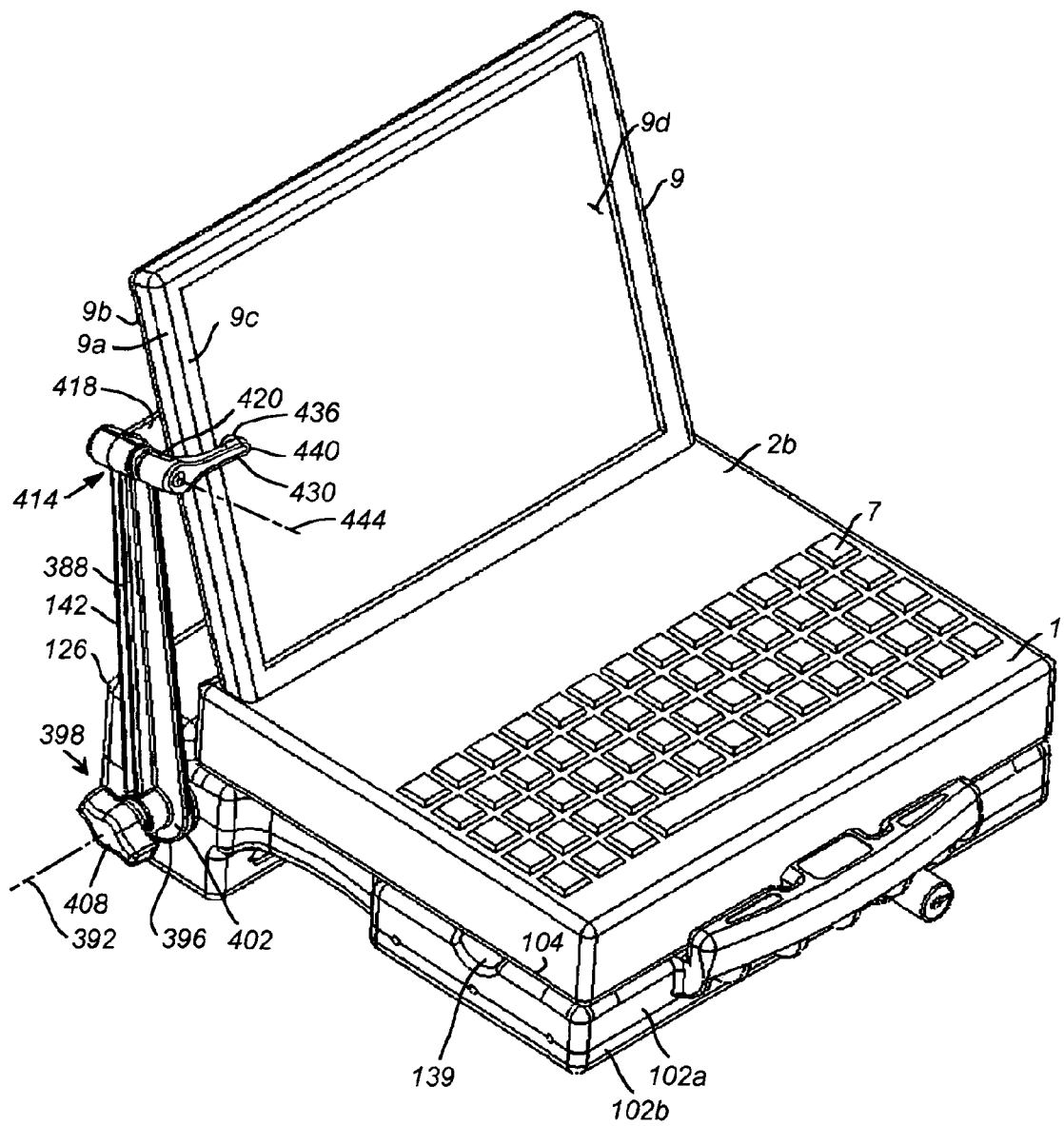
FIG. 43 illustrates the docking station of the invention with the novel display unit support in an active position having the support arm rotated about the pivot axis with the display unit clamping mechanism of the invention supporting the computer display unit in an open upright position relative to the computer keyboard with the anvil being positioned supporting the hard shell backing portion of the computer display unit.

FIG. 43 illustrates the docking station 100 of the invention with the novel display unit support 142 in an active position having the support arm 388 rotated about the pivot axis 392 with the display unit clamping mechanism 414 supporting the display unit 9 in an open upright position relative to the keyboard 7 on the top face 2*b* of the computer casing 2. Here, the anvil 418 is positioned supporting the hard shell backing portion 9*b* of the display unit 9. Furthermore, the jaw 420 is illustrated as being rotated into its active position supporting the display screen surface portion 9*a* of the display unit 9 in the upright position relative to the keyboard 7 on the top face 2*b* of the computer casing 2. The display unit 9 is thus constrained in the upright position by the pincer action of the jaw 420 relative to the anvil 418. As illustrated, the button 436 at the second end 440 of the inward facing surface 438 of the rigid finger 430 presses against the display screen surface portion 9*a* of the display unit 9.

Furthermore, as illustrated here, the second end 440 of the rigid finger 430 extends sufficiently from the jaw 420 that the button 436 on the inward facing surface 438 thereof is extended over the hard shell lip portion 9*c* of the display unit 9 onto the display screen 9*d*. The rigid finger 430 thus wraps around the hard shell lip portion 9*c* of the display unit 9, and the button 436 thus falls below the lip portion 9*c* onto the display screen 9*d*. Accordingly, the novel display unit clamping mechanism 414 is constrained from slipping laterally off of the lip portion 9*c* and inadvertently releasing the display unit 9.

FIGS. 44 through 50 illustrate that the arcuate support surface 426 of the anvil 418 permits the backing portion 9*b* of the display unit 9 to roll thereabout in smooth substantially constant contact during rotation relative to the keyboard 7 on the top face 2*b* of the computer casing 2. Simultaneously therewith the rigid jaw 420 constrains the display unit 9 to follow rotations of the support arm 388 about the pivot axis 392. For example, the integral hard nub or button 436 on the tip 440 of the rigid finger 430 presses against the display screen 9*d* and forces the display screen surface 9*a* toward the arcuate support surface 426 of the anvil 418.

Figure 44:
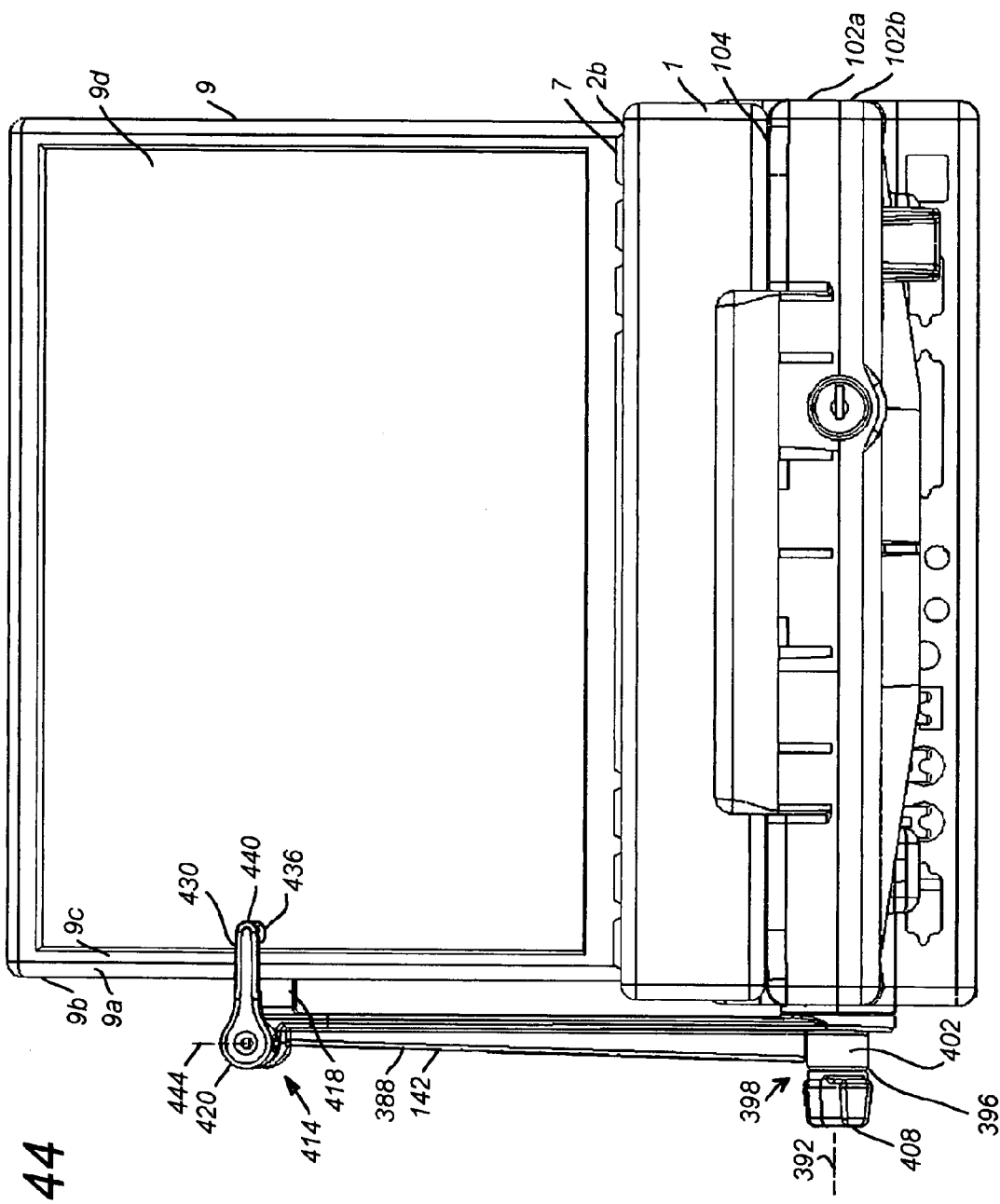

FIG. 44 also illustrates the docking station 100 of the invention with the novel display unit support 142 in the active position of FIG. 43, having the support arm 388 rotated about the pivot axis 392 with the display unit clamping mechanism 414 supporting the display unit 9 in an open upright position relative to the keyboard 7 on the top face 2*b* of the computer casing 2. Here, the anvil 418 is positioned supporting the hard shell backing portion 9*b* of the display unit 9, while the jaw 420 is positioned supporting the display screen surface portion 9*a*. The display unit 9 is thus constrained in the upright position between the jaw 420 and the anvil 418.

Figure 45:
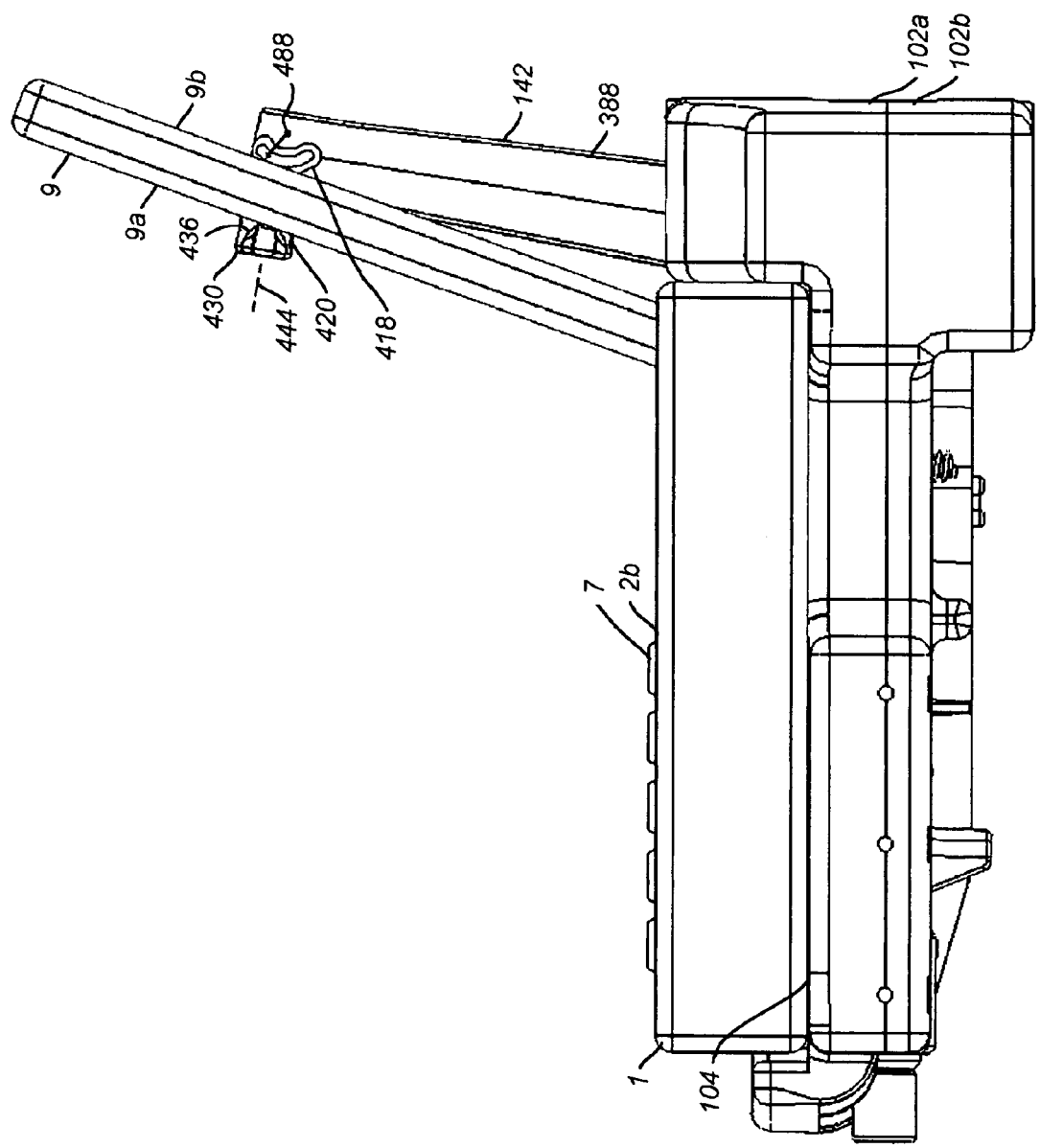

FIG. 45 is a side view of the docking station 100 having the display unit support 142 in one active position, as illustrated in previous figures, having the support arm 388 rotated about the pivot axis 392 with the display unit clamping mechanism 414 supporting the display unit 9 in one open over-center position relative to the keyboard 7 on the top face 2*b* of the computer casing 2. In this active over-center position, the anvil 418 is positioned supporting the hard shell backing portion 9*b* of the display unit 9. The jaw 420 is rotated into its active position supporting the display screen surface portion 9*a* of the display unit 9 in the upright over-center position relative to the keyboard 7 on the top face 2*b* of the computer casing 2. The display unit 9 is thus constrained in the open over-center position by the pincer action of the jaw 420 relative to the anvil 418.

Figure 46:
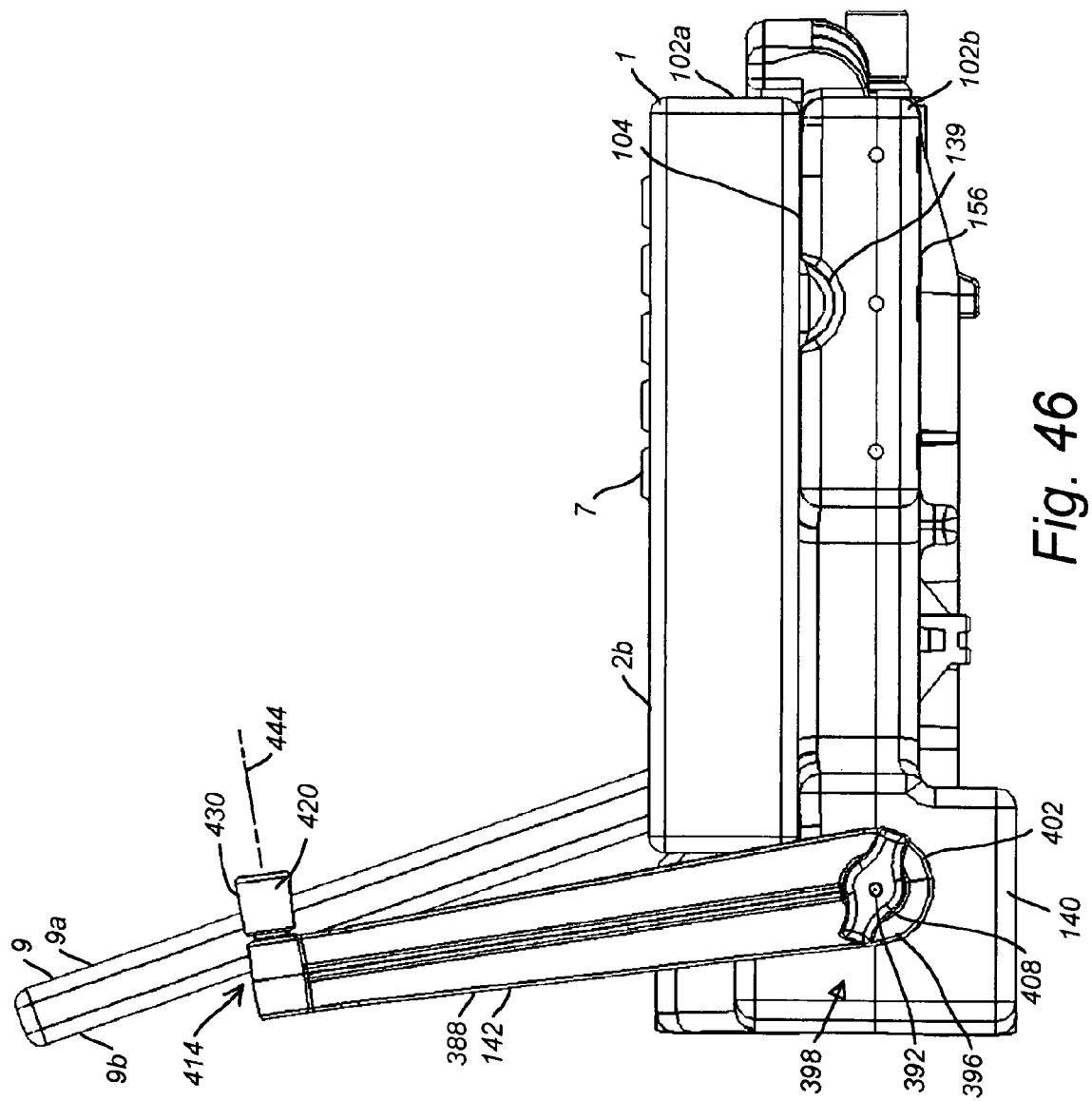

FIG. 46 is an opposite side view of the display unit support 142 in the active position of FIG. 45 for constraining the display unit 9 in the open over-center position by the pincer action of the jaw 420 relative to the anvil 418. Here, the knob 408 is tightened to secure the support arm 388 in the active over-center position.

Figure 47:
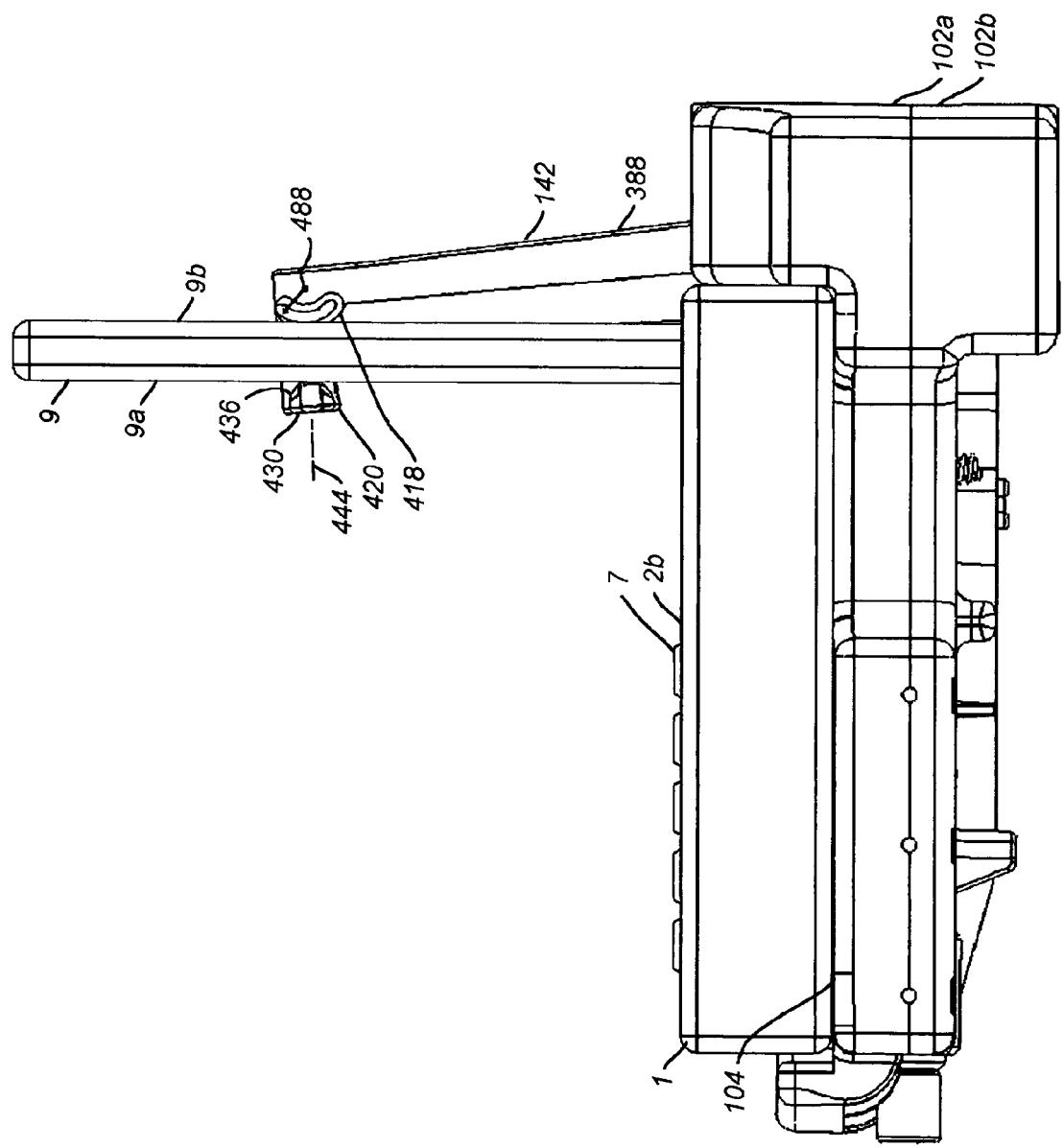

FIG. 47 is a side view of the docking station 100 having the display unit support 142 in another active position having the support arm 388 rotated about the pivot axis 392 with the display unit clamping mechanism 414 supporting the display unit 9 in a substantially vertical upright position relative to the keyboard 7 on the top face 2b of the computer casing 2. In this active upright position, the anvil 418 is positioned supporting the hard shell backing portion 9b of the display unit 9. The jaw 420 is rotated into its active position supporting the display screen surface portion 9a of the display unit 9 in the upright position relative to the keyboard 7 on the top face 2b of the computer casing 2. The display unit 9 is thus constrained in the upright position by the pincer action of the jaw 420 relative to the anvil 418.

Figure 48:
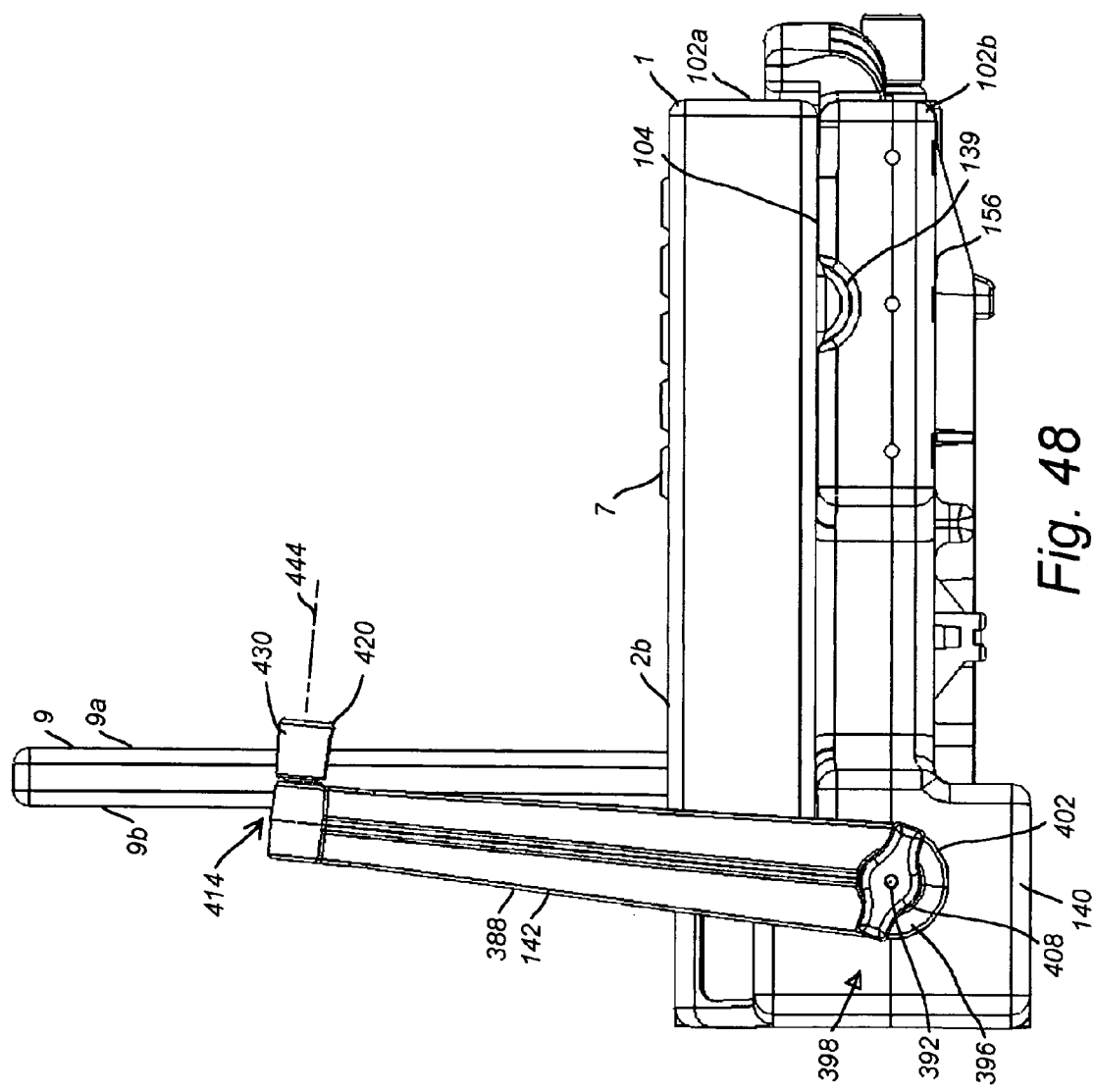

FIG. 48 is an opposite side view of the display unit support 142 in the active position of FIG. 47 for constraining the display unit 9 in the substantially vertical upright position by the pincer action of the jaw 420 relative to the anvil 418. Here, the knob 408 is tightened to secure the support arm 388 in the upright position.

Figure 49:
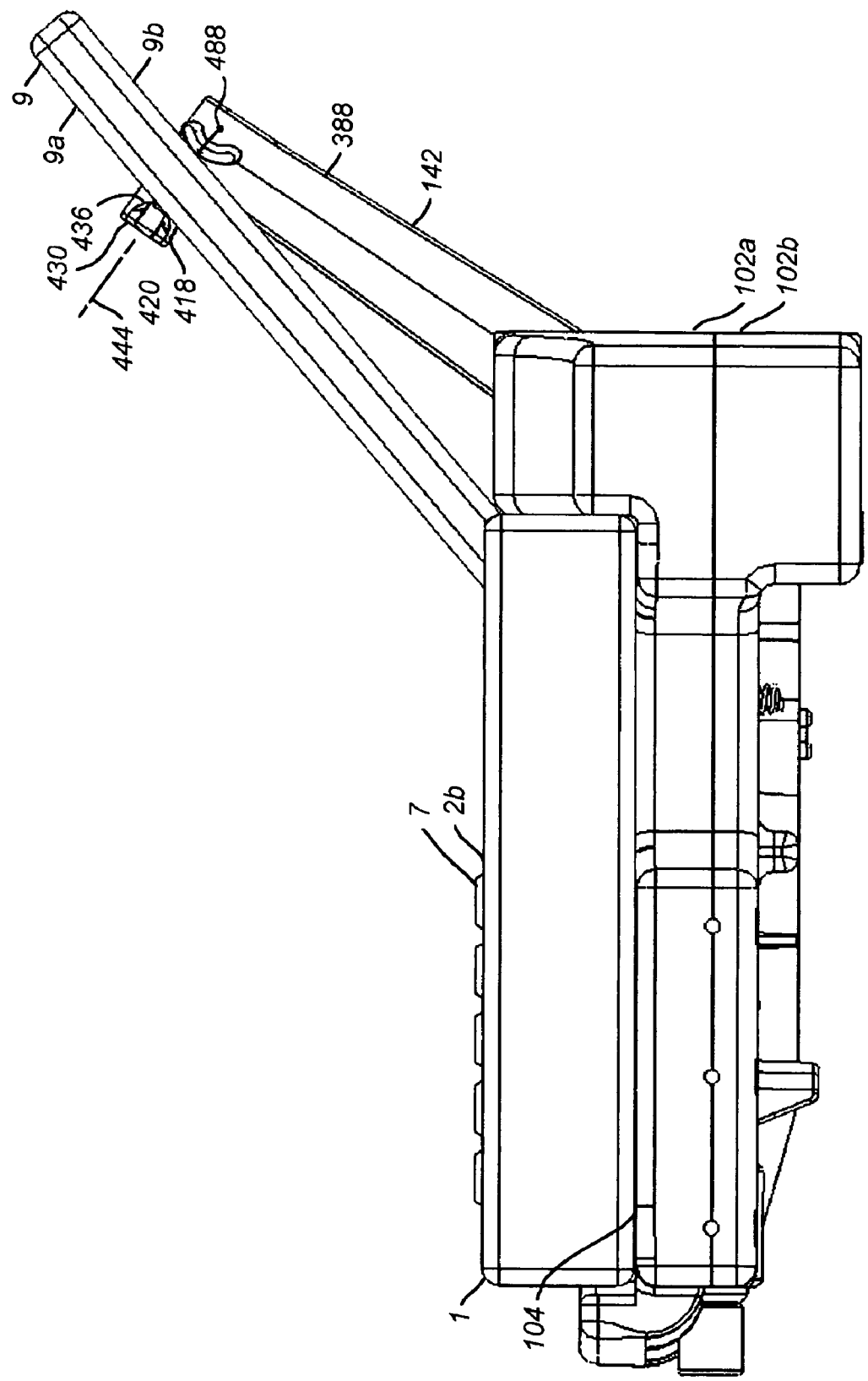

FIG. 49 is a side view of the docking station 100 having the display unit support 142 in another active position having the support arm 388 rotated about the pivot axis 392 with the display unit clamping mechanism 414 supporting the display unit 9 in another open position having the display unit 9 in an extreme over-center upright position relative to the keyboard 7 on the top face 2b of the computer casing 2. In this active extreme over-center position, the anvil 418 is positioned supporting the hard shell backing portion 9b of the display unit 9. The jaw 420 is rotated into its active position supporting the display screen surface portion 9a of the display unit 9 in the extreme over-center open position relative to the keyboard 7 on the top face 2b of the computer casing 2. The display unit 9 is thus constrained in the extreme over-center open position by the pincer action of the jaw 420 relative to the anvil 418.

Figure 50:
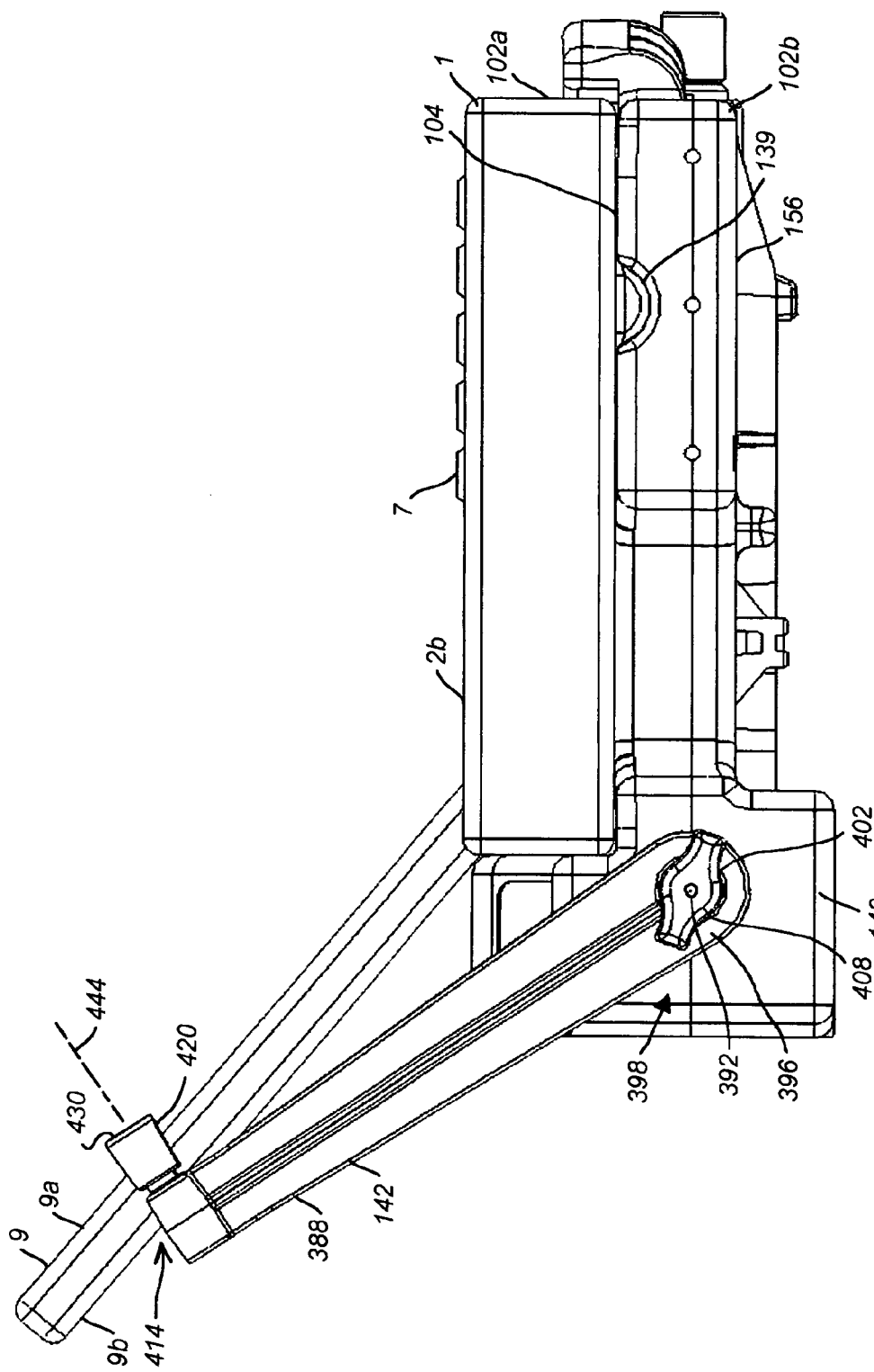

FIG. 50 is an opposite side view of the display unit support 142 in the active position of FIG. 49 for constraining the display unit 9 in the extreme over-center open position by the pincer action of the jaw 420 relative to the anvil 418. Here, the knob 408 is tightened to secure the support arm 388 in the extreme over-center position.

Figure 51:
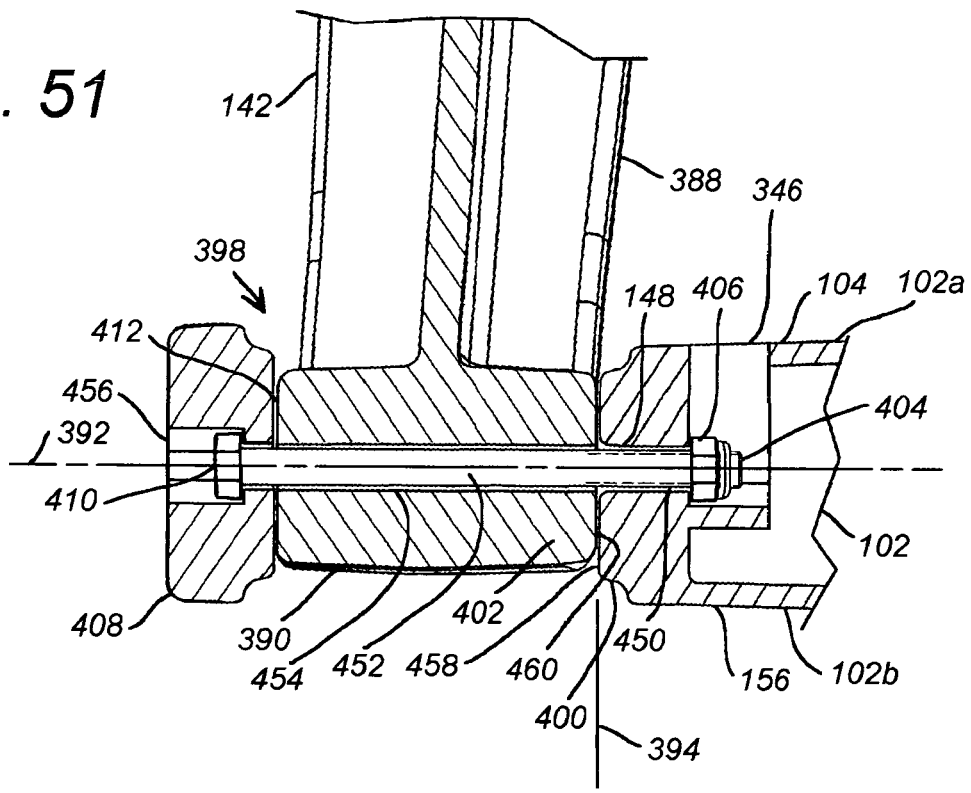
FIG. 51 illustrates by example and without limitation the pivot mechanism of the invention that constrains the support arm to operate about the pivot axis with the shoulder portion abutting the body's hub portion.

FIG. 51 illustrates by example and without limitation the pivot mechanism 398 that constrains the support arm 388 to operate about the pivot axis 392 with the shoulder portion 402 abutting the body's hub portion 400. By example and without limitation, when the pivot axle 404 is a screw or bolt such as a shoulder bolt, it includes a first threaded end 450 that is sized to pass through none of the body's edge mounting holes 148 of the type described herein. The threaded end 450 of the screw or bolt type pivot axle 404 is threaded into the nut 406 installed in one of the nut pockets 346 of the type described herein wherein the nut 406 is optionally a lock nut of the hex variety. Additionally, a shaft portion 452 of the screw or bolt type pivot axle 404 passes through a complementary rotational clearance bore 454 which is formed through the shoulder portion 402 of the support arm 388 and which is sized to rotate smoothly about the pivot axle shaft portion 452. The head portion 410 of the screw or bolt type pivot axle 404 distal from the body 102 is by example and without limitation constrained in a recessed nut pocket 456 formed in the knob or handle 408. The knob 408 constrains the head portion 410 of the pivot axle 404 for tightening and loosening of the shoulder portion 402 of the support arm 388 vis-à-vis the hub portion 400 of the body 102 by turning relative to the nut 406 in the nut pocket 346 of the body 102. Thus, the handle 408 on the head portion 410 of the pivot axle 404 operates against the outside face 412 of the shoulder portion 402 of the support arm 388 to compress an inside face 458 the shoulder portion 402 against an outside face 460 of the hub 400. Accordingly, friction between the inside face 458 the shoulder portion 402 against an outside face 460 of the hub 400 constrains the support arm 388 to remain in a selected rotational orientation with the upper body portion's bearing surface 104, whereby the display unit support 142 constrains the computer's flat display unit 9 in the selected rotational orientation. The rotational orientation of the support arm 388 of the display unit support 142 is thus infinitely adjustable relative to the upper body portion's bearing surface 104.

Alternative embodiments of the pivot mechanism 398 may be substituted without departing from the spirit and scope of the invention.

Figure 52:
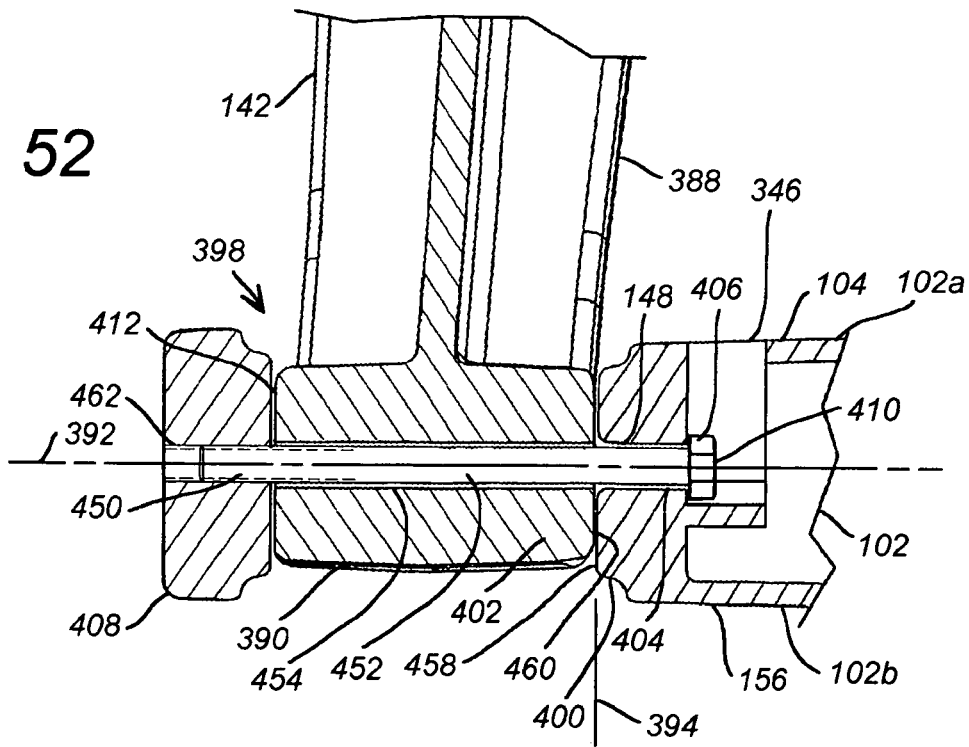
FIG. 52 illustrates by example and without limitation one alternative configuration of the pivot mechanism of the invention wherein the head portion of a screw or bolt type pivot axle is constrained in the body's novel nut pockets.

FIG. 52 illustrates by example and without limitation one alternative configuration of the pivot mechanism 398 wherein the head portion 410 of the screw or bolt type pivot axle 404 is constrained in the one of the body's nut pockets 346. The shaft portion 452 of the pivot axle 404 passes through the body's edge mounting holes 148 and extends through the complementary rotational clearance bore 454 which is formed through the shoulder portion 402 of the support arm 388. The threaded end 450 of the pivot axle 404 is threaded into a complementary threaded bore 462 in the knob 408, which is operable for tightening and loosening of the shoulder portion 402 of the support arm 388 vis-à-vis the hub portion 400 of the body 102 by turning relative to the pivot axle 404.

Figure 53:
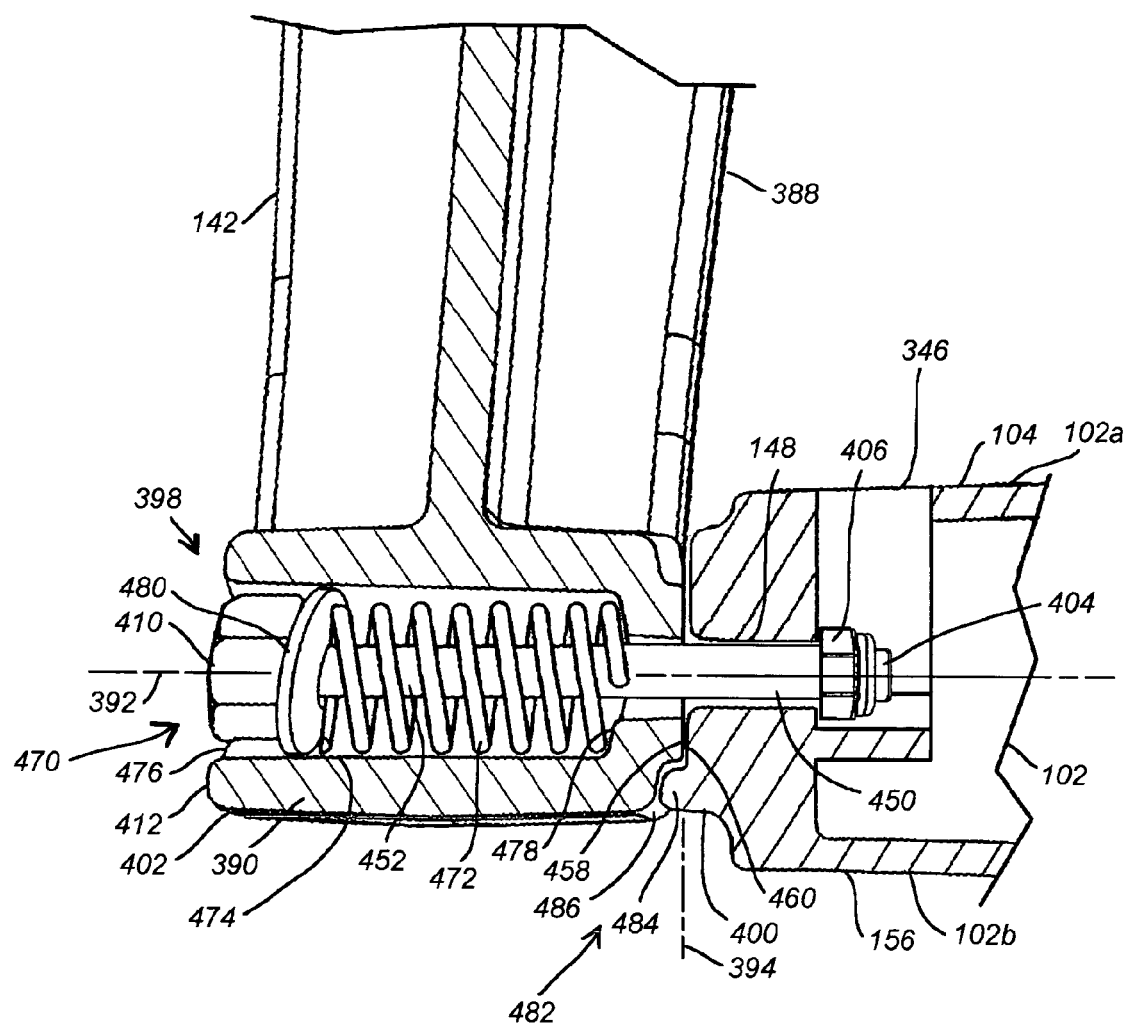
FIG. 53 illustrates by example and without limitation another alternative configuration of the pivot mechanism illustrated in FIG. 52.

FIG. 53 illustrates by example and without limitation another alternative configuration of the pivot mechanism 398. For example, an optional resilient biasing mechanism 470 may be provided for biasing the shoulder portion 402 of the support arm 388 toward the face 460 on the hub portion 400 of the body 102. By example and without limitation, the optional resilient biasing mechanism 470 may be formed of a conventional compression spring 472 installed inside an enlarged counter-bore 474 formed in the shoulder portion 402 through an opening 476 in the outside face 412 of the shoulder portion 402. The spring portion 418 of the biasing mechanism 470 is constrained between a floor portion 478 of the counter-bore 420 and the head portion 410 of the screw or bolt type pivot axle 404. Optionally, a washer 480 may be inserted between the bolt head 410 and the compression spring 472. The spring portion 418 of the biasing mechanism 470 thus operates against the floor portion 478 of the counter-bore 474 to compress the inside face 458 of the shoulder portion 402 of the support arm 388 against the outside face 460 of the body's hub portion 400.

Alternative embodiments of the resilient biasing mechanism 470 may be substituted without departing from the spirit and scope of the invention.

Additionally, a ratcheting mechanism 482 is optionally provided for securing the support arm 388 in rotational relationship with the bearing surface 104 of the body portion 102a. By example and without limitation, a first quantity of one or more teeth 484 are provided on the outside face 460 of the hub 400 portion of the body 102 in a variable intermeshing relationship with a quantity of one or more notches 486 formed on the inside face 458 the arm's shoulder portion 402. The intermeshing teeth 428 and notches 430 permit the arm to be secured in a desired rotational relationship with the body 102 for supporting the computer's display unit 9 in a desired discrete orientation relative to the docking station's computer bearing surface 104.

Figure 54:
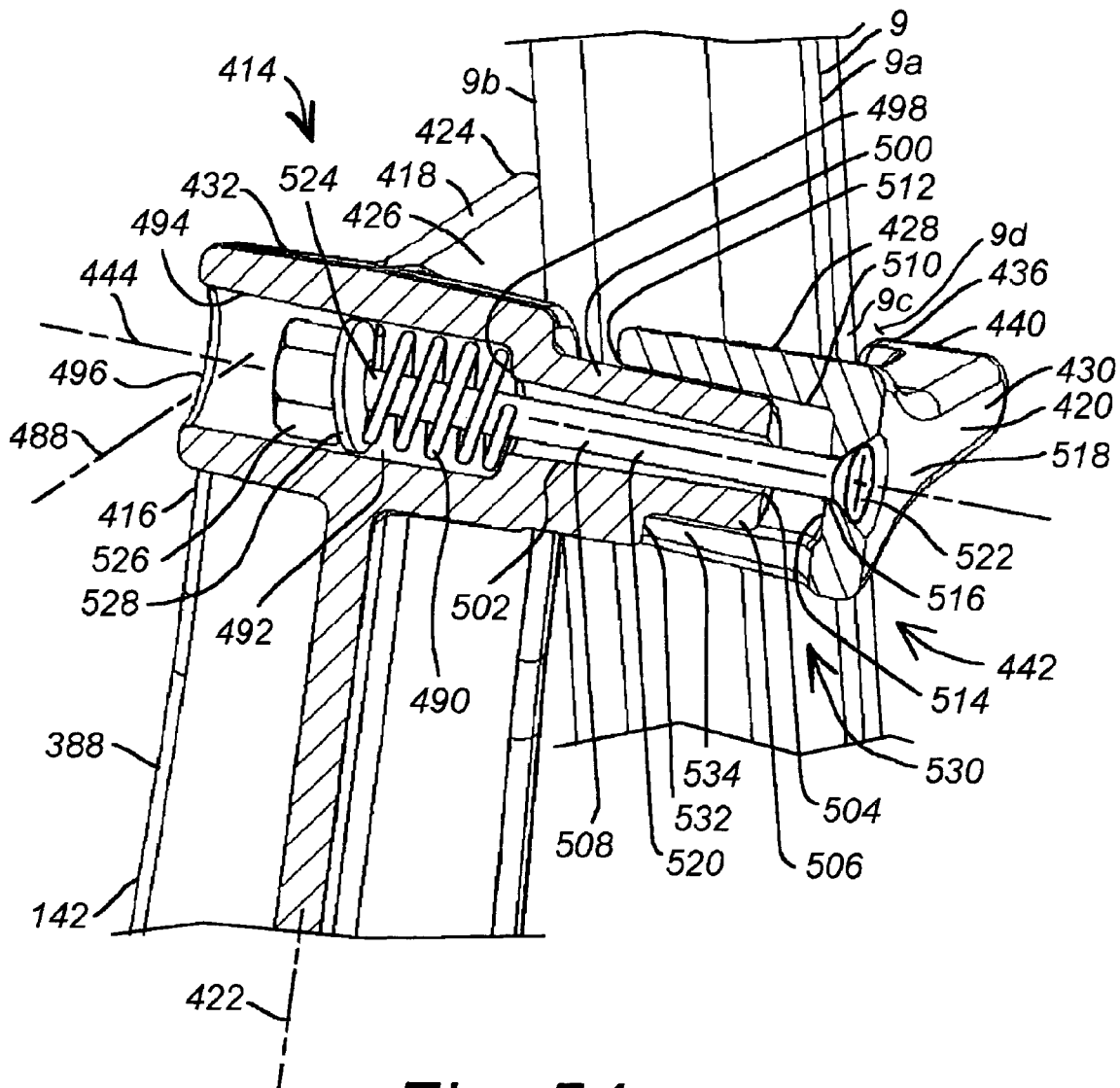
FIG. 54 illustrates by example and without limitation the novel display unit clamping mechanism of the invention of the novel display unit support of the invention in an active configuration clamping the computer's display unit in an open position relative to the computer casing.

FIG. 54 illustrates by example and without limitation the novel display unit clamping mechanism 414 of the display unit support 142 of the invention in an active configuration clamping the display unit 9 in an open position relative to the computer casing 2. The novel display unit clamping mechanism 414 is positioned adjacent to a second extreme support end portion 416 of the rigid support arm 388 opposite from the first pivot end portion 390. By example and without limitation, the display unit clamping mechanism 414 adjacent to the second support end portion 416 of the support arm 388 is a hand for constraining the display unit 9 relative to the support end portion 416 of the support arm 388. As discussed herein, by example and without limitation, the clamping mechanism 414 includes the substantially rigid anvil 418 that is integral with the elongated support arm 388. The anvil 418 is extended laterally to a longitudinal axis 422 of the support arm 388 with its end portion 424 being projected into space in a position above the bearing surface 104. The arcuate support surface 426 of the anvil 418 is curved in the convex shape that covers an extended arc having a center of rotation 488 (best shown in one or more previous figures). The center of rotation 488 is oriented generally parallel with pivot axis 392 of the support arm 388, substantially lateral of the longitudinal axis 422, and substantially crosswise of the drive axis 444 of the biasing mechanism 442. The smooth arcuate support surface 426 is directed generally toward the front face 172 of the body 102a for supporting the hard shell backing portion 9b of the display unit 9.

The first proximate knuckle portion 428 of the separate jaw 420 is movably coupled to the anvil 418 adjacent to the heal portion 432 thereof. The finger portion 430 of the jaw 420 is thus spaced away from the arcuate support surface 426 of the anvil 418 by the variable short distance 434 that is adjustably configured to permit the flat display unit 9 of the computer 1 to fit therebetween. The short distance 434 by which the finger portion 430 of the jaw 420 is spaced away from the arcuate support surface 426 of the anvil 418 is adjustable to accept different thicknesses of flat display units 9 of different computers 1 therebetween. Furthermore, the integral hard nub or button 436 is optionally projected slightly from the inside surface 438 of the rigid finger 430 adjacent to its distal tip 440. The jaw 420 is thus positioned in a pinching relationship to the anvil 418 such as to capture the display unit 9 between the arcuate support surface 426 and the projected nub 436 on the tip 440 of the rigid finger 430. Thus, the display unit 9 is compressed against the arcuate support surface 426 of the anvil 418 by the hard nub 436 on the tip 440 of the rigid finger 430, as illustrated herein.

The display unit clamping mechanism 414 also includes the variable pressure resilient biasing mechanism 442 that resiliently biases the jaw 420 toward the arcuate support surface 426 of the anvil 418 to form the pinching relationship described herein. By example and without limitation, the biasing mechanism 442 automatically varies the spacing distance 434 to accommodate a varying cross-sectional thickness of the display unit 9 as it is rotated about its hinge axis h relative to the top face 2b of the computer casing 2 into different upright positions at the back of the keyboard 7.

By example and without limitation, the biasing mechanism 442 is constructed along the longitudinal drive axis 444 that is oriented generally crosswise of both the longitudinal axis 422 of the support arm 388 and the center of rotation 488 of the arcuate support surface 426 of the anvil 418. By example and without limitation, the biasing mechanism 442 includes a compression spring 490 recessed inside a tubular spring cavity 492 that is counter-bored in a barrel-shaped spring casing 494 of the heal portion 432 at the support end portion 416 of the rigid support arm 388. The tubular spring cavity 492 is substantially aligned along the longitudinal drive axis 444 of the biasing mechanism 442. The tubular spring cavity 492 has a fill size input, opening 496 at it outer end, and terminates in a floor portion 498 at its inner end. A smaller guide pin portion 500 of the heal portion 432 extends from the barrel-shaped cavity 494a long the longitudinal drive axis 444. The guide pin portion 500 of the heal portion 432 is formed therethrough with a tubular clearance bore 502 that communicates between the floor 498 of the tubular spring cavity 492 and an opening 504 at the clearance bore's outer tip 506. The tubular clearance bore 502 through the guide pin portion 500 is sized to complement a pivot axle 508 such as a screw or bolt.

The barrel-shaped knuckle portion 428 of the separate jaw 420 is projected inward of the inward facing surface 438 of the rigid finger 430 along the longitudinal drive axis 444 of the biasing mechanism 442. The barrel-shaped knuckle portion 428 is formed with a complementary tubular counter-bore 510 that is sized to slidingly receive the guide pin portion 500 of the support arm's heal portion 432 through an opening 512 in the end of the knuckle portion 428 distal from the rigid finger 430. The pivot axle 508 is projected substantially central of the tubular counter-bore 510 from a floor 514 thereof and along the longitudinal drive axis 444 of the biasing mechanism 442. By example and without limitation, an aperture or passage 516 is formed in the floor 514 of the tubular counter-bore 510 and communicates with an outward facing surface 518 of the rigid finger 430 opposite from the inward facing surface 438. When the pivot axle 508 is provided as a screw or bolt, the passage 516 is sized to receive a shaft portion 520 of the screw-type pivot axle 508, while the aperture 516 is sized to constrain a head portion 522 from passing.

When the tubular counter bore 510 in the knuckle portion 428 of the jaw 420 is slidingly fit over the guide pin portion 500 projected from the support arm's heal portion 432, the passage 516 in the floor of the tubular counter-bore 510 is substantially aligned with the tubular clearance bore 502 in the guide pin 500. The shaft 520 of the pivot axle 508 is slidingly received through the passage 516, along the tubular clearance bore 502 in the guide pin portion 500 of the spring casing 494, and into the tubular spring cavity 492. The compression spring 490 is received over the pivot axle's shaft 520 and compressed in the tubular spring cavity 492 between the floor portion 498 at its inner end and a second end 524 of the pivot axle 508 opposite from its head 522. For example, a nut 526 and optional washer 528 are installed onto the threaded end of the pivot axle shaft 520.

Additionally, means are provided for securing the jaw 420 relative to the anvil 418 with the finger portion 430 positioned over the display screen surface 9a of the display unit 9 opposite from the arcuate support surface 426. By example and without limitation, a detent mechanism 530 is provided between the guide pin portion 500 of the anvil 418 and the knuckle portion 428 of the jaw 420. The detent mechanism 530 may be formed by example and without limitation by one or more teeth 532 sized to slide into one or more slots 534 formed between the guide pin 500 and the knuckle portion 428 of the jaw 420.

As described, the variable pressure resilient biasing mechanism 442 of the display unit clamping mechanism 414 resiliently biases the jaw 420 toward the arcuate support surface 426 of the anvil 418 in the pinching relationship described herein. As will be generally well understood, the cross-sectional thickness t of the display unit 9 increases and decreases as it is rotated into different orientations relative to the keyboard 7 on the top face 2b of the computer casing 2, the cross-sectional thickness t varying between a minimum when the display unit 9 is in the substantially vertical upright position illustrated in FIG. 47, and a maximum when the display unit 9 is in the extreme over-center position illustrated in FIG. 49.

Accordingly, the biasing mechanism 442 floats the rigid finger 430 along the longitudinal drive axis 444 over the barrel-shaped portion 494 of the anvil 418. The biasing mechanism 442 thus permits the clamping mechanism 414 to accommodate the varying cross-sectional thickness t of the display unit 9 as it is rotated into different orientations relative to the keyboard 7 on the top face 2b of the computer casing 2. As the display unit 9 rotates from the substantially vertical upright position illustrated in FIG. 47, the cross-sectional thickness t increases, and the display unit 9 exerts pressure on the biasing mechanism 442, which spreads the jaw portion 420 of the clamping mechanism 414 resiliently away from the anvil portion 418. However, the spring 490 exerts an opposite compression pressure that squeezes the rigid finger 430 of the jaw 420 against the display screen surface 9a so that the display unit 9 is pressed against the arcuate support surface 426 of the anvil 418. Similarly, when the display unit 9 is rotated from any non-vertical position, such as the extreme over-center position illustrated in FIG. 49, the spring 490 continues to exert the compression pressure that squeezes the rigid finger 430 of the jaw 420 against the display screen surface 9a so that the display unit 9 is pressed against the arcuate support surface 426 of the anvil 418 even while the cross-sectional thickness t decreases.

Furthermore, as illustrated here, the second end 440 of the rigid finger 430 extends sufficiently from the jaw 420 that the button 436 on the inward facing surface 438 thereof is extended over the hard shell lip portion 9c of the display unit 9 onto the display screen 9d. As discussed elsewhere herein, the rigid finger 430 thus wraps around the hard shell lip portion 9c of the display unit 9. The biasing mechanism 442 operating along the longitudinal drive axis 444 forces the button 436 below the lip portion 9c and against the display screen 9d. Accordingly, the biasing mechanism 442 operates the button 436 to constrain the novel display unit clamping mechanism 414 from slipping laterally off of the lip portion 9c and inadvertently releasing the display unit 9.

Figure 55:
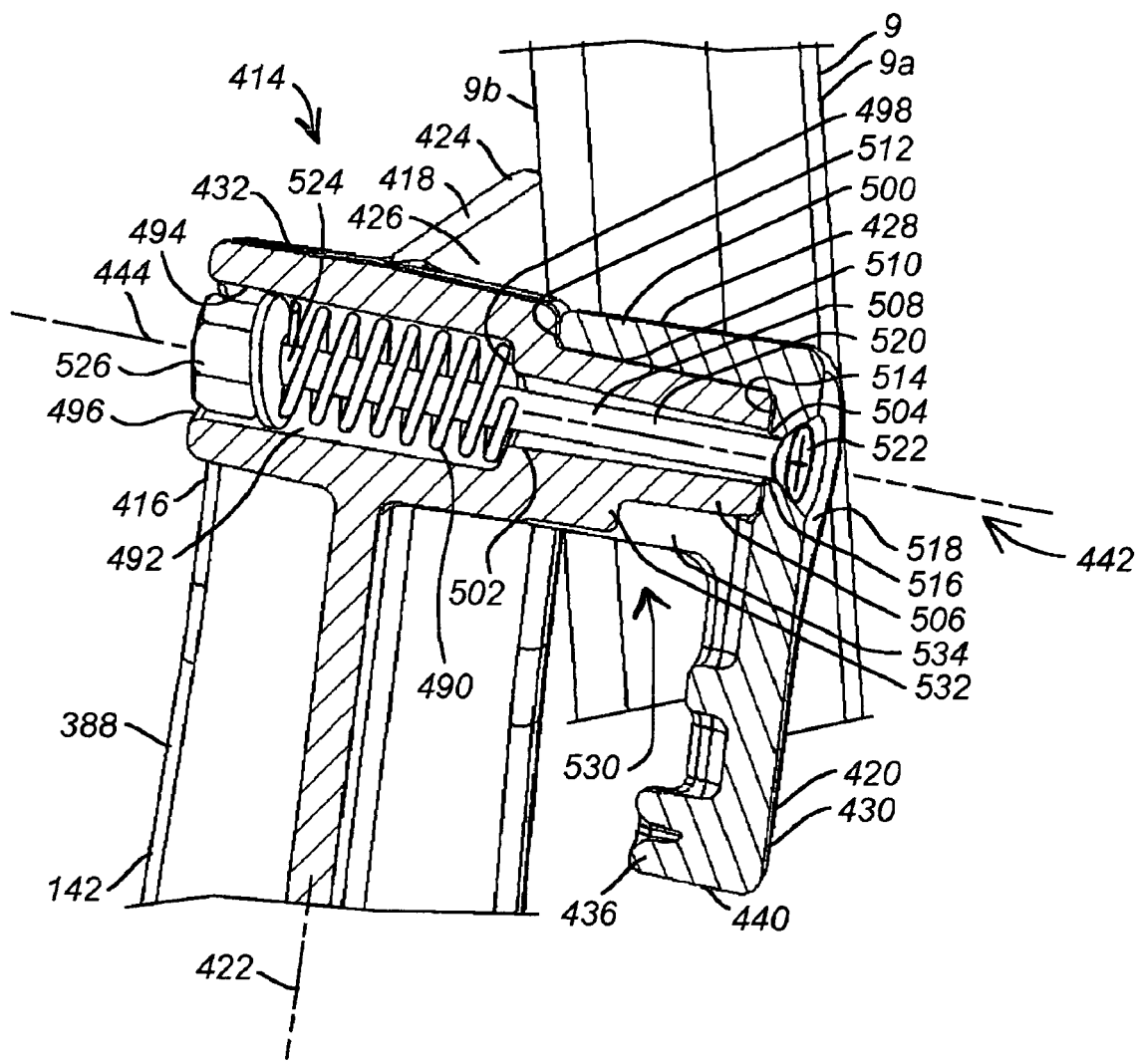
FIG. 55 illustrates by example and without limitation the novel display unit clamping mechanism of the novel display unit support invention in a passive configuration wherein the hard shell backing portion of the computer's display unit is supported by the anvil portion of the support arm with the opposing jaw portion in an open position relative to the computer display unit's display screen surface.

FIG. 55 illustrates by example and without limitation the novel display unit clamping mechanism 414 of the display unit support 142 invention in a passive configuration wherein the hard shell backing portion 9b of the display unit 9 is supported by the anvil 418 portion of the support arm 388 with the opposing jaw portion 420 in an open position relative to the display screen surface 9a. Accordingly, the jaw 420 including the finger portion 430 is rotated away from the active position over the display screen surface 9a. For example, the knuckle 428 is pulled away from the anvil 418 along the longitudinal drive axis 444 until the detent 530 disengages, i.e., until the teeth 532 slide free of the slots 534. The jaw portion 420 is rotated until the finger 430 clears the display unit 9. With the finger 430 in this passive configuration, the jaw 420 is freed and the compression spring 490 draws the knuckle 428 toward the anvil 418 along the longitudinal drive axis 444. The teeth 532 and slots 534 may be additionally configured to form the detent 530 between the between the guide pin portion 500 and the knuckle portion 428 for securing the jaw 420 in the passive configuration vis-à-vis the anvil 418.

Alternative embodiments of the display unit clamping mechanism 414 and biasing mechanism 442 may be substituted without departing from the spirit and scope of the invention.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. An external expanding apparatus for expanding the function of a portable electronic device, the external expanding apparatus comprising:
    an apparatus body having an outer surface, the outer surface comprising a bearing surface structured for receiving the portable electronic device;
    an expansion connector connectable with the portable electronic device;
    an expansion connector drive mechanism structured for moving the expansion connector relative to the bearing surface between a disengaged position and an engaged position, the expansion connector drive mechanism comprising a linearly movable, unitary frame having opposing ends and a handle fixed to the frame, the linearly movable frame being slidably coupled to the apparatus body and adapted for linear movement of the expansion connector relative to the bearing surface thereof, wherein the handle maintains a constant position relative to the expansion connector when the expansion connector is moved relative to the bearing surface, wherein the handle is positioned beneath the bearing surface and does not extend beyond the outer surface of the apparatus body, and wherein the handle and the expansion connector are positioned on opposing ends of the frame; and
    a safety catch operable between the frame and an aperture communicating with the bearing surface, the safety catch being movable between an engaged position and a disengaged position.

2. The apparatus of claim 1, further comprising at least one biasing mechanism coupled for urging the expansion connector toward the disengaged position, wherein the at least one biasing mechanism is positioned substantially parallel to the linear movement of the frame.

3. The apparatus of claim 2 wherein the at least one biasing mechanism has a fixed end and a movable end, wherein the fixed end is positioned closer to the expansion connector than the movable end.

4. The apparatus of claim 2, further comprising a catch mechanism operable for retaining the frame in the engaged position of the expansion connector.

5. The apparatus of claim 4 wherein the handle is further non-pivoting.

6. The apparatus of claim 1 wherein the safety catch comprises a first portion and a second portion, wherein when the safety catch is in the engaged position the first portion extends from the aperture communicating with the bearing surface and the second portion engages with the frame.

7. The apparatus of claim 1 wherein when the safety catch is in the disengaged position the first portion is depressed relative to the bearing surface and the second portion is disengaged from the frame.

8. An external expanding apparatus operable with a portable computer, the external expanding apparatus comprising:
    a body portion adapted for mounting to an external support structure, the body portion having an outer surface, the outer surface comprising a bearing surface and a guide mechanism on an inner face thereof opposite from the bearing surface, and a passage through the bearing plate communicating between the inner and outer faces thereof and positioned between a front edge of the bearing surface and a rear edge thereof;
    an expansion connector drive mechanism being movably coupled to the guide mechanism for moving relative to the inner face of the bearing plate, the expansion connector drive mechanism comprising:
- a substantially rigid unitary frame comprising a follower mechanism structured to cooperate with the guide mechanism on the inner face of the bearing plate for moving the frame substantially linearly relative thereto,
- an expansion connector coupled to a first end of the frame,
- a handle positioned adjacent to a second end of the frame that is opposite to the first end, wherein the handle is positioned beneath the bearing surface, and
- a security portion positioned opposite from the passage through the bearing plate and further comprising a safety catch opening therethrough;

a safety catch operable between the safety catch opening of the security portion of the frame and the passage through the bearing plate and being further biased toward the bearing plate, the safety catch comprising a sensing portion sized to pass through the passage through the bearing plate and being substantially aligned therewith, and a latching portion sized to pass into the safety catch opening of the security portion;

wherein the frame of the expansion connector drive mechanism is further movable between:
- a disengaged position having the expansion connector spaced away from the bearing plate and the rear edge of the bearing surface and having the safety catch opening of the security portion being substantially aligned with the latching portion of the safety catch and substantially engaged therewith, and
- an engaged position having the expansion connector positioned adjacent to the bearing plate and the rear edge of the bearing surface and having the safety catch opening of the security portion being substantially misaligned with the latching portion of the safety catch and disengaged therefrom.

9. The apparatus of claim 8, wherein the frame further comprises a substantially planar interface surface having the follower mechanism formed therein.

10. The apparatus of claim 8 wherein the guide mechanism further comprises a guide positioned on the inner face of the bearing plate; and
the follower mechanism further comprises a substantially linear slot formed in the frame of the expansion connector drive mechanism, the slot having the guide received therein in slidable relationship therewith.

11. The apparatus of claim 10 wherein the handle is further fixedly positioned adjacent to the second end of the frame and is linearly movable in combination therewith, and wherein the handle does not extend beyond the outer surface of the body portion.

12. The apparatus of claim 8, wherein the expansion connector and the handle are fixedly positioned on opposing ends of the frame.

13. An external expanding apparatus for expanding the function of a portable electronic device, the external expanding apparatus comprising:
- an apparatus body comprising a bearing surface on which the portable electronic device is to be placed, and a connector presentation surface adjacent to one edge of the bearing surface;
- an expansion connector connectable with the portable electronic device; and
- an expansion connector drive mechanism coupled for moving the expansion connector along a linear drive axis relative to the connector presentation surface between a disengaged position spaced away from the bearing surface and an engaged position extended over the bearing surface, the expansion connector drive mechanism comprising:
  - a movable unitary frame that is movably coupled to the apparatus body for linear motion relative to the bearing surface between the connector presentation surface and an opposing front portion of the bearing surface, the frame being coupled to the expansion connector, an integral security portion formed with a safety catch slot opening therethrough, and a linearly movable handle positioned on an opposing end of the frame from the expansion connector, and
  - a releasable safety catch operable between the safety catch slot opening through the security portion of the frame and a sensor aperture communicating with the bearing surface, the safety catch being movable between a locked position having a sensing portion thereof received through the sensor aperture and extended above the bearing surface and having a locking portion thereof substantially interlocked with the safety catch slot opening through the security portion of the frame, and an unlocked position having the sensing portion thereof substantially retracted relative to the bearing surface and having the locking portion thereof disengaged from the safety catch slot opening through the security portion of the frame.

14. The apparatus of claim 13, wherein the handle maintains a constant position relative to the expansion connector when the expansion connector is moved relative to the connector presentation surface.

15. An external expanding apparatus for expanding the function of a portable electronic device, the external expanding apparatus comprising:
- an apparatus body comprising a bearing surface structured for receiving the portable electronic device, and further comprising a linear guide positioned opposite from the bearing surface;
- an expansion connector connectable with the portable electronic device;
- a linearly movable frame comprising a linearly movable handle, wherein the handle and the expansion connector are fixedly positioned on opposing ends of the frame, the movable frame being movably coupled to the linear guide of the apparatus body for moving the frame linearly relative to the bearing surface thereof between a disengaged position having the expansion connector linearly spaced away from the bearing surface of the apparatus body, and an engaged position having the expansion connector positioned adjacent to the bearing surface of the apparatus body; and
- an engagement latch coupled to the apparatus body and being engageable with the frame in the engaged position.

16. The apparatus of claim 15 wherein the handle maintains a constant position relative to the expansion connector when the expansion connector is moved relative to the bearing surface.

17. The apparatus of claim 16, further comprising at least one biasing member coupled between the expansion connector frame and the apparatus body, the at least one biasing member urging the expansion connector away from the bearing surface of the apparatus body, and wherein the at least one biasing member is positioned substantially parallel to the linear movement of the frame.

18. The apparatus of claim 17 wherein the at least one biasing member has a fixed end and a movable end, wherein the fixed end is position closer to the expansion connector than the movable end.

19. An external expanding apparatus for expanding the function of a portable electronic device, the external expanding apparatus comprising:
   an apparatus body being further adapted for mounting to an external support structure and comprising a connector presentation surface adjacent to a rear portion of an outer bearing surface and rotated away therefrom, the outer bearing surface being configured and arranged to receive the portable electronic device;
   an expansion connector connectable with the portable electronic device;
   an expansion connector drive mechanism coupled for moving the expansion connector relative to an inner surface of the apparatus body opposite from the bearing surface thereof along a first linear direction between a disengaged position retracted away from the bearing surface into an opening in the connector presentation surface and an engaged position extended from the opening in the connector presentation surface toward the bearing surface, the expansion connector drive mechanism comprising:
      a slidable frame that is movably coupled to the apparatus body for linear motion along the first linear direction relative to the bearing surface between the rear portion thereof and an opposing front portion of the bearing surface opposite therefrom, the frame comprising a first end with the expansion connector mounted thereon, a security portion formed with a safety catch receiver, a linearly movable handle portion proximate to a second end thereof and positioned adjacent to the front portion of the bearing surface of the apparatus body opposite from the expansion connector presentation surface thereof and operable substantially along the first linear direction, and a latch receiver adjacent to the handle,
      at least one biasing member extended along the first linear direction and coupled between a portion of the frame and a portion of the apparatus body spaced away therefrom, and
      a releasable safety catch operable between the safety catch receiver of the security portion of the frame and a sensor aperture communicating with the bearing surface, the safety catch being resiliently biased toward a locked position having a sensing portion thereof received through the sensor aperture and compressibly extended from the bearing surface, and a locking portion thereof engaged with the safety catch receiver of the security portion of the frame, and an unlocked position having the sensing portion thereof resiliently compressed relative to the bearing surface and having the locking portion thereof disengaged from the safety catch receiver of the security portion of the frame; and
   a resiliently biased latch mounted on a portion of the apparatus body and engageable with the latch receiver of the frame.

20. The apparatus of claim 19 wherein the handle is further positioned beneath the bearing surface and does not extend beyond an outer surface of the apparatus body.

21. The apparatus of claim 20 wherein the handle maintains a constant position relative to the expansion connector when the expansion connector is moved relative to the bearing surface.

22. An external expanding apparatus operable with a portable computer, the external expanding apparatus comprising:
   a body comprising mating upper and lower body portions, the lower body portion being adapted for mounting to an external support structure, and the upper body portion further comprising:
      a substantially rigid bearing plate formed with an approximately rectangular computer bearing surface on an outer face thereof,
      an integral housing portion positioned adjacent to a rear portion of the bearing surface and further comprising a cavity extended rearward of the bearing surface, and an expansion connector presentation surface projected above the bearing surface and having an opening thereinto facing the bearing surface and opening into the rearward extended cavity,
      a receiver structure fixedly positioned adjacent to a front portion of the bearing surface opposite from the housing portion and the expansion connector presentation surface thereof,
      a guide mechanism provided on an inner surface of the bearing plate opposite from the bearing surface thereof; the guide mechanism further comprising one or more hubs projected from the inner surface of the bearing plate, and
      a clearance passage through the bearing plate communicating between the inner and outer surfaces thereof and positioned between the front and rear portions of the bearing surface;
   an expansion connector drive mechanism being movably coupled to the guide mechanism for moving relative to the inner face of the bearing plate, the expansion connector drive mechanism comprising:
      a substantially rigid unitary frame comprising first and second opposite ends thereof and a lateral ear portion, and further comprising a follower mechanism structured to cooperate with the guide mechanism on the inner face of the bearing plate for moving the frame relative thereto,
      an expansion connector mounting seat positioned adjacent to the first end of the frame and being adapted for mounting of an expansion connector thereto,
      a security portion positioned opposite from the clearance passage through the bearing plate and further comprising a safety catch receiver formed therein,
      a handle fixed to the adjacent to the second end thereof opposite from the connector seat, wherein the handle maintains a constant position relative to the expansion connector mounting seat when the expansion connector mounting seat is moved relative to the bearing surface, and
      a frame engagement catch;
   a safety catch operable between the safety catch receiver of the security portion of the frame and the clearance passage through the bearing plate and biased toward the bearing plate, the safety catch having a sensing portion sized to pass through the clearance passage through the bearing plate and being substantially aligned therewith, and a latching portion sized to be received into the safety catch receiver of the security portion;
   wherein the frame of the expansion connector drive mechanism is further movable between:
      a disengaged position having the expansion connector mounting seat positioned within the cavity in the housing portion of the upper body portion and having the safety catch receiver of the security portion being substantially misaligned with the safety catch engagement space of the security portion thereof, and an engaged position having the expansion connector mounting seat positioned adjacent to the rear portion of the bearing surflice and having the safety catch receiver of the security portion being substantially aligned with the second latching portion of the safety catch;

at least one disengagement spring coupled between the lateral ear portion of the frame and an interior portion of the upper body portion, the spring resiliently biasing the frame toward the first disengaged position; and a latch coupled to at least one of the upper and lower body portions and engageable with the frame engagement catch of the frame when the frame is in the engaged position thereof 23. The apparatus of claim 22 wherein the expansion connector drive mechanism is further adapted for being coupled to the guide mechanism for only linear motion relative to the inner face of the bearing plate.

24. The apparatus of claim 23 wherein the handle is linearly movable.

25. The apparatus of claim 24, further comprising an expansion connector coupled to the expansion connector mounting seat of the frame.

26. The apparatus of claim 22 wherein the at least one disengagement spring is positioned substantially parallel to the linear movement of the frame.

27. The apparatus of claim 26 wherein the disengagement spring further comprises a tension spring.

28. The apparatus of claim 22 wherein the at least one disengagement spring further comprises a fixed end and a movable end, wherein the fixed end is positioned closer to the expansion connector than the movable end.

29. An external expanding apparatus for electrically coupling with an electronic device, the external expanding apparatus comprising:

an apparatus body comprising a substantially planar surface configured and arranged to receive the electronic device, the substantially planar surface having a front portion and an opposing rear portion;

an expansion connector positioned adjacent to the rear portion of the substantially planar surface, the expansion connector configured and arranged to electrically couple with the electronic device; and a drive mechanism coupled to the expansion connector, the drive mechanism configured and arranged for transitioning between an engaged position wherein the expansion connector is electrically coupleable to the electronic device, and a disengaged position wherein the expansion connector is not electrically coupleable to the electronic device, the drive mechanism comprising a frame having the expansion connector positioned thereon and being positioned beneath the substantially planar surface, the frame configured and arranged to slide linearly along a linear direction of travel relative to the planar surface from the engaged position to the disengaged position, and a handle fixedly coupled to the frame, wherein the handle is movable in a linear direction of travel that is substantially parallel to the linear direction of travel of the frame.

30. The external expanding apparatus of claim 29, further comprising a safety mechanism configured and arranged for preventing the drive mechanism from transitioning to the engaged position when the electronic device is not properly seated on the substantially planar surface of the apparatus body.

31. The external expanding apparatus of claim 30, wherein the safety mechanism further comprises a safety catch comprising a sensing portion and a latching portion, the sensing portion extending at least partially through a safety aperture through the apparatus body and communicating with the substantially planar surface and the latching portion extending in proximity to the frame, the safety catch configured and arranged for transitioning between a first position whereby the frame is slidable and a second position whereby the frame is prevented from sliding by the latching portion.

32. The external expanding apparatus of claim 31, wherein when the safety catch is in the first position thereof the sensing portion is substantially flush with the substantially planar surface of the apparatus body and the latching portion does not obstruct the sliding of the frame, and wherein when the safety catch is in the second position the sensing portion extends outward beyond the substantially planar surface and the latching portion prevents the frame from sliding.

33. The external expanding apparatus of claim 29, wherein sliding the frame along the linear direction of travel thereof towards the front portion of the substantially planar surface transitions the drive mechanism to the engaged position, and sliding the frame towards the rear portion of the substantially planar surface transitions the drive mechanism to the disengaged position.

34. The external expanding apparatus of claim 29, wherein the frame comprises at least one biasing mechanism that is adapted to urge the frame towards the disengaged position.

35. The external expanding apparatus of claim 34, wherein the at least one biasing mechanism is positioned substantially parallel to the direction of travel of the frame.

36. The external expanding apparatus of claim 35, wherein the at least one biasing mechanism has a fixed end and a movable end, wherein the fixed end is positioned closer to the expansion connector than the movable end.

37. The external expanding apparatus of claim 29, wherein the handle and the expansion connector are fixedly positioned adjacent to substantially opposing ends of the frame.

38. The external expanding apparatus of claim 29, wherein the handle is non-pivoting relative to the frame.

39. The external expanding apparatus of claim 29, wherein the handle maintains a constant position relative to the expansion connector during the transitioning of the drive mechanism between the engaged and disengaged positions.

* * * * *

(12) EX PARTE REEXAMINATION CERTIFICATE (8606th)
United States Patent
Carnevali

(10) Number: US 7,573,706 C1
(45) Certificate Issued: Oct. 4, 2011

(54) PORTABLE DEVICE DOCKING STATION

(75) Inventor: Jeffrey D. Carnevali, Seattle, WA (US)

(73) Assignee: National Products, Inc., Seattle, WA (US)

Reexamination Request:
No. 90/010,640, Aug. 11, 2009

Reexamination Certificate for:
Patent No.: 7,573,706
Issued: Aug. 11, 2009
Appl. No.: 11/496,643
Filed: Jul. 31, 2006

Related U.S. Application Data

(62) Division of application No. 11/480,666, filed on Jun. 30, 2006, now Pat. No. 7,298,611.

(51) Int. Cl.
*G06F 1/16* (2006.01)

(52) U.S. Cl. ............... 361/679.4; 710/303; 714/805; 62/3.2

(58) Field of Classification Search .................. None
See application file for complete search history.

(56) References Cited

U.S. PATENT DOCUMENTS

| | | | |
|---|---|---|---|
| 4,659,159 A | 4/1987 | Takahashi | 439/345 |
| 5,384,686 A | 1/1995 | Mesfin et al. | 361/679.43 |
| 6,188,572 B1 | 2/2001 | Liao et al. | 361/679.42 |
| 6,280,212 B1 | 8/2001 | Nguyen et al. | 439/157 |
| 7,236,863 B2 | 6/2007 | LaPorte et al. | 701/36 |
| 7,405,942 B1 | 7/2008 | Lewis | 361/727 |

OTHER PUBLICATIONS

"RAM Mounting Laptop Accessories" from "Civil Infrastructure," Jan. 2004, at p. 8.

*Primary Examiner*—Tuan H. Nguyen

(57) ABSTRACT

An external expanding apparatus or "docking station" operable with a portable computer device of a type having a display unit having a display screen on an inner surface thereof and a hard shell backing surface opposite thereof and pivotally mounted on a substantially rigid casing having a pair of locating holes adjacent to opposite corners of a substantially planar bottom surface thereof, and an input/output (I/O) connector positioned on a back plane thereof with a pair of positioning apertures provided on opposite sides thereof.

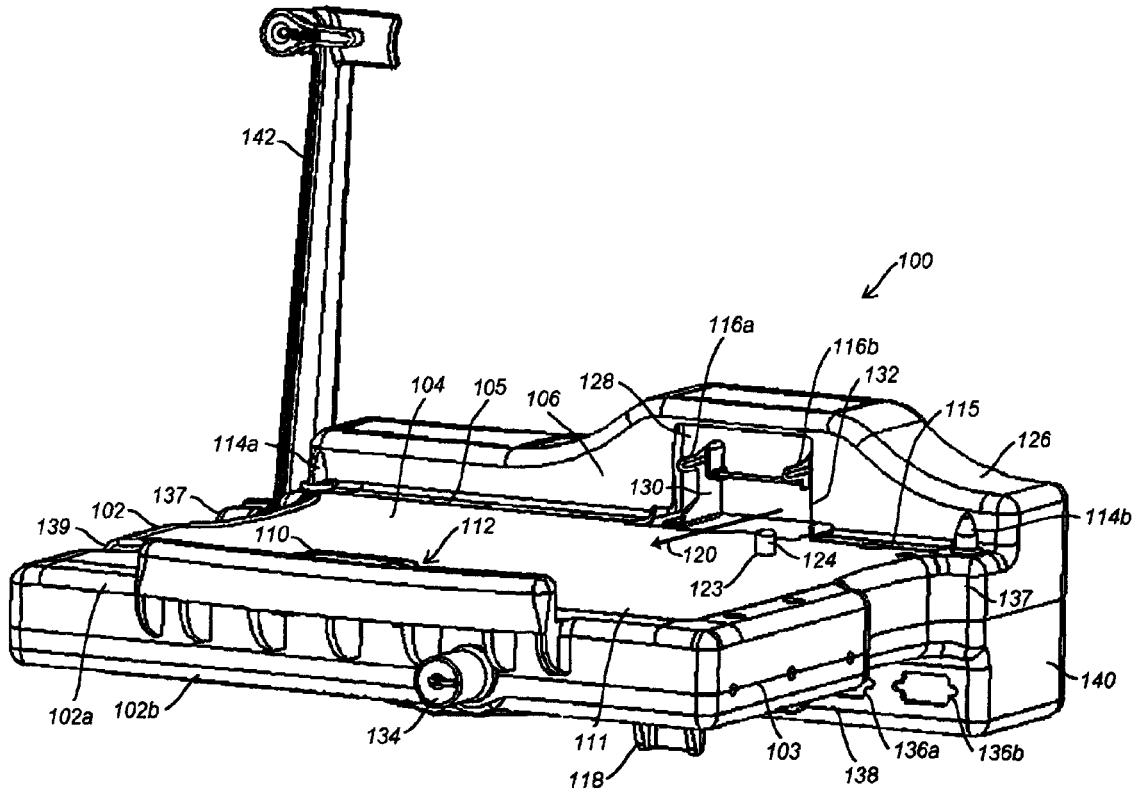

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-39 is confirmed.

\* \* \* \* \*